US012551555B2

(12) United States Patent
Liu et al.

(10) Patent No.: US 12,551,555 B2
(45) Date of Patent: Feb. 17, 2026

(54) COMPOSITIONS AND METHODS FOR POTENTIATING IMMUNE ACTIVITY

(71) Applicant: Kumquat Biosciences Inc., San Diego, CA (US)

(72) Inventors: Yi Liu, San Diego, CA (US); Jonathan Deane, San Diego, CA (US); Amy Strasner, San Diego, CA (US); Liansheng Li, San Diego, CA (US); Matthew R. Janes, Carlsbad, CA (US); Karen K. Wong, Palo Alto, CA (US); Pingda Ren, San Diego, CA (US)

(73) Assignee: Kumquat Biosciences Inc., San Diego, CA (US)

( * ) Notice: Subject to any disclaimer, the term of this patent is extended or adjusted under 35 U.S.C. 154(b) by 865 days.

(21) Appl. No.: 17/838,064

(22) Filed: Jun. 10, 2022

(65) Prior Publication Data

US 2023/0044323 A1    Feb. 9, 2023

Related U.S. Application Data

(63) Continuation-in-part of application No. PCT/US2020/064709, filed on Dec. 11, 2020.

(60) Provisional application No. 62/947,483, filed on Dec. 12, 2019.

(51) Int. Cl.
| | | |
|---|---|---|
| A61K 39/395 | (2006.01) | |
| A61K 38/17 | (2006.01) | |
| A61K 40/11 | (2025.01) | |
| A61K 40/31 | (2025.01) | |
| A61K 40/42 | (2025.01) | |
| A61K 45/06 | (2006.01) | |
| A61P 35/00 | (2006.01) | |

(52) U.S. Cl.
CPC .... *A61K 39/39558* (2013.01); *A61K 38/1774* (2013.01); *A61K 40/11* (2025.01); *A61K 40/31* (2025.01); *A61K 40/4205* (2025.01); *A61K 45/06* (2013.01); *A61P 35/00* (2018.01); *A61K 2239/31* (2023.05); *A61K 2239/38* (2023.05); *A61K 2239/59* (2023.05)

(58) Field of Classification Search
CPC ... A61K 39/39558; A61K 40/31; A61K 39/39
See application file for complete search history.

(56) References Cited

U.S. PATENT DOCUMENTS

| | | | |
|---|---|---|---|
| 2017/0015690 A1* | 1/2017 | Tremblay | A61P 37/02 |
| 2017/0224731 A1* | 8/2017 | Tiganis | A61P 43/00 |
| 2018/0325925 A1 | 11/2018 | Suk et al. | |

FOREIGN PATENT DOCUMENTS

| | | | |
|---|---|---|---|
| CN | 108026154 A | 5/2018 | |
| WO | WO-03082841 A1 | 10/2003 | |
| WO | WO-2004041799 A1 | 5/2004 | |
| WO | WO-2007067612 A1 | 6/2007 | |
| WO | WO-2007067614 A1 | 6/2007 | |
| WO | WO-2007067615 A2 | 6/2007 | |
| WO | WO-2007115058 A2 | 10/2007 | |
| WO | WO-2008148744 A1 | 12/2008 | |
| WO | WO-2009049098 A2 | 4/2009 | |
| WO | WO-2010118241 A2 | 10/2010 | |
| WO | WO-2012149048 A1 | 11/2012 | |
| WO | WO-2017205765 A1 | 11/2017 | |
| WO | 2018227248 A1 | 12/2018 | |
| WO | WO-2019036815 A1 | 2/2019 | |
| WO | WO-2019178422 A1 | 9/2019 | |
| WO | WO-2019246513 A1 | 12/2019 | |
| WO | WO-2020072126 A2 * | 4/2020 | ......... A01K 67/0271 |
| WO | WO-2020186199 A1 | 9/2020 | |
| WO | WO-2021108867 A1 | 6/2021 | |
| WO | WO-2021119554 A1 | 6/2021 | |
| WO | WO-2021127499 A1 | 6/2021 | |
| WO | WO-2021127586 A1 | 6/2021 | |
| WO | WO-2021259173 A1 | 12/2021 | |
| WO | WO-2022056281 A1 | 3/2022 | |

OTHER PUBLICATIONS

Wiede et al (bioRxiv, Sep. 2019, https://doi.org/10.1101/757419, 87 pages) (Year: 2019).*
Lee et al (Nature Communications, Jun. 2019, 10, Article No. 2681, pp. 1-11) (Year: 2019).*
Kretschmer-Kazemi Far et al (Nucleic Acids Research, 2003, vol. 31, pp. 4417-4424) (Year: 2003).*
WO-2020072126-A2 (second part of long WIPO document, downloaded 2025) (Year: 2025).*
Cerulli, et al. Phosphotyrosine isosteres: past, present and future. Org Biomol Chem. Jan. 28, 2020;18(4):583-605. doi: 10.1039/c9ob01998g. Epub Nov. 28, 2019.
International search report with written opinion dated Apr. 22, 2021 for PCT/US2020/064709.
Lafleur, et al. PTPN2 regulates the generation of exhausted CD8+ T cell subpopulations and restrains tumor immunity. Nat Immunol. Oct. 2019;20(10):1335-1347. doi: 10.1038/s41590-019-0480-4. Epub Sep. 16, 2019.
Manguso et al. In vivo CRISPR screening identifies Ptpn2 as a cancer immunotherapy target. Nature 547:413-418 (2017).
Wiede, et al. PTPN2 phosphatase deletion in T cells promotes anti-tumour immunity and CAR T-cell efficacy in solid tumours. EMBO J. Jan. 15, 2020;39(2):e103637. doi: 10.15252/embj. 2019103637. Epub Dec. 5, 2019.
Wiede, et al. PTPN2 deletion in T cells promotes anti-tumour immunity and CAR T cell efficacy in solid tumours. bioRxiv preprint 757419. Posted Sep. 5, 2019. doi: https://doi.org/10.1101/757419 (87 pages).

(Continued)

*Primary Examiner* — Mark V Stevens
(74) *Attorney, Agent, or Firm* — Wilson Sonsini Goodrich & Rosati

(57) ABSTRACT

The present disclosure provides compositions and methods for enhancing immunity (or immune response). The compositions and methods are particularly useful for potentiating immune response of a lymphoid cell. The compositions and methods are also applicable for treating cancer and other diseases.

19 Claims, 5 Drawing Sheets

(56) References Cited

OTHER PUBLICATIONS

Luo et al. Melanoma response to anti-PD-L1 immunotherapy requires JAK1 signaling, but not JAK2. Oncoimmunology 2018, vol. 7, No. 6, e1438106 (12 pages).

* cited by examiner

No CAR-T

DMSO

Treated with PTPN2 inhibitor

COMPOSITIONS AND METHODS FOR POTENTIATING IMMUNE ACTIVITY

CROSS REFERENCE

This application is a continuation-in-part of International Patent Application No. PCT/US2020/064709, filed Dec. 11, 2020, which claims priority to U.S. Ser. No. 62/947,483, filed Dec. 12, 2019, each of which is incorporated herein by reference in its entirety.

BACKGROUND OF THE INVENTION

PTPN2 encodes a protein tyrosine phosphatase that has been implicated in a number of intracellular signaling pathways of immune cells. PTPN2 can negatively regulate αβ TCR T cell receptor (TCR) signaling by dephosphorylating and inactivating, e.g., the Src family kinase including LCK. In addition, PTPN2 can antagonize growth factor or cytokine-mediated signaling required for T cell function, homeostasis, and/or differentiation by dephosphorylating and inactivating JAK family kinases, e.g., JAK-1 and JAK-3, and/or target substrates of the JAK family kinases, e.g., STAT-1, STAT-3, and STAT-5.

Based on genome-wide association studies, PTPN2 single nucleotide polymorphisms (SNPs) have been linked with the development of several human autoimmune diseases including, but are not limited to, type 1 diabetes, rheumatoid arthritis, Crohn's disease, and celiac disease. For example, a PTPN2 variant, rs1893217(C), has been associated with about 40% decrease in PTPN2 mRNA expression in CD4+ T cells, as well as the development of type 1 diabetes. In addition, PTPN2 mRNA expression levels in lung cancer tissues have been shown to be higher than those in normal lung tissues or adjacent normal tissues, such overexpression of PTPN2 promoting proliferation of lung cancer cells. Furthermore, two PTPN2 SNPs, rs2847297 and rs2847282, have been associated with a decrease in both PTPN2 mRNA expression and lung cancer risk, especially squamous cell lung carcinoma risk.

Cancer is the second leading cause of human death. There were close to 10 million deaths from cancer worldwide in 2018 and 17 million new cases were diagnosed. In the United States alone, cancer causes the death of over a half-million people annually, with some 1.7 million new cases diagnosed per year (excluding basal cell and squamous cell skin cancers). Lung, liver, stomach, and bowel are the most common causes of cancer death worldwide, accounting for more than four in ten of all cancer deaths.

Adoptive transfer of gene modified lymphoid cells, particularly T cells (i.e., ACT), is an emerging treatment for cancer. While efficacy has been demonstrated in a range of hematological cancers including ALL, CLL, DLBCL, FL, and multiple myeloma, its efficacy in treating solid tumors is still yet to be established. Current immune cell therapy (e.g., CAR-T therapy) suffers from a number of profound deficiencies. T cell manufacturing and clonal expansion are highly inefficient and costly. When introduced in to a patient, T cell's anti-tumor activity and numbers can be reduced in the immunosuppressive microenvironment often found in a tumor. In addition, CAR-T therapy has been limited by life threatening toxicities in over 30% patients. Toxicities primarily manifest as cytokine release syndrome (CRS) characterized by an early phase with fever, hypotension and elevations of various cytokines, and a later phase associated with life-ending neurologic events.

SUMMARY OF THE INVENTION

In view of the foregoing, there exists a considerable need for alternative compositions and methods to carry out immunotherapy. The compositions and methods of the present disclosure address this need and provide additional advantages as well. The various aspects of the disclosure provide compositions and methods for inducing activity of lymphoid cells.

The ability of PTPN2 to act as a negative regulator of immunoreceptor-related pathways (e.g., TCR signaling) and promote cancer cell proliferation can be exploited for cancer and tumor treatment. Accordingly, in one aspect, the present disclosure provides a method of potentiating immunity of a subject in need thereof, comprising: systemically administering a PTPN2 inhibitor to the subject, thereby to potentiate immunity of the subject.

In some embodiments, prior to the systemically administering the PTPN2 inhibitor, a cell of the subject exhibits expression or activity of PTPN2. In some embodiments, the method further comprises administering a lymphoid cell to the subject prior to or concurrent with the systemically administering the PTPN2 inhibitor. In some embodiments, the lymphoid cell comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen.

In another aspect, the present disclosure provides a method of potentiating immunity of a subject in need thereof, comprising: transiently downregulating expression or activity of PTPN2 in vivo in a cell of the subject, thereby to potentiate immunity of the subject. In some embodiments, the method of potentiating immunity of a subject in need thereof comprises systemically downregulating expression or activity of PTPN2 in vivo in a cell of the subject. In some embodiments, the method of potentiating immunity of a subject in need thereof comprises systemically and transiently downregulating expression or activity of PTPN2 in vivo in a cell of the subject.

In some embodiments, prior to the transiently downregulating, the cell of the subject exhibits expression or activity of PTPN2. In some embodiments, the transiently downregulating is performed once. In some embodiments, the transiently downregulating is performed intermittently for two or more times.

In some embodiments of any one of the methods disclosed herein, the transiently downregulating comprises introducing a PTPN2 inhibitor to the cell. In some embodiments, a first intermittent dosing regimen of the PTPN2 inhibitor and a second intermittent dosing regimen of the PTPN2 inhibitor is the same. In some embodiments, a first intermittent dosing regimen of the PTPN2 inhibitor and a second intermittent dosing regimen of the PTPN2 inhibitor are different.

In some embodiments of any one of the methods disclosed herein, the method further comprises administering a lymphoid cell to the subject prior to or concurrent with the transiently or intermittently downregulating. In some embodiments, the lymphoid cell comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen.

In another aspect, the present disclosure provides a method of potentiating immunity of a subject in need thereof, comprising: (a) selecting the subject, wherein a cell of the subject exhibits expression or activity of PTPN2; and (b) downregulating the expression or activity of PTPN2 in a cell of the subject, thereby to potentiate immunity of the subject.

In some embodiments, the method further comprises administering a lymphoid cell to the subject prior to or concurrent with the downregulating. In some embodiments, the lymphoid cell comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen.

In some embodiments, the downregulating comprises introducing a PTPN2 inhibitor to the cell. In some embodiments, the cell of the subject does not exhibit a mutation of (i) a first gene encoding PTPN2 or (ii) a second gene operatively linked to PTPN2, wherein the mutation inhibits the expression and/or activity of PTPN2.

In some embodiments, a nucleic acid assay using at least a portion of a genome or transcriptome of the cell of the subject is performed to detect the mutation. In some embodiments, a protein assay is performed to detect a functionally active PTPN2 or a functionally inactive PTPN2.

In another aspect, the present disclosure provides a method of potentiating immunity of a subject in need thereof, comprising: (a) administering a lymphoid cell to the subject, wherein the lymphoid cell comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen; and (b) separately administering a PTPN2 inhibitor to the subject, thereby to potentiate immunity of the subject.

In some embodiments, prior to the separately administering the PTPN2 inhibitor, a cell of the subject exhibits expression or activity of PTPN2. In some embodiments, the lymphoid cell retains expression or activity of PTPN2. In some embodiments, the separately administering the PTPN2 inhibitor occurs prior to, concurrent with, or subsequent to the administering the lymphoid cell.

In another aspect, the present disclosure provides a method of potentiating immunity of a cell, comprising: (a) contacting the cell with a PTPN2 inhibitor; and (b) introducing to the cell (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen, thereby to potentiate immunity of the cell, wherein the step (a) is performed prior to or concurrent with the step (b), thereby to potentiate immunity of the cell.

In some embodiments, the cell retains expression or activity of PTPN2 prior to the step (a). In some embodiments, the method further comprises administering the cell to a subject in need thereof. In some embodiments, the method further comprises administering the PTPN2 inhibitor to the subject prior to, concurrent with, or subsequent to the administering the cell. In some embodiments, prior to the administering the cell, a cell of the subject exhibits expression or activity of PTPN2. In some embodiments, the cell is a lymphoid cell.

In another aspect, the present disclosure provides a method of increasing efficacy or reducing side effect of a cell therapy for a subject in need thereof, comprising: (a) administering to the subject a cell comprising a chimeric antigen receptor (CAR) sequence encoding a CAR, wherein the CAR comprises an antigen-binding domain and an intracellular signaling domain, wherein the intracellular signaling domain is minimally required for activation of the CAR upon binding to an antigen; and (b) administering a PTNP2 inhibitor to said subject prior to, concurrent with, or subsequent to the step (a).

In some embodiments, the cell retains expression or activity of PTPN2 prior to the step (b). In some embodiments, prior to the administering the PTPN2 inhibitor, a cell of the subject exhibits expression or activity of PTPN2. In some embodiments, the cell is a lymphoid cell.

In another aspect, the present disclosure provides a method of increasing efficacy or reducing side effect of a cell therapy for a subject in need thereof, comprising: (a) administering to the subject a sub-therapeutic amount of a cell comprising a chimeric antigen receptor (CAR) sequence encoding a CAR; and (b) administering a PTNP2 inhibitor to said subject prior to, concurrent with, or subsequent to the step (a). In a related aspect, provided herein is a method of increasing efficacy or reducing side effect of a cell therapy for a subject in need thereof, comprising: administering to the subject a pharmaceutical composition comprising a cell that comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen, and wherein the cell has been exposed to a small molecule PTPN2 inhibitor.

In some embodiments, the cell retains expression or activity of PTPN2 prior to the step (b). In some embodiments, prior to the administering the PTPN2 inhibitor, a cell of the subject exhibits expression or activity of PTPN2. In some embodiments, the cell is a lymphoid cell.

In some embodiments of any one of the methods disclosed herein, the immunity comprises anti-tumor, anti-cancer activity, anti-viral infection activity, and/or anti-bacterial infection activity.

In some embodiments of any one of the methods disclosed herein, the PTPN2 inhibitor reduces PTPN2 signaling in a cell of the subject. Reduction of PTPN2 signaling can be evidenced by an increase in phosphorylated targets of PTPN2 including without limitation phosphorylated STAT1 and phosphorylated STAT5. In some embodiments of any one of the methods disclosed herein, the PTPN2 inhibitor does not regulate site-specific recombination of a gene encoding PTPN2.

In some embodiments of any one of the methods disclosed herein, the PTPN2 inhibitor is a small molecule. In some embodiments, the small molecule does not effect editing of (i) the gene encoding PTPN2 or (ii) an additional gene operatively linked to PTPN2. In some embodiments, the small molecule is configured to bind PTPN2. In some embodiments, the small molecule exhibits binding specificity to PTPN2 in comparison to other tyrosine phosphatases. In some embodiments, the small molecule exhibits $IC_{50}$ of less than or equal to 5 µM for PTPN2. In some embodiments, the small molecule is configured to bind a substrate of PTPN2. In some embodiments, the substrate is selected from the group consisting of: INSR, EGFR, CSF1R, PDGFR, JAK1, JAK2, JAK3, Src family kinases, STAT1, STAT3, STAT6, FYN, LCK, variations thereof, and combinations thereof.

In some embodiments of any one of the methods disclosed herein, the small molecule is conjugated to a degradation tag, wherein the degradation tag is configured to bind a degradation moiety having a capacity to degrade at least a portion of a target moiety that is bound by the small molecule, wherein the target moiety is PTPN2 or the substrate of PTPN2. In some embodiments, the degradation moiety comprises a ubiquitin ligase. In some embodiments, the ubiquitin ligase is an E3 ligase. In some embodiments, the small molecule is conjugated to the degradation tag via a linker.

In some embodiments of any one of the methods disclosed herein, the method further comprises monitoring, concurrent with or subsequent to the administration of the PTPN2 inhibitor and/or the lymphoid cell, one or more health parameters of the subject selected from the group consisting of: temperature, wheezing, sweating, fatigue, weight, insomnia, diarrhea, infections, and mental disorders.

In some embodiments of any one of the methods disclosed herein, the method further comprises detecting, concurrent with or subsequent to the administration of the PTPN2 inhibitor of the lymphoid cell, one or more inflammatory biomarkers selected from the group consisting of: antibodies, cytokines, radicals, and coagulation factors. In some embodiments, the cytokines comprise IL-1, IL-6, TNF-α, IL-10, or IL-1RA.

In some embodiments of any one of the methods disclosed herein, the cell of the subject comprises a diseased cell. In some embodiments, the diseased cell is a tumor cell or a cancer cell.

In some embodiments of any one of the methods disclosed herein, the cell of the subject comprises a lymphoid cell. In some embodiments of any one of the methods disclosed herein, the lymphoid cell is an immune effector cell. In some embodiments of any one of the methods disclosed herein, the lymphoid cell is selected from the group consisting of: T cell, B cell, NK cell, KHYG cell, T helper cell, regulatory T cell, memory T cell, tumor infiltration T cell (TIL), antigen presenting cell, and dendritic cell. In some embodiments of any one of the methods disclosed herein, the lymphoid cell is selected from the group consisting of: a CD4+ T cell, a CD8+ T cell, and a CD4+ and CD8+ T cell.

In some embodiments of any one of the methods disclosed herein, the subject suffers from a cancer selected from cancer of bladder, bone, brain, breast, cervical, colon, lung, esophagus, head and neck, ovary, prostate, uterus, stomach, skin, and renal tissue.

In some embodiments of any one of the methods disclosed herein, the method further comprises administering another agent (second agent) or therapy to the subject. In some embodiments of any one of the methods disclosed herein, (1) the systemically administering the PTPN2 inhibitor to the subject, (2) the transiently downregulating the expression or activity of PTPN2 in vivo in the cell of the subject, (3) the administering the lymphoid cell to the subject, (4) the administering the PTPN2 inhibitor to the subject, (5) the contacting the cell with the PTPN2 inhibitor, (6) the administering the cell comprising the CAR, and/or (7) the administering the sub-therapeutic amount of the cell comprising the CAR sequence to the subject is performed prior to, concurrent with, or subsequent to the administration of another agent (second agent) or therapy to the subject. In some embodiments, the second agent is selected from the group consisting of a chemotherapeutic agent, a radioactive agent, a small molecule agent targeting a tumor marker, and an antigen-binding agent specifically binding to a tumor marker. In some embodiments, the second agent is a checkpoint inhibitor. In some embodiments, the second agent is an inhibitor of PD1, PD-L1, LAG3, CTLA4, CD160, BTLA, LAIR1, TIM3, 2B4 and TIGIT. In some embodiments, the second agent is an inhibitor of IDO or mTOR. In some embodiments, the therapy is a cell therapy comprising stem cells or lymphoid cells.

In some embodiments of any one of the methods disclosed herein, the TFP comprises a TCR subunit that comprises (1) a TCR extracellular domain capable of specific binding to an antigen, and (2) an intracellular signaling domain, wherein the TFP forms a TCR complex. In some embodiments, the TCR extracellular domain comprises element (1) an antigen binding domain capable of specific binding to the antigen, and element (2) an extracellular domain or portion thereof of a protein selected from the group consisting of a TCR alpha chain, a TCR beta chain, a CD3 epsilon TCR subunit, a CD3 gamma TCR subunit, a CD3 delta TCR, wherein elements (1) and (2) are operatively linked together. In some embodiments, the TCR intracellular domain comprising a stimulatory domain from an intracellular signaling domain of epsilon chain, delta chain, and/or a gamma chain of cluster of differentiation 3 (CD3). In some embodiments, the TCR intracellular domain comprising a stimulatory domain from an intracellular signaling domain of TCR alpha, or from an intracellular signaling domain of TCR beta.

In some embodiments of any one of the methods disclosed herein, the TFP comprises a transmembrane domain including a transmembrane domain of a protein selected from the group consisting of a TCR alpha chain, a TCR beta chain, a TCR zeta chain, a CD3 epsilon TCR subunit, a CD3 gamma TCR subunit, a CD3 delta TCR subunit, CD45, CD4, CD5, CD8, CD9, CD16, CD22, CD33, CD28, CD37, CD64, CD80, CD86, CD134, CD137, and CD154.

In some embodiments of any one of the methods disclosed herein, the TFP comprises a costimulatory domain. In some embodiments, the costimulatory domain of the TFP is selected from the group consisting of: a functional signaling domain of a protein selected from the group consisting of CD27, CD28, 4-1BB (CD137), OX40, CD30, CD40, PD-1, ICOS, lymphocyte function-associated antigen-1 (LFA-1), CD2, CD7, LIGHT, NKG2C, B7-H3, a ligand that specifically binds with CD83, CDS, ICAM-1, GITR, BAFFR, HVEM (LIGHTR), SLAMF7, NKp80 (KLRF1), CD160, CD19, CD4, CD8alpha, CD8beta, IL2Rbeta, IL2R gamma, IL7R alpha, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, NKp44, NKp30, NKp46, and NKG2D.

In some embodiments of any one of the methods disclosed herein, the CAR comprises an antigen-binding domain and an intracellular signaling domain. In some embodiments, the intracellular signaling domain of the CAR comprises a primary signaling domain and/or a costimulatory signaling domain, wherein the primary signaling domain comprises a functional signaling domain of a protein chosen from CD3 zeta, CD3 gamma, CD3 delta, CD3 epsilon, common FcR gamma (FCERIG), FcR beta (Fc Epsilon Rib), CD79a, CD79b, Fcgamma R11a, DAP10, or DAP12. In some embodiments, the intracellular signaling domain of the CAR comprises a costimulatory signaling domain that comprises a functional signaling domain of a protein selected from the group consisting of CD27, CD28, 4-1BB (CD137), OX40, CD30, CD40, PD-1, ICOS, lymphocyte function-associated antigen-1 (LFA-1), CD2, CD7, LIGHT, NKG2C, B7-H3, a ligand that specifically binds with CD83, CDS, ICAM-1, GITR, BAFFR, HVEM (LIGHTR), SLAMF7, NKp80 (KLRF1), CD160, CD19, CD4, CD8alpha, CD8beta, IL2Rbeta, IL2R gamma, IL7R alpha, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, NKp44, NKp30, NKp46, and NKG2D.

In some embodiments of any one of the methods disclosed herein, the intracellular signaling domain of the CAR comprises a primary signaling domain and/or a costimulatory signaling domain, wherein the primary signaling domain and/or the costimulatory signaling domain is minimally required for activation of the CAR upon binding to an antigen. In some embodiments, the CAR is a first generation CAR in which the primary signaling domain is a member selected from the group consisting of CD3zeta, CD28, 4-1BB, OX40, DAP10, ICOS, and a variant thereof. In some embodiments, the CAR is a second generation CAR in which (i) the primary signaling domain is a member selected from the group consisting of CD3zeta, CD28, 4-1BB, OX40, DAP10, ICOS, and a variant thereof, and (ii) the co-stimulatory signaling domain is a different member selected from the group consisting of CD3zeta, CD28, 4-1BB, OX40, DAP10, ICOS, and a variant thereof.

In some embodiments of any one of the methods disclosed herein, the antigen is a tumor antigen or cancer antigen a tumor antigen selected from a group consisting of: TSHR, CD19, CD123, CD22, CD30, CD171, CS-1, CLL-1, CD33, EGFRvIII, GD2, GD3, BCMA, Tn Ag, PSMA, ROR1, FLT3, FAP, TAG72, CD38, CD44v6, CEA, EPCAM, B7H3, KIT, IL-13Ra2, Mesothelin, IL-11Ra, PSCA, PRSS21, VEGFR2, LewisY, CD24, PDGFR-beta, SSEA-4, CD20, Folate receptor alpha, ERBB2 (Her2/neu), MUC1, EGFR, NCAM, Prostase, PAP, ELF2M, Ephrin B2, IGF-I receptor, CAIX, LMP2, gplOO, bcr-abl, tyrosinase, EphA2, Fucosyl GU1, sLe, GM3, TGS5, HMWMAA, o-acetyl-GD2, Folate receptorbeta, TEM1/CD248, TEM7R, CLDN6, GPRC5D, CXORF61, CD97, CD179a, ALK, Polysialic acid, PLAC1, GloboH, NY-BR-1, UPK2, HAVCRI, ADRB3, PANX3, GPR20, LY6K, OR51E2, TARP, WT1, NY-ESO-1, LAGE-1a, MAGE-A1, legumain, HPV E6, E7, MAGE A1, ETV6-AML, sperm protein 17, XAGE1, Tie 2, MAD-CT-1, MAD-CT-2, Fos-related antigen 1, p53, p53 mutant, prostein, survivin and telomerase, PCTA-1/Galectin 8, MelanA/MARTI, Ras mutant, hTERT, sarcoma translocation breakpoints, ML-IAP, ERG (TMPRSS2 ETS fusion gene), NA17, PAX3, Androgen receptor, Cyclin Bi, MYCN, RhoC, TRP-2, CYP1B1, BORIS, SART3, PAX5, OY-TES1, LCK, AKAP-4, SSX2, RAGE-1, human telomerase reverse transcriptase, RU1, RU2, intestinal carboxyl esterase, mut hsp70-2, CD79a, CD79b, CD72, LAIR1, FCAR, LILRA2, CD300LF, CLEC12A, BST2, EMR2, LY75, GPC3, FCRL5, and IGLL1. In some embodiments of any one of the methods disclosed herein, the antigen comprises a neoantigen encoded by a tumor-specific mutated gene.

In some embodiments of any one of the methods disclosed herein, the side effect comprises cytokine release syndrome (CRS), inflammatory disorder, or autoimmune disorder.

In another aspect, the present disclosure provides a modified lymphoid cell comprising a chimeric T-cell receptor (TCR) sequence encoding a T-cell receptor fusion protein (TFP), wherein the TFP exhibits specific binding to an antigen, and wherein expression or activity of PTPN2 in the cell is downregulated.

In some embodiments, the modified lymphoid cell exhibits a mutation of (i) a first gene encoding PTPN2 or (ii) a second gene operatively linked to PTPN2, wherein the mutation inhibits the expression and/or activity of PTPN2.

In some embodiments, the expression or activity of PTPN2 is transiently downregulated.

In some embodiments, the expression or activity of PTPN2 is downregulated by a PTPN2 inhibitor. In some embodiments, the PTPN2 inhibitor does not regulate site-specific recombination of a gene encoding PTPN2.

In some embodiments, the PTPN2 inhibitor is a small molecule. In some embodiments, the small molecule does not effect editing of (i) the gene encoding PTPN2 or (ii) an additional gene operatively linked to PTPN2. In some embodiments, the small molecule is configured to bind PTPN2. In some embodiments, the small molecule exhibits binding specificity to PTPN2 in comparison to other tyrosine phosphatases. In some embodiments, the small molecule exhibits $IC_{50}$ of less than or equal to 5 µM for PTPN2. In some embodiments, the small molecule is configured to bind a substrate of PTPN2. In some embodiments, the substrate is selected from the group consisting of: INSR, EGFR, CSF1R, PDGFR, JAK1, JAK2, JAK3, Src family kinases, STAT1, STAT3, STAT6, FYN, LCK, variations thereof, and combinations thereof.

Provide also is a method of treating cancer in a subject in need thereof, comprising: (a) administering systemically and transiently a small molecule PTPN2 to the subject; and (b) administering a second agent or a second therapy concurrently, before or after step (a). In some embodiments, the second agent is selected from the group consisting of a chemotherapeutic agent, a radioactive agent, a small molecule agent targeting a tumor marker, and an antigen-binding agent specifically binding to a tumor marker. In some embodiments, the second agent is a checkpoint inhibitor. In some embodiments, the second agent is an inhibitor of PD1, PD-L1, LAG3, CTLA4, CD160, BTLA, LAIR1, TIM3, 2B4, OX40, IDO, mTOR, TIGIT. In some embodiments, the second therapy is radiation or is chemotherapy.

Provide also is method of potentiating an anti-tumor activity of a lymphoid cell, comprising: administering transiently a composition comprising PTPN2 inhibitor to the lymphoid cell, thereby potentiating the anti-tumor activity of said lymphoid cell. In some embodiments, the anti-tumor activity yields killing of a tumor cell. In some embodiments, the method further comprises contacting the lymphoid cell with a tumor cell to effect an enhanced killing of the tumor cell as compared to a control lymphoid cell not administered transiently with the PTPN2 inhibitor. In some embodiments, the PTPN2 inhibitor is removed from the composition prior to contacting the lymphoid cell with the tumor cell.

Also provided is method of potentiating immune response of a subject in need thereof, comprising: (a) administering a lymphoid cell to the subject, wherein the lymphoid cell comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen; and (b) separately administering a PTPN2 inhibitor to the subject, thereby to potentiate immunity of the subject. Further provided is a method of treating cancer in a subject in need thereof, comprising: (a) administering systemically a small molecule PTPN2 inhibitor to the subject; and (b) administering a second agent or a second therapy concurrently, before, or after step (a), wherein the second agent or the second therapy comprises a lymphoid cell that (1) retains expression or activity of PTPN2 prior to being exposed to the PTPN2 inhibitor, and (2) expresses (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to a tumor antigen. In some embodiments, the second agent or the second therapy comprises a lymphoid cell that (1) retains expression or activity of PTPN2 prior to being exposed to the PTPN2 inhibitor, and (2) expresses a chimeric antigen receptor (CAR) sequence encoding a CAR that exhibits specific binding to a tumor antigen. In some embodiments, the small molecule PTPN2 inhibitor is systemically and transiently administered to the subject in need thereof. In some embodiments, the small molecule PTPN2 inhibitor enhances killing of the tumor cell as compared to a control lymphoid cell not administered with the small molecule PTPN2 inhibitor. In some embodiments, the second agent or the second therapy comprises a sub-therapeutic amount of the lymphoid cells. In some embodiments, the small molecule PTPN2 inhibitor (i) does not regulate site-specific recombination of a gene encoding PTPN2 and (ii) does not affect editing of the gene encoding PTPN2. In some embodiments, the small molecule PTPN2 inhibitor is a compound of a formula selected from the group consisting of Formula A, Formula B, Formula C, Formula Z, Formula (I), Formula (I-A), Formula (I-A1), Formula (I-B), Formula (I-B1), and Formula (I-B2). In some embodiments, the small molecule PTPN2 inhibitor exhibits $IC_{50}$ of less than or equal to 10 µM, 5 µM, 1 µM, 500 nM, 200 nM, 100 nM, 50 nM, 10 nM, 1 nM for PTPN2 as ascertained in a phosphatase activity assay utilizing a PTPN2 substrate including but not limited to DiFMUP, STAT1 and STAT5. In some embodiments, the small molecule PTPN2 inhibitor exhibits $IC_{50}$ for PTPN2 less than 10 nM, 5 nM, 4 nM, 3 nM, 2 nM, 1 nM, as ascertained in a phosphatase activity assay utilizing DiFMUP as a substrate. In some embodiments, the small molecule PTPN2 inhibitor exhibits $IC_{50}$ for PTPN2 less than 5 nM, 4 nM, 3 nM, 2 nM, 1 nM, as ascertained in a phosphatase activity assay utilizing DiFMUP as a substrate. In some embodiments, the small molecule PTPN2 inhibitor exhibits $IC_{50}$ (also can be referred to as $EC_{50}$ as applied to cellular assay) for PTPN2 less than 10 µM, 5 µM, 1 µM, 500 nM, 200 nM, 100 nM, 50 nM, 10 nM, 1 nM as tested in a pSTAT1 assay. In some embodiments, the small molecule PTPN2 inhibitor exhibits $EC_{50}$ for PTPN2 of less than 15 µM, 10 µM, 5 µM, 1 µM, 500 nM, 200 nM, 100 nM when tested in the CD25 assay disclosed herein. In some embodiments, the small molecule PTPN2 inhibitor exhibits $IC_{50}$ (also can be referred to as $EC_{50}$ as applied to cellular assay) for PTPN2 less than 10 nM or less than 1 nM as tested in a phosphatase assay utilizing DiFMUP as the substrate, and $EC_{50}$ less than 10 µM or less than 5 µM in a pSTAT1 assay. In some embodiments, the small molecule PTPN2 inhibitor exhibits $IC_{50}$ (also can be referred to as $EC_{50}$ as applied to cellular assay) for PTPN2 (i) less than 5 nM as tested in a phosphatase assay utilizing DiFMUP as the substrate, (ii) $EC_{50}$ less than 5 µM in a pSTAT1 assay, and (iii) $EC_{50}$ less than 1 µM when tested in the CD25 assay disclosed here.

In practicing any of the disclosed methods or constructing any of the disclosed compositions, a cell being administered can be a lymphoid cell capable of eliciting an immune response comprising comprises anti-tumor, anti-cancer activity, anti-viral infection activity, and/or anti-bacterial infection activity. In some embodiments, the lymphoid cell is an immune effector cell. In some embodiments, a subject lymphoid cell is selected from the group consisting of: T cell, B cell, NK cell, KHYG cell, T helper cell, regulatory T cell, memory T cell, tumor infiltration T cell (TIL), antigen presenting cell, and dendritic cell. In some embodiments, a subject lymphoid cell is selected from the group consisting of: a CD4+ T cell, a CD8+ T cell, and a CD4+ and CD8+ T cell.

In some embodiments, the subject being administered with a subject composition suffers from a cancer selected from cancer of bladder, bone, brain, breast, cervical, colon, lung, esophagus, head and neck, ovary, prostate, uterus, stomach, skin, and renal tissue. the PTPN2 inhibitor does not regulate site-specific recombination of a gene encoding PTPN2.

In some embodiments, a subject small molecule does not effect editing of (i) the gene encoding PTPN2 or (ii) an additional gene operatively linked to PTPN2. In some embodiments, the small molecule is configured to bind PTPN2. In some embodiments, a subject small molecule exhibits binding specificity to PTPN2 in comparison to other tyrosine phosphatases. In some embodiments, a subject small molecule exhibits $IC_{50}$ of less than or equal to 5 µM for PTPN2. In some embodiments, a subject small molecule is configured to bind a substrate of PTPN2.

In some embodiments, a subject method results in expression or activity of PTPN2 being transiently downregulated. In some embodiments, expression or activity of PTPN2 is transiently downregulated by intermittent administration of a small molecule to the lymphoid cell. In some embodiments, a subject method further comprises monitoring, concurrent with or subsequent to the administration of the PTPN2 inhibitor and/or the lymphoid cell, one or more inflammatory biomarkers present in the subject selected from the group consisting of: antibodies, cytokines, radicals, and coagulation factors. Where desired, cytokines being monitored comprise IL-1, IL-6, TNF-α, IL-10, or IL-1RR.

Further provided by the disclosure is a modified lymphoid cell comprising (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen, wherein the lymphoid cell comprises a small molecule PTPN2 inhibitor that does not effect editing of (i) the gene encoding PTPN2 or (ii) an additional gene operatively linked to PTPN2.

In some embodiments of any one of the modified lymphoid cells disclosed herein, the small molecule is conjugated to a degradation tag, wherein the degradation tag is configured to bind a degradation moiety having a capacity to degrade at least a portion of a target moiety that is bound by the small molecule, wherein the target moiety is PTPN2 or the substrate of PTPN2. In some embodiments, the degradation moiety comprises a ubiquitin ligase. In some embodiments, the ubiquitin ligase is an E3 ligase. In some embodiments, the small molecule is conjugated to the degradation tag via a linker.

In some embodiments of any one of the modified lymphoid cells disclosed herein, the modified lymphoid cell comprises the PTPN2 inhibitor.

In some embodiments of any one of the modified lymphoid cells disclosed herein, the TFP comprises a TCR subunit that comprises (1) a TCR extracellular domain capable of specific binding to the antigen, and (2) an intracellular signaling domain, wherein the TFP forms a TCR complex. In some embodiments, the TCR extracellular domain comprises element (1) an antigen binding domain capable of specific binding to the antigen, and element (2) an extracellular domain or portion thereof of a protein selected from the group consisting of a TCR alpha chain, a TCR beta chain, a CD3 epsilon TCR subunit, a CD3 gamma TCR subunit, a CD3 delta TCR, wherein elements (1) and (2) are operatively linked together. In some embodiments, the TCR intracellular domain comprising a stimulatory domain from an intracellular signaling domain of epsilon chain, delta chain, and/or a gamma chain of cluster of differentiation 3 (CD3). In some embodiments, the TCR intracellular domain comprising a stimulatory domain from an intracellular signaling domain of TCR alpha, or from an intracellular signaling domain of TCR beta.

In some embodiments of any one of the modified lymphoid cells disclosed herein, the TFP comprises a transmembrane domain including a transmembrane domain of a protein selected from the group consisting of a TCR alpha chain, a TCR beta chain, a TCR zeta chain, a CD3 epsilon TCR subunit, a CD3 gamma TCR subunit, a CD3 delta TCR subunit, CD45, CD4, CD5, CD8, CD9, CD16, CD22, CD33, CD28, CD37, CD64, CD80, CD86, CD134, CD137, and CD154.

In some embodiments of any one of the modified lymphoid cells disclosed herein, the TFP comprises a costimulatory domain. In some embodiments, the costimulatory domain of the TFP is selected from the group consisting of: a functional signaling domain of a protein selected from the group consisting of CD27, CD28, 4-1BB (CD137), OX40, CD30, CD40, PD-1, ICOS, lymphocyte function-associated antigen-1 (LFA-1), CD2, CD7, LIGHT, NKG2C, B7-H3, a ligand that specifically binds with CD83, CDS, ICAM-1, GITR, BAFFR, HVEM (LIGHTR), SLAMF7, NKp80 (KLRF1), CD160, CD19, CD4, CD8alpha, CD8beta, IL2Rbeta, IL2R gamma, IL7R alpha, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAAME (SLAMF8), SELPLG (CD162), LTBR, LAT, GADS, SLP-76, PAG/Cbp, NKp44, NKp30, NKp46, and NKG2D.

In some embodiments of any one of the modified lymphoid cells disclosed herein, the modified lymphoid cell is a variant of a member selected from the group consisting of: a T cell, B cell, NK cell, KHYG cell, T helper cell, regulatory T cell, memory T cell, tumor infiltration T cell (TIL), antigen presenting cell, and dendritic cell. In some embodiments of any one of the modified lymphoid cells disclosed herein, the modified lymphoid cell is a variant of a member selected from the group consisting of: a CD4+ T cell, a CD8+ T cell, and a CD4+ and CD8+ T cell.

In some embodiments, the PTPN2 inhibitor utilized in any of the method disclosed herein has a structure, or a pharmaceutically acceptable salt thereof, represented by a formula selected from the group consisting of Formula A, Formula B, Formula C, Formula Z, Formula (I), Formula (I-A), Formula (I-A1), Formula (I-B), Formula (I-B1), and Formula (I-B2).

While practicing some of the embodiments disclosed herein, the retention of PTPN2 expression or activity is observed in at least one type of subject's endogenous lymphoid cells and/or diseased cells. In some embodiments, the subject comprises wt PTPN2 gene sequence in at least his or her endogenous lymphoid cell, including but not limited the subject's endogenous immune effector cells. In some embodiments, the subject comprises wt PTPN2 gene sequence in at least his or her diseased cell, including but not limited to the subject's cancer or tumor cells.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
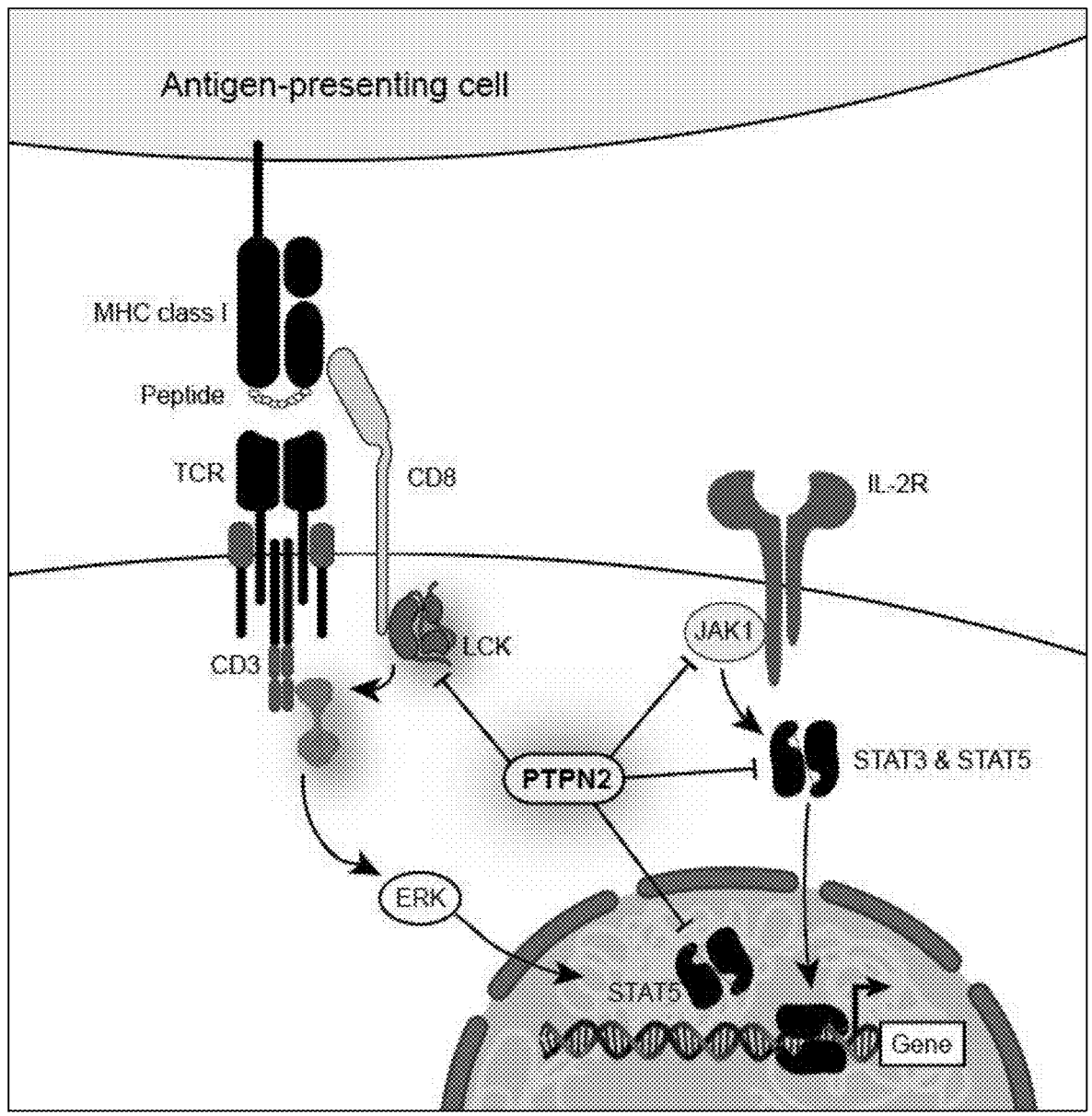
FIG. 1 depicts the signaling pathway of PTPN2 and the associated upstream and downstream molecules. As is shown in the figure, PTPN2 inhibits LCK activity, JAK1 activity, and STAT3/5 activity, to effect downregulation of the T cell receptor (TCR) signaling cascade that is associated with immune cell functions, e.g., ERK mediated signaling and gene expression.

Unless defined otherwise, all technical and scientific terms used herein have the same meaning as is commonly understood by one of skill in the art to which this invention belongs.

The term "a" and "an" refers to one or to more than one (i.e., to at least one) of the grammatical object of the article. By way of example, "an element" means one element or more than one element.

"About" as used herein when referring to a measurable value such as an amount, a duration, and the like, is meant to encompass variations of ±10% of a stated number or value.

The terms "polynucleotide", "nucleotide", "nucleotide sequence", "nucleic acid" and "oligonucleotide" are used interchangeably. They refer to a polymeric form of nucleotides of any length, either deoxyribonucleotides or ribonucleotides, or analogs thereof. Polynucleotides may have any three-dimensional structure, and may perform any function, known or unknown. The following are non-limiting examples of polynucleotides: coding or non-coding regions of a gene or gene fragment, loci (locus) defined from linkage analysis, exons, introns, messenger RNA (mRNA), transfer RNA, ribosomal RNA, ribozymes, cDNA, recombinant polynucleotides, branched polynucleotides, plasmids, vectors, isolated DNA of any sequence, isolated RNA of any sequence, nucleic acid probes, primers, cell-free DNA (cfDNA), and circulating tumor DNA (ctDNA). A polynucleotide may comprise modified nucleotides, such as methylated nucleotides and nucleotide analogs. If present, modifications to the nucleotide structure may be imparted before or after assembly of the polymer. The sequence of nucleotides may be interrupted by non-nucleotide components. A polynucleotide may be further modified after polymerization, such as by conjugation with a labeling component.

A "nucleotide probe" or "probe" refers to a polynucleotide used for detecting or identifying its corresponding target polynucleotide in a hybridization reaction.

As used herein, "expression" refers to the process by which a polynucleotide is transcribed into mRNA and/or the process by which the transcribed mRNA (also referred to as a "transcript") is subsequently translated into peptides, polypeptides, or proteins. The transcripts and the encoded polypeptides are collectedly referred to as "gene product." If the polynucleotide is derived from genomic DNA, expression may include splicing of the mRNA in a eukaryotic cell. The level of expression (or alternatively, the "expression level") of a PTPN2 gene can be determined, for example, by determining the level of PTPN2polynucleotides, polypeptides or gene products.

"Aberrantly expressed" or "aberrant expression" as applied to a nucleotide sequence (e.g., a gene) or polypeptide sequence in a subject, refers to the aberrant production of the mRNA transcribed and/or translated from the nucleotide sequence or the protein product encoded by the nucleotide sequence. A differentially expressed sequence may be overexpressed (or aberrantly high expression) or underexpressed (or aberrantly low expression) as compared to the expression level of a reference sample (i.e., a reference level). As used herein, overexpression is an increase in expression can be at least 1.25 fold, or alternatively, at least 1 fold, or alternatively, at least 2 fold, or alternatively, at least 3 fold, or alternatively, at least 4 fold, or alternatively, at least 10 fold expression over that detected in a reference sample. As used herein, underexpression is a reduction in expression can be at least 1.25 fold, or alternatively, at least 1 fold, or alternatively, at least 2 fold, or alternatively, at least 3 fold, or alternatively, at least 4 fold, or alternatively, at least 10 fold expression under that detected in a reference sample. Underexpression also encompasses absence of expression of a particular sequence as evidenced by the absence of detectable expression in a test subject when compared to a reference sample.

"Signal transduction" is a process during which stimulatory or inhibitory signals are transmitted into and within a cell to elicit an intracellular response. A molecule can mediate its signaling effect via direct or indirect interaction with downstream molecules of the same pathway or related pathway(s). For instance, PTPN2 signaling can involve a host of downstream molecules including but not limited to one or more of the following proteins: PI3-kinase and AKT.

The terms "polypeptide", "peptide" and "protein" are used interchangeably herein to refer to polymers of amino acids of any length. The polymer may be linear or branched, it may comprise modified amino acids, and it may be interrupted by non-amino acids. The terms also encompass an amino acid polymer that has been modified; for example, disulfide bond formation, glycosylation, lipidation, acetylation, phosphorylation, or any other manipulation, such as conjugation with a labeling component. As used herein the term "amino acid" refers to either natural and/or unnatural or synthetic amino acids, including glycine and both the D or L optical isomers, and amino acid analogs and peptidomimetics.

A "control" or "control sample" is an alternative sample or subject used in an experiment for comparison purpose.

The term "reference level" refers to a control level used to evaluate a test level. In some examples, a reference level may be a control. For example, a biomarker may be considered to be underexpressed when the expression level of that biomarker is lower than a reference level. The reference level can be determined by a plurality of methods, provided that the resulting reference level accurately provides a level of a biomarker above which exists a first group of subjects having a different probability of exhibiting a clinically beneficial response to treatment with a PTPN2 inhibitor than that of a second group of patients having levels of the biomarker below the reference level. The reference level may be determined, for example, by measuring the level of expression of a biomarker in tumorous or non-tumorous cancer cells from the same tissue as the tissue of the cancer cells to be tested. In some examples, the reference level may be a level of a biomarker determined in vitro. A reference level may be determined by comparison of the level of a biomarker in populations of subjects having the same cancer. Two or more separate groups of subjects may be determined by identification of subsets of populations of the cohort that have the same or similar levels of a biomarker. Determination of a reference level can then be made based on a level that distinguishes these separate groups. A reference level may be a single number, equally applicable to every subject, or a reference level can vary according to specific subpopulations of subjects. For example, older men may have a different reference level than younger men for the same cancer, and women may have a different reference level than men for the same cancer. Furthermore, the reference level may be some level determined for each subject individually. For example, the reference level may be a ratio of a biomarker level in a cancer cell of a subject relative to the biomarker level in a normal cell within the same subject. In some embodiments, a reference level is a numerical range of gene expression that is obtained from a statistical sampling from a population of individuals having cancer. The sensitivity of the individuals having cancer to treatment with a PTPN2 inhibitor may be known. In certain embodiments, the reference level is derived by comparing gene expression to a control gene that is expressed in the same cellular environment at relatively stable levels (e.g. a housekeeping gene such as an actin). Comparison to a reference level may be a qualitative assessment or a quantitative determination.

The terms "determining," "measuring," "evaluating," "assessing," "assaying," "testing," and "analyzing" are used interchangeably herein to refer to any form of measurement, and include determining if an analyte is present or not (e.g., detection). These terms can include both quantitative and/or qualitative determinations. Assessing may be relative or absolute. A relative amount could be, for example, high, medium or low. An absolute amount could reflect the measured strength of a signal or the translation of this signal strength into another quantitative format, such as micrograms/mL. "Detecting the presence of" can include determining the amount of something present, as well as determining whether it is present or absent.

The terms "antagonist" and "inhibitor" are used interchangeably, and they refer to a compound, or a biological molecule having the ability to effect inhibition of a biological function of a target protein (e.g., PTPN2), whether by inhibiting the activity or expression of the target protein. Accordingly, the terms "antagonist" and "inhibitors" are defined in the context of the biological role of the target protein. While preferred antagonists herein specifically interact with (e.g., bind to) the target, compounds that inhibit a biological activity of the target protein by interacting with other members of the signal transduction pathway of which the target protein is a member are also specifically included within this definition. Alternatively or in addition to, an activity of a target protein may involve interaction (e.g., binding) between the target protein and a substrate of the target protein, and the terms "antagonist" and "inhibitors" can refer to a compound having the ability to interact with (e.g., bind to) the subject of the target protein, to indirectly inhibit the biological activity of the target protein. In some cases, such compound may bind both the target protein and one or more kinds of the substrate. A preferred biological activity inhibited by an antagonist is associated with the development, growth, maintenance, or spread of a cancer or a tumor.

The term "cell proliferation" refers to a phenomenon by which the cell number has changed as a result of division. This term also encompasses cell growth by which the cell morphology has changed (e.g., increased in size) consistent with a proliferative signal.

The terms "administer," "administering," "administration," and derivatives thereof refer to the methods that may be used to enable delivery of agents or compositions to the desired site of biological action. These methods include, but are not limited to parenteral administration (e.g., intravenous, subcutaneous, intraperitoneal, intramuscular, intravascular, intrathecal, intranasal, intravitreal, infusion and local injection), transmucosal injection, oral administration, administration as a suppository, and topical administration. Administration is by any route, including parenteral. Parenteral administration includes, e.g., intravenous, intramuscular, intra-arteriole, intradermal, subcutaneous, intraperitoneal, intraventricular, and intracranial. Other modes of delivery include, but are not limited to, the use of liposomal formulations, intravenous infusion, transplantation, etc. One skilled in the art will know of additional methods for administering a therapeutically effective amount of a composition of the present disclosure for preventing or relieving one or more symptoms associated with a disease.

The term "systemic administration" refers to administration of agents or compositions such that the agents or compositions become distributed in a subject's body. The distribution of the agents or compositions throughout the subject's body may be an even distribution. Alternatively, the distribution may be preferential, resulting in a higher localization of the agents or compositions in one or more desired sites. A desired site may be the blood or another site that is reachable by the vascular system. Non-limiting examples of systemic routes of administration include administration by (1) introducing the agent directly into the vascular system or (2) oral, pulmonary, or intramuscular administration wherein the agent is adsorbed, enters the vascular system, and is carried to one or more desired site(s) of action via the blood. By contrast, "non-systemic administration" refers to administration of agents or compositions such that the agents or compositions are administered locally to the target site of interest of a subject's body to effect primarily a local effect.

The terms "co-administration," "administered in combination with," and their grammatical equivalents, encompass administration of two or more agents to a subject so that both agents and/or their metabolites can assert their respective functions. Co-administration includes simultaneous administration in separate compositions, administration at different times in separate compositions, or administration in a composition in which both agents are present.

The term "effective amount" refers to that amount of a compound described herein that is sufficient to effect the intended application including but not limited to stimulating or prolonging anti-tumor immunity, or disease treatment, as defined below. The effective amount may vary depending upon the intended application (in vitro, ex vivo, or in vivo), or the subject and disease condition being treated, e.g., the weight and age of the subject, the severity of the disease condition, the manner of administration and the like, which can readily be determined by one of ordinary skill in the art. The term also applies to a dose that will induce a particular response in target cells, e.g., cell death or cell activation. The specific dose will vary depending on the particular compounds chosen, the dosing regimen to be followed, whether it is administered in combination with other compounds, the tissue to which it is administered, and the physical delivery system in which it is carried.

As used herein, the terms "treatment", "treating", "palliating" and "ameliorating" are used interchangeably. These terms refer to an approach for obtaining beneficial or desired results including, but are not limited to, therapeutic benefit and/or a prophylactic benefit. By therapeutic benefit is meant eradication or amelioration of the underlying disorder being treated (e.g., squamous cell carcinoma). Also, a therapeutic benefit is achieved with the eradication or amelioration of one or more of the physiological symptoms associated with the underlying disorder such that an improvement is observed in the patient, notwithstanding that the patient can still be afflicted with the underlying disorder. For prophylactic benefit, the pharmaceutical compositions may be administered to a patient at risk of developing a particular disease, or to a patient reporting one or more of the physiological symptoms of a disease, even though a diagnosis of this disease may not have been made.

A "therapeutic effect," as used herein, encompasses a therapeutic benefit and/or a prophylactic benefit as described above. A prophylactic effect includes delaying or eliminating the appearance of a disease or condition, delaying or eliminating the onset of symptoms of a disease or condition, slowing, halting, or reversing the progression of a disease or condition, or any combination thereof.

The term "subject" includes, but is not limited to, humans of any age group, e.g., a pediatric subject (e.g., infant, child or adolescent) or adult subject (e.g., young adult, middle-aged adult or senior adult)) and/or other primates (e.g., cynomolgus monkeys or rhesus monkeys); mammals, including commercially relevant mammals such as cattle, pigs, horses, sheep, goats, cats, and/or dogs; and/or birds, including commercially relevant birds such as chickens, ducks, geese, quail, and/or turkeys. The methods described herein can be useful in both human therapeutics and veterinary applications. In some embodiments, the subject is a mammal, and in some embodiments, the subject is human.

The term "in vivo" refers to an event that takes place in a subject's body.

The term "ex vivo" refers to an event that first takes place outside of the subject's body for a subsequent in vivo application into a subject's body. For example, an ex vivo preparation may involve preparation of cells outside of a subject's body for the purpose of introduction of the prepared cells into the same or a different subject's body.

The term "in vitro" refers to an event that takes place outside of a subject's body. For example, an in vitro assay encompasses any assay run outside of a subject's body. In vitro assays encompass cell-based assays in which cells alive or dead are employed. In vitro assays also encompass a cell-free assay in which no intact cells are employed.

The term "downregulating PTPN2 activity", as used herein, refers to slowing, reducing, altering, inhibiting, as well as completely eliminating and/or preventing PTPN2 activity.

The term "effector function" refers to a specialized function of a cell. Effector function of a T-cell, for example, may be cytolytic activity or helper activity including the secretion of cytokines. Thus the term "intracellular signaling domain" refers to the portion of a protein which transduces the effector function signal and directs the cell to perform a specialized function.

The term "autologous" refers to any material derived from the same individual to whom it is later to be re-introduced into the individual.

The term "allogeneic" refers to any material derived from a different animal of the same species as the individual to whom the material is introduced. Two or more individuals are said to be allogeneic to one another when the genes at one or more loci are not identical. In some aspects, allogeneic material from individuals of the same species may be sufficiently unlike genetically to interact antigenically.

The term a "costimulatory molecule" refers to a cognate binding partner on a T cell that specifically binds with a costimulatory ligand, thereby mediating a costimulatory response by the T cell, such as, but not limited to, proliferation. Costimulatory molecules are cell surface molecules other than antigen receptors or their ligands that are contribute to an efficient immune response. Costimulatory molecules include, but are not limited to an MHC class I molecule, BTLA and a Toll ligand receptor, as well as OX40, CD27, CD28, CDS, ICAM-1, LFA-1 (CD11a/CD18), ICOS (CD278), and 4-1BB (CD137). Further examples of such costimulatory molecules include CDS, ICAM-1, GITR, BAFFR, HVEM (LIGHTR), SLAAMF7, NKp80 (KLRF1), NKp44, NKp30, NKp46, CD160, CD19, CD4, CD8alpha, CD8beta, IL2R beta, IL2R gamma, IL7R alpha, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, NKG2D, NKG2C, TNFR2, TRANCE/RANKL, DNAM1 (CD226), SLAMF4 (CD244, 2B4), CD84, CD96 (Tactile), CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, CD19a, and a ligand that specifically binds with CD83. A costimulatory intracellular signaling domain can be the intracellular portion of a costimulatory molecule. A costimulatory molecule can be represented in the following protein families: TNF receptor proteins, Immunoglobulin-like proteins, cytokine receptors, integrins, signaling lymphocytic activation molecules (SLAM proteins), and activating NK cell receptors. Examples of such molecules include CD27, CD28, 4-1BB (CD137), OX40, GITR, CD30, CD40, ICOS, BAFFR, HVEM, ICAM-1, lymphocyte function-associated antigen-1 (LFA-1), CD2, CDS, CD7, CD287, LIGHT, NKG2C, NKG2D, SLAMF7, NKp80, NKp30, NKp44, NKp46, CD160, B7-H3, and a ligand that specifically binds with CD83, and the like. The intracellular signaling domain can comprise the entire intracellular portion, or the entire native intracellular signaling domain, of the molecule from which it is derived, or a functional fragment or derivative thereof.

The terms "immune effector cell" and "effector cell" are used interchangeably here. They refer to a cell that is involved in an immune response, e.g., in the promotion of an immune effector response. Examples of immune effector cells include T cells, e.g., alpha/beta T cells and gamma/delta T cells, B cells, natural killer (NK) cells, natural killer T (NKT) cells, mast cells, and myeloic-derived phagocytes.

The term "immunity" and "immune response" are used herein interchangeably. As applied to a subject, it refers to the ability of the subject to elicit an immune response via his/her immune cells against an antigen, including without limitation tumor antigen, viral antigen, bacterial antigen, or neoantigen. As applied to a cell, it refers to the ability of the cell to generate a cellular response against an antigen, including without limitation tumor antigen, viral antigen, bacterial antigen, or neoantigen.

The term "lymphoid cell" or "lymphoid cells" refers to any of the cells responsible for the production of immunity (or immune response) mediated by cells or antibodies and including lymphocytes, lymphoblasts, and plasma cells. Lymphoid cells include granulocytes such as asophils, eosinophils, and neutrophils; mast cells; monocytes which can develop into macrophages; antigen-presenting cells such as dendritic cells; and lymphocytes such as natural killer cells (NK cells), B cells, and T cells (including activated T cells). In some examples, T cells include both naive and memory cells (e.g. central memory or $T_{CM}$, effector memory or $T_{EM}$ and effector memory RA or $T_{EMRA}$), effector cells (e.g. cytotoxic T cells or CTLs or Tc cells), helper cells (e.g. Th1, Th2, Th3, Th9, Th7, TFH), regulatory cells (e.g. Treg, and Trl cells), natural killer T cells (NKT cells), tumor infiltrating lymphocytes (TILs), lymphocyte-activated killer cells (LAKs), αβ T cells, γδ T cells, and similar unique classes of the T cell lineage.

The terms "tumor marker, "tumor antigen", and "tumor-associated antigen" are used herein interchangeably, each referring to a molecule or fragment thereof expressed on the surface or inside of a cancer cell, or secreted or otherwise a molecule or fragment thereof derived from a cancer cell (e.g., circulating tumor DNA or circulating tumor RNA), and which is useful for the detecting a cancer cell or preferential targeting an agent to the cancer cell. A tumor antigen can be a marker expressed by both normal cells and cancer cells, e.g., a lineage marker, e.g., CD19 on B cells. A tumor antigen can be a cell surface molecule that is overexpressed or underexpressed in a cancer cell in comparison to a normal cell. A tumor antigen can also be a cell surface molecule that is inappropriately synthesized in the cancer cell, for instance, a molecule that contains deletions, additions or mutations in comparison to the molecule expressed on a normal cell. A tumor antigen can be expressed exclusively on the cell surface of a cancer cell, entirely or as a fragment (e.g., MHC/peptide), and not synthesized or expressed on the surface of a normal cell. A tumor antigen includes neoantigens encoded by tumor-specific mutated genes.

The term "transiently downregulated" as used herein generally means that a downregulation of expression or activity of a target molecule (e.g., PTPN2) is not permanent. A transient downregulation may not be a permanent downregulation. In some cases, a transient downregulation may involve downregulating (e.g., reducing) expression or activity of a target molecule for a period of time, followed by regaining at least a portion of expression or activity level of the target molecule that was previously downregulated. A transient downregulation can involve an intermittent downregulation of a target molecule (e.g., PTPN2).

The term "intermittent" is used herein to describe a process that is not continuous. An intermittent process may be followed by a break or stop. A plurality of intermittent processes may involve alternatively starting and stopping a same process or different processes. In some embodiments, the term "intermittent dosing regimen" as used here refers to a dosing regimen that comprises administering a pharmaceutical composition, followed by a rest period.

The term "side effect" as used herein refers to any complication, unwanted, or pathological outcome of a therapy (e.g., a cell therapy, an immunotherapy, etc.) that occurs in addition to or in place of a desired treatment outcome of the therapy. Examples of a side effect may include, but are not limited to, (i) off-target cell toxicity, (ii) on-target off-tumor toxicity, and/or (iii) autoimmunity (e.g., chronic autoimmunity). In an example, a side effect of a cell therapy involving a T-cell receptor fusion protein (TFP) and/or a chimeric antigen receptor (CAR) may include a graft-versus-host disease. In another example, a side effect of a cell therapy involving a TFP and/or a CAR may include death of a cell configured to express the TFP and/or the CAR.

Other examples of a side effect of a cell therapy may include, but are not limited to, disorders mediated by phagocytic cells, which includes macrophages and neutrophil granulocytes (Polymorphonuclear leukocytes, PMNs) and/or T cells. Examples include inflammatory skin diseases including psoriasis; responses associated with inflammatory bowel disease (such as Crohn's disease and ulcerative colitis); adult respiratory distress syndrome; dermatitis; CNS inflammatory disorders such as multiple sclerosis; uveitic disorders; allergic conditions such as eczema and asthma and other conditions involving infiltration of T cells and chronic inflammatory responses; skin hypersensitivity reactions (including poison ivy and poison oak); autoimmune diseases such as rheumatoid arthritis, systemic lupus erythematosus (SLE), diabetes mellitus, multiple sclerosis, Raynaud's syndrome, autoimmune thyroiditis, Sjogren's syndrome, juvenile onset diabetes, and immune responses associated with delayed hypersensitivity mediated by cytokines and T-lymphocytes typically found in tuberculosis, sarcoidosis, polymyositis, granulomatosis and vasculitis; pernicious anemia; multiple organ injury syndrome secondary to septicaemia or trauma; autoimmune haemolytic anemia; myethemia gravis; antigen-antibody complex mediated diseases; and/or all types of transplantation rejection, including graft vs. host or host vs. graft disease.

The term "efficacy" of a treatment or method, as used herein, can be measured based on changes in the course of disease or condition in response to such treatment or method. For example, the efficacy of a treatment or method of the present disclosure may be measured by its impact on signs or symptoms of a disease or condition of a subject, e.g., a tumor or cancer of the subject. A response may be achieved when a subject having the disease or condition experiences partial or total alleviation of the disease or condition, or reduction of one or more symptoms of the disease or condition. In an example, a response is achieved when a subject suffering from a tumor exhibits a reduction in the tumor size after the treatment or method, as provided in the present disclosure. In some examples, the efficacy may be measured by assessing cancer cell death, reduction of tumor (e.g., as evidenced by tumor size reduction), and/or inhibition of tumor growth, progression, and dissemination.

"Amino" refers to the —NH2 radical.
"Cyano" refers to the —CN radical.
"Nitro" refers to the —NO2 radical.
"Oxa" refers to the —O— radical.
"Oxo" refers to the =O radical.
"Thioxo" refers to the =S radical.
"Imino" refers to the =N—H radical.
"Oximo" refers to the =N—OH radical.
"Hydrazino" refers to the =N—NH$_2$ radical.
"Alkyl" refers to a straight or branched hydrocarbon chain radical consisting solely of carbon and hydrogen atoms, containing no unsaturation, having from one to fifteen carbon atoms (e.g., $C_1$-$C_{15}$ alkyl). In certain embodiments, an alkyl comprises one to thirteen carbon atoms (e.g., $C_1$-$C_{13}$ alkyl). In certain embodiments, an alkyl comprises one to eight carbon atoms (e.g., $C_1$-$C_8$ alkyl). In other embodiments, an alkyl comprises one to five carbon atoms (e.g., $C_1$-$C_5$ alkyl). In other embodiments, an alkyl comprises one to four carbon atoms (e.g., $C_1$-$C_4$ alkyl). In other embodiments, an alkyl comprises one to three carbon atoms (e.g., $C_1$-$C_3$ alkyl). In other embodiments, an alkyl comprises one to two carbon atoms (e.g., $C_1$-$C_2$ alkyl). In other embodiments, an alkyl comprises one carbon atom (e.g., $C_1$ alkyl). In other embodiments, an alkyl comprises five to fifteen carbon atoms (e.g., $C_5$-$C_{15}$ alkyl). In other embodiments, an alkyl comprises five to eight carbon atoms (e.g., $C_5$-$C_8$ alkyl). In other embodiments, an alkyl comprises two to five carbon atoms (e.g., $C_2$-$C_5$ alkyl). In other embodiments, an alkyl comprises three to five carbon atoms (e.g., $C_3$-$C_5$ alkyl). In other embodiments, the alkyl group is selected from methyl, ethyl, 1-propyl (n-propyl), 1-methylethyl (iso-propyl), 1-butyl (n-butyl), 1-methylpropyl (sec-butyl), 2-methylpropyl (iso-butyl), 1,1-dimethylethyl (tert-butyl), 1-pentyl (n-pentyl). The alkyl is attached to the rest of the molecule by a single bond. Unless stated otherwise specifically in the specification, an alkyl group is optionally substituted by one or more of the following substituents: halo, cyano, nitro, oxo, thioxo, imino, oximo, trimethylsilanyl, —OR$^a$, —SR$^a$, —OC(O)—

$R^a$, —$N(R^a)_2$, —$C(O)R^a$, —$C(O)OR^a$, —$C(O)N(R^a)_2$, —$N(R^a)C(O)OR^a$, —$OC(O)$—$N(R^a)_2$, —$N(R^a)C(O)R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkoxy" or "alkoxyl" refers to a radical bonded through an oxygen atom of the formula —O-alkyl, where alkyl is an alkyl chain as defined above.

"Alkenyl" refers to a straight or branched hydrocarbon chain radical group consisting solely of carbon and hydrogen atoms, containing at least one carbon-carbon double bond, and having from two to twelve carbon atoms. In certain embodiments, an alkenyl comprises two to eight carbon atoms. In other embodiments, an alkenyl comprises two to four carbon atoms. The alkenyl is attached to the rest of the molecule by a single bond, for example, ethenyl (i.e., vinyl), prop-1-enyl (i.e., allyl), but-1-enyl, pent-1-enyl, penta-1,4-dienyl, and the like. Unless stated otherwise specifically in the specification, an alkenyl group is optionally substituted by one or more of the following substituents: halo, cyano, nitro, oxo, thioxo, imino, oximo, trimethylsilanyl, —$OR^a$, —$SR^a$, —$OC(O)$—$R^a$, —$N(R^a)_2$, —$C(O)R^a$, —$C(O)OR^a$, —$C(O)N(R^a)_2$, —$N(R^a)C(O)OR^a$, —$OC(O)$—$N(R^a)_2$, —$N(R^a)C(O)R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkynyl" refers to a straight or branched hydrocarbon chain radical group consisting solely of carbon and hydrogen atoms, containing at least one carbon-carbon triple bond, having from two to twelve carbon atoms. In certain embodiments, an alkynyl comprises two to eight carbon atoms. In other embodiments, an alkynyl comprises two to six carbon atoms. In other embodiments, an alkynyl comprises two to four carbon atoms. The alkynyl is attached to the rest of the molecule by a single bond, for example, ethynyl, propynyl, butynyl, pentynyl, hexynyl, and the like. Unless stated otherwise specifically in the specification, an alkynyl group is optionally substituted by one or more of the following substituents: halo, cyano, nitro, oxo, thioxo, imino, oximo, trimethylsilanyl, —$OR^a$, —$SR^a$, —$OC(O)$—$R^a$, —$N(R^a)_2$, —$C(O)R^a$, —$C(O)OR^a$, —$C(O)N(R^a)_2$, —$N(R^a)C(O)OR^a$, —$OC(O)$—$N(R^a)_2$, —$N(R^a)C(O)R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkylene" or "alkylene chain" refers to a straight or branched divalent hydrocarbon chain linking the rest of the molecule to a radical group, consisting solely of carbon and hydrogen, containing no unsaturation and having from one to twelve carbon atoms, for example, methylene, ethylene, propylene, n-butylene, and the like. The alkylene chain is attached to the rest of the molecule through a single bond and to the radical group through a single bond. The points of attachment of the alkylene chain to the rest of the molecule and to the radical group are through one carbon in the alkylene chain or through any two carbons within the chain. In certain embodiments, an alkylene comprises one to eight carbon atoms (e.g., $C_1$-$C_8$ alkylene). In other embodiments, an alkylene comprises one to five carbon atoms (e.g., $C_1$-$C_5$ alkylene). In other embodiments, an alkylene comprises one to four carbon atoms (e.g., $C_1$-$C_4$ alkylene). In other embodiments, an alkylene comprises one to three carbon atoms (e.g., $C_1$-$C_3$ alkylene). In other embodiments, an alkylene comprises one to two carbon atoms (e.g., $C_1$-$C_2$ alkylene). In other embodiments, an alkylene comprises one carbon atom (e.g., $C_1$ alkylene). In other embodiments, an alkylene comprises five to eight carbon atoms (e.g., $C_5$-$C_8$ alkylene). In other embodiments, an alkylene comprises two to five carbon atoms (e.g., $C_2$-$C_5$ alkylene). In other embodiments, an alkylene comprises three to five carbon atoms (e.g., $C_3$-$C_5$ alkylene). Unless stated otherwise specifically in the specification, an alkylene chain is optionally substituted by one or more of the following substituents: halo, cyano, nitro, oxo, thioxo, imino, oximo, trimethylsilanyl, —$OR^a$, —$SR^a$, —$OC(O)$—$R^a$, —$N(R^a)_2$, —$C(O)R^a$, —$C(O)OR^a$, —$C(O)N(R^a)_2$, —$N(R^a)C(O)OR^a$, —$OC(O)$—$N(R^a)_2$, —$N(R^a)C(O)R^a$, —$N(R^a)S(O)_tR^a$ (where t is 1 or 2), —$S(O)_tOR^a$ (where t is 1 or 2), —$S(O)_tR^a$ (where t is 1 or 2) and —$S(O)_tN(R^a)_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkenylene" or "alkenylene chain" refers to a straight or branched divalent hydrocarbon chain linking the rest of the molecule to a radical group, consisting solely of carbon and hydrogen, containing at least one carbon-carbon double bond, and having from two to twelve carbon atoms. The alkenylene chain is attached to the rest of the molecule through a single bond and to the radical group through a single bond. In certain embodiments, an alkenylene comprises two to eight carbon atoms (e.g., $C_2$-$C_8$ alkenylene). In other embodiments, an alkenylene comprises two to five carbon atoms (e.g., $C_2$-$C_5$ alkenylene). In other embodiments, an alkenylene comprises two to four carbon atoms (e.g., $C_2$-$C_4$ alkenylene). In other embodiments, an alkenylene comprises two to three carbon atoms (e.g., $C_2$-$C_3$ alkenylene). In other embodiments, an alkenylene comprises five to eight carbon atoms (e.g., $C_5$-$C_8$ alkenylene). In other embodiments, an alkenylene comprises two to five carbon atoms (e.g., $C_2$-$C_5$ alkenylene). In other embodiments, an alkenylene comprises three to five carbon atoms (e.g., $C_3$-$C_5$ alkenylene). Unless stated otherwise specifically in the specification, an alkenylene chain is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)O$R^a$, —C(O)N($R^a$)$_2$, —N($R^a$)C(O)O$R^a$, —OC(O)—N($R^a$)$_2$, —N($R^a$)C(O)$R^a$, —N($R^a$)S(O)$_t$$R^a$ (where t is 1 or 2), —S(O)$_t$O$R^a$ (where t is 1 or 2), —S(O)$_t$$R^a$ (where t is 1 or 2) and —S(O)$_t$N($R^a$)$_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Alkynylene" or "alkynylene chain" refers to a straight or branched divalent hydrocarbon chain linking the rest of the molecule to a radical group, consisting solely of carbon and hydrogen, containing at least one carbon-carbon triple bond, and having from two to twelve carbon atoms. The alkynylene chain is attached to the rest of the molecule through a single bond and to the radical group through a single bond. In certain embodiments, an alkynylene comprises two to eight carbon atoms (e.g., $C_2$-$C_8$ alkynylene). In other embodiments, an alkynylene comprises two to five carbon atoms (e.g., $C_2$-$C_5$ alkynylene). In other embodiments, an alkynylene comprises two to four carbon atoms (e.g., $C_2$-$C_4$ alkynylene). In other embodiments, an alkynylene comprises two to three carbon atoms (e.g., $C_2$-$C_3$ alkynylene). In other embodiments, an alkynylene comprises two carbon atom (e.g., $C_2$ alkylene). In other embodiments, an alkynylene comprises five to eight carbon atoms (e.g., $C_5$-$C_8$ alkynylene). In other embodiments, an alkynylene comprises three to five carbon atoms (e.g., $C_3$-$C_5$ alkynylene). Unless stated otherwise specifically in the specification, an alkynylene chain is optionally substituted by one or more of the following substituents: halo, cyano, nitro, oxo, thioxo, imino, oximo, trimethylsilanyl, —$OR^a$, —$SR^a$, —OC(O)—$R^a$, —$N(R^a)_2$, —C(O)$R^a$, —C(O)O$R^a$, —C(O)N($R^a$)$_2$, —N($R^a$)C(O)O$R^a$, —OC(O)—N($R^a$)$_2$, —N($R^a$)C(O)$R^a$, —N($R^a$)S(O)$_t$$R^a$ (where t is 1 or 2), —S(O)$_t$O$R^a$ (where t is 1 or 2), —S(O)$_t$$R^a$ (where t is 1 or 2) and —S(O)$_t$N($R^a$)$_2$ (where t is 1 or 2) where each $R^a$ is independently hydrogen, alkyl (optionally substituted with halogen, hydroxy, methoxy, or trifluoromethyl), fluoroalkyl, carbocyclyl (optionally substituted with halogen, hydroxy, methoxy, or trifluoromethyl), carbocyclylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl).

"Aryl" refers to a radical derived from an aromatic monocyclic or multicyclic hydrocarbon ring system by removing a hydrogen atom from a ring carbon atom. The aromatic monocyclic or multicyclic hydrocarbon ring system contains only hydrogen and carbon from five to eighteen carbon atoms, where at least one of the rings in the ring system is fully unsaturated, i.e., it contains a cyclic, delocalized (4n+2) π-electron system in accordance with the Hickel theory. The ring system from which aryl groups are derived include, but are not limited to, groups such as benzene, fluorene, indane, indene, tetralin and naphthalene. Unless stated otherwise specifically in the specification, the term "aryl" or the prefix "ar-" (such as in "aralkyl") is meant to include aryl radicals optionally substituted by one or more substituents independently selected from alkyl, alkenyl, alkynyl, halo, fluoroalkyl, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, —$R^b$—$OR^a$, —$R^b$—OC(O)—$R^a$, $-R^b-OC(O)-OR^a$, $-R^b-OC(O)-N(R^a)_2$, $-R^b-N(R^a)_2$, $-R^b-C(O)R^a$, $-R^b-C(O)OR^a$, $-R^b-C(O)N(R^a)_2$, $-R^b-O-R^c-C(O)N(R^a)_2$, $-R^b-N(R^a)C(O)OR^a$, $-R^b-N(R^a)C(O)R^a$, $-R^b-N(R^a)S(O)_tR^a$ (where t is 1 or 2), $-R^b-S(O)_tR^a$ (where t is 1 or 2), $-R^b-S(O)_tOR^a$ (where t is 1 or 2) and $-R^b-S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"Aralkyl" refers to a radical of the formula $-R^c$-aryl where $R^c$ is an alkylene chain as defined above, for example, methylene, ethylene, and the like. The alkylene chain part of the aralkyl radical is optionally substituted as described above for an alkylene chain. The aryl part of the aralkyl radical is optionally substituted as described above for an aryl group.

"Aralkenyl" refers to a radical of the formula $-R^d$-aryl where $R^d$ is an alkenylene chain as defined above. The aryl part of the aralkenyl radical is optionally substituted as described above for an aryl group. The alkenylene chain part of the aralkenyl radical is optionally substituted as defined above for an alkenylene group.

"Aralkynyl" refers to a radical of the formula $-R^e$-aryl, where $R^e$ is an alkynylene chain as defined above. The aryl part of the aralkynyl radical is optionally substituted as described above for an aryl group. The alkynylene chain part of the aralkynyl radical is optionally substituted as defined above for an alkynylene chain.

"Aralkoxy" refers to a radical bonded through an oxygen atom of the formula $-O-R^c$-aryl where $R^c$ is an alkylene chain as defined above, for example, methylene, ethylene, and the like. The alkylene chain part of the aralkyl radical is optionally substituted as described above for an alkylene chain. The aryl part of the aralkyl radical is optionally substituted as described above for an aryl group.

"Carbocyclyl" refers to a stable non-aromatic monocyclic or polycyclic hydrocarbon radical consisting solely of carbon and hydrogen atoms, which includes fused or bridged ring systems, having from three to fifteen carbon atoms. In certain embodiments, a carbocyclyl comprises three to ten carbon atoms. In other embodiments, a carbocyclyl comprises five to seven carbon atoms. The carbocyclyl is attached to the rest of the molecule by a single bond. Carbocyclyl is saturated (i.e., containing single C—C bonds only) or unsaturated (i.e., containing one or more double bonds or triple bonds). A fully saturated carbocyclyl radical is also referred to as "cycloalkyl." Examples of monocyclic cycloalkyls include, e.g., cyclopropyl, cyclobutyl, cyclopentyl, cyclohexyl, cycloheptyl, and cyclooctyl. An unsaturated carbocyclyl is also referred to as "cycloalkenyl." Examples of monocyclic cycloalkenyls include, e.g., cyclopentenyl, cyclohexenyl, cycloheptenyl, and cyclooctenyl. Polycyclic carbocyclyl radicals include, for example, adamantyl, norbornyl (i.e., bicyclo[2.2.1]heptanyl), norbornenyl, decalinyl, 7,7-dimethyl-bicyclo[2.2.1]heptanyl, and the like. Unless otherwise stated specifically in the specification, the term "carbocyclyl" is meant to include carbocyclyl radicals that are optionally substituted by one or more substituents independently selected from alkyl, alkenyl, alkynyl, halo, fluoroalkyl, oxo, thioxo, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, $-R^b-OR^a$, $-R^b-OC(O)-R^a$, $-R^b-OC(O)-OR^a$, $-R^b-OC(O)-N(R^a)_2$, $-R^b-N(R^a)_2$, $-R^b-C(O)R^a$, $-R^b-C(O)OR^a$, $-R^b-C(O)N(R^a)_2$, $-R^b-O-R^c-C(O)N(R^a)_2$, $-R^b-N(R^a)C(O)OR^a$, $-R^b-N(R^a)C(O)R^a$, $-R^b-N(R^a)S(O)_tR^a$ (where t is 1 or 2), $-R^b-S(O)_tR^a$ (where t is 1 or 2), $-R^b-S(O)_tOR^a$ (where t is 1 or 2) and $-R^b-S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"Carbocyclylalkyl" refers to a radical of the formula $-R^c$-carbocyclyl where $R^c$ is an alkylene chain as defined above. The alkylene chain and the carbocyclyl radical are optionally substituted as defined above.

"Carbocyclylalkynyl" refers to a radical of the formula $-R^c$-carbocyclyl where $R^c$ is an alkynylene chain as defined above. The alkynylene chain and the carbocyclyl radical are optionally substituted as defined above.

"Carbocyclylalkoxy" refers to a radical bonded through an oxygen atom of the formula $-O-R^c$-carbocyclyl where $R^c$ is an alkylene chain as defined above. The alkylene chain and the carbocyclyl radical are optionally substituted as defined above.

As used herein, "carboxylic acid bioisostere" refers to a functional group or moiety that exhibits similar physical, biological and/or chemical properties as a carboxylic acid moiety. Examples of carboxylic acid bioisosteres include, but are not limited to,

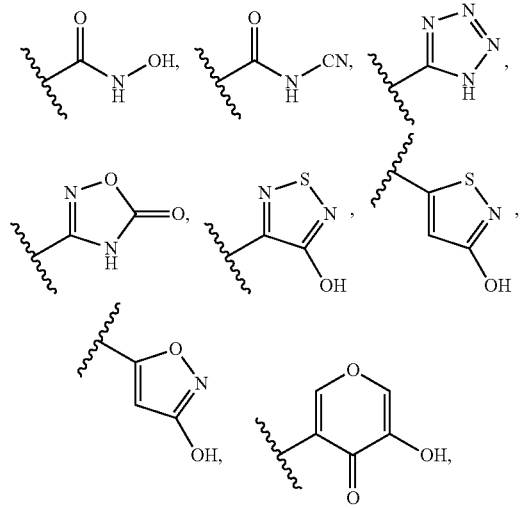

and the like.

"Halo" or "halogen" refers to bromo, chloro, fluoro or iodo substituents.

"Fluoroalkyl" refers to an alkyl radical, as defined above, that is substituted by one or more fluoro radicals, as defined above, for example, trifluoromethyl, difluoromethyl, fluoromethyl, 2,2,2-trifluoroethyl, 1-fluoromethyl-2-fluoroethyl, and the like. In some embodiments, the alkyl part of the fluoroalkyl radical is optionally substituted as defined above for an alkyl group.

"Heterocyclyl" refers to a stable 3- to 18-membered non-aromatic ring radical that comprises two to twelve carbon atoms and from one to six heteroatoms selected from nitrogen, oxygen and sulfur. Unless stated otherwise specifically in the specification, the heterocyclyl radical is a monocyclic, bicyclic, tricyclic or tetracyclic ring system, which optionally includes fused or bridged ring systems. The heteroatoms in the heterocyclyl radical are optionally oxidized. One or more nitrogen atoms, if present, are optionally quaternized. The heterocyclyl radical is partially or fully saturated. The heterocyclyl is attached to the rest of the molecule through any atom of the ring(s). Examples of such heterocyclyl radicals include, but are not limited to, dioxolanyl, thienyl[1,3]dithianyl, decahydroisoquinolyl, imidazolinyl, imidazolidinyl, isothiazolidinyl, isoxazolidinyl, morpholinyl, octahydroindolyl, octahydroisoindolyl, 2-oxopiperazinyl, 2-oxopiperidinyl, 2-oxopyrrolidinyl, oxazolidinyl, piperidinyl, piperazinyl, 4-piperidonyl, pyrrolidinyl, pyrazolidinyl, quinuclidinyl, thiazolidinyl, tetrahydrofuryl, trithianyl, tetrahydropyranyl, thiomorpholinyl, thiamorpholinyl, 1-oxo-thiomorpholinyl, and 1,1-dioxo-thiomorpholinyl. Unless stated otherwise specifically in the specification, the term "heterocyclyl" is meant to include heterocyclyl radicals as defined above that are optionally substituted by one or more substituents selected from alkyl, alkenyl, alkynyl, halo, fluoroalkyl, oxo, thioxo, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, —$R^b$—$OR^a$, —$R^b$—OC(O)—$R^a$, —$R^b$—OC(O)—$OR^a$, —$R^b$—OC(O)—N($R^a$)$_2$, —$R^b$—N($R^a$)$_2$, —$R^b$—C(O)$R^a$, —$R^b$—C(O)$OR^a$, —$R^b$—C(O)N($R^a$)$_2$, —$R^b$—O—$R^c$—C(O)N($R^a$)$_2$, —$R^b$—N($R^a$)C(O)$OR^a$, —$R^b$—N($R^a$)C(O)$R^a$, —$R^b$—N($R^a$)S(O)$_t$$R^a$ (where t is 1 or 2), —$R^b$—S(O)$_t$$R^a$ (where t is 1 or 2), —$R^b$—S(O)$_t$$OR^a$ (where t is 1 or 2) and —$R^b$—S(O)$_t$N($R^a$)$_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"N-heterocyclyl" or "N-attached heterocyclyl" refers to a heterocyclyl radical as defined above containing at least one nitrogen and where the point of attachment of the heterocyclyl radical to the rest of the molecule is through a nitrogen atom in the heterocyclyl radical. An N-heterocyclyl radical is optionally substituted as described above for heterocyclyl radicals. Examples of such N-heterocyclyl radicals include, but are not limited to, 1-morpholinyl, 1-piperidinyl, 1-piperazinyl, 1-pyrrolidinyl, pyrazolidinyl, imidazolinyl, and imidazolidinyl.

"C-heterocyclyl" or "C-attached heterocyclyl" refers to a heterocyclyl radical as defined above containing at least one heteroatom and where the point of attachment of the heterocyclyl radical to the rest of the molecule is through a carbon atom in the heterocyclyl radical. A C-heterocyclyl radical is optionally substituted as described above for heterocyclyl radicals. Examples of such C-heterocyclyl radicals include, but are not limited to, 2-morpholinyl, 2- or 3- or 4-piperidinyl, 2-piperazinyl, 2- or 3-pyrrolidinyl, and the like.

"Heterocyclylalkyl" refers to a radical of the formula —$R^c$-heterocyclyl where $R^c$ is an alkylene chain as defined above. If the heterocyclyl is a nitrogen-containing heterocyclyl, the heterocyclyl is optionally attached to the alkyl radical at the nitrogen atom. The alkylene chain of the heterocyclylalkyl radical is optionally substituted as defined above for an alkylene chain. The heterocyclyl part of the heterocyclylalkyl radical is optionally substituted as defined above for a heterocyclyl group.

"Heterocyclylalkoxy" refers to a radical bonded through an oxygen atom of the formula —O—$R^c$-heterocyclyl where $R^c$ is an alkylene chain as defined above. If the heterocyclyl is a nitrogen-containing heterocyclyl, the heterocyclyl is optionally attached to the alkyl radical at the nitrogen atom. The alkylene chain of the heterocyclylalkoxy radical is optionally substituted as defined above for an alkylene chain. The heterocyclyl part of the heterocyclylalkoxy radical is optionally substituted as defined above for a heterocyclyl group.

"Heteroaryl" refers to a radical derived from a 3- to 18-membered aromatic ring radical that comprises two to seventeen carbon atoms and from one to six heteroatoms selected from nitrogen, oxygen and sulfur. As used herein, the heteroaryl radical is a monocyclic, bicyclic, tricyclic or tetracyclic ring system, wherein at least one of the rings in the ring system is fully unsaturated, i.e., it contains a cyclic, delocalized (4n+2) π-electron system in accordance with the Hückel theory. Heteroaryl includes fused or bridged ring systems. The heteroatom(s) in the heteroaryl radical is optionally oxidized. One or more nitrogen atoms, if present, are optionally quaternized. The heteroaryl is attached to the rest of the molecule through any atom of the ring(s). Examples of heteroaryls include, but are not limited to, azepinyl, acridinyl, benzimidazolyl, benzindolyl, 1,3-benzodioxolyl, benzofuranyl, benzooxazolyl, benzo[d]thiazolyl, benzothiadiazolyl, benzo[b][1,4]dioxepinyl, benzo[b][1,4]oxazinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzothieno[3,2-d]pyrimidinyl, benzotriazolyl, benzo[4,6]imidazo[1,2-a]pyridinyl, carbazolyl, cinnolinyl, cyclopenta[d]pyrimidinyl, 6,7-dihydro-5H-cyclopenta[4,5]thieno[2,3-d]pyrimidinyl, 5,6-dihydrobenzo[h]quinazolinyl, 5,6-dihydrobenzo[h]cinnolinyl, 6,7-dihydro-5H-benzo[6,7]cyclohepta[1,2-c]pyridazinyl, dibenzofuranyl, dibenzothiophenyl, furanyl, furanonyl, furo[3,2-c]pyridinyl, 5,6,7,8,9,10-hexahydrocycloocta[d]pyrimidinyl, 5,6,7,8,9,10-hexahydrocycloocta[d]pyridazinyl, 5,6,7,8,9,10-hexahydrocycloocta[d]pyridinyl, isothiazolyl, imidazolyl, indazolyl, indolyl, indazolyl, isoindolyl, indolinyl, isoindolinyl, isoquinolyl, indolizinyl, isoxazolyl, 5,8-methano-5,6,7,8-tetrahydroquinazolinyl, naphthyridinyl, 1,6-naphthyridinonyl, oxadiazolyl, 2-oxoazepinyl, oxazolyl, oxiranyl, 5,6,6a,7,8,9,10,10a-octahydrobenzo[h]quinazolinyl, 1-phenyl-1H-pyrrolyl, phenazinyl, phenothiazinyl, phenoxazinyl, phthalazinyl, pteridinyl, purinyl, pyrrolyl, pyrazolyl, pyrazolo[3,4-d]pyrimidinyl, pyridinyl, pyrido[3,2-d]pyrimidinyl, pyrido[3,4-d]pyrimidinyl, pyrazinyl, pyrimidinyl, pyridazinyl, pyrrolyl, quinazolinyl, quinoxalinyl, quinolinyl, isoquinolinyl, tetrahydroquinolinyl, 5,6,7,8-tetrahydroquinazolinyl, 5,6,7,8-tetrahydrobenzo[4,5]thieno[2,3-d]pyrimidinyl, 6,7,8,9-tetrahydro-5H-cyclohepta[4,5]thieno[2,3-d]pyrimidinyl, 5,6,7,8-tetrahydropyrido[4,5-c]pyridazinyl, thiazolyl, thiadiazolyl, triazolyl, tetrazolyl, triazinyl, thieno[2,3-d]pyrimidinyl, thieno[3,2-d]pyrimidinyl, thieno[2,3-c]pridinyl, and thiophenyl (i.e. thienyl). Unless stated otherwise specifically in the specification, the term "heteroaryl" is meant to include heteroaryl radicals as defined above which are optionally substituted by one or more substituents selected from alkyl, alkenyl, alkynyl, halo, fluoroalkyl, haloalkenyl, haloalkynyl, oxo, thioxo, cyano, nitro, optionally substituted aryl, optionally substituted aralkyl, optionally substituted aralkenyl, optionally substituted aralkynyl, optionally substituted carbocyclyl, optionally substituted carbocyclylalkyl, optionally substituted heterocyclyl, optionally substituted heterocyclylalkyl, optionally substituted heteroaryl, optionally substituted heteroarylalkyl, $-R^b-OR^a$, $-R^b-OC(O)-R^a$, $-R^b-OC(O)-OR^a$, $-R^b-OC(O)-N(R^a)_2$, $-R^b-N(R^a)_2$, $-R^b-C(O)R^a$, $-R^b-C(O)OR^a$, $-R^b-C(O)N(R^a)_2$, $-R^b-O-R^c-C(O)N(R^a)_2$, $-R^b-N(R^a)C(O)OR^a$, $-R^b-N(R^a)C(O)R^a$, $-R^b-N(R^a)S(O)_tR^a$ (where t is 1 or 2), $-R^b-S(O)_tR^a$ (where t is 1 or 2), $-R^b-S(O)_tOR^a$ (where t is 1 or 2) and $-R^b-S(O)_tN(R^a)_2$ (where t is 1 or 2), where each $R^a$ is independently hydrogen, alkyl (optionally substituted with halogen, hydroxy, methoxy, or trifluoromethyl), fluoroalkyl, cycloalkyl (optionally substituted with halogen, hydroxy, methoxy, or trifluoromethyl), cycloalkylalkyl (optionally substituted with halogen, hydroxy, methoxy, or trifluoromethyl), aryl (optionally substituted with halogen, hydroxy, methoxy, or trifluoromethyl), aralkyl (optionally substituted with halogen, hydroxy, methoxy, or trifluoromethyl), heterocyclyl (optionally substituted with halogen, hydroxy, methoxy, or trifluoromethyl), heterocyclylalkyl (optionally substituted with halogen, hydroxy, methoxy, or trifluoromethyl), heteroaryl (optionally substituted with halogen, hydroxy, methoxy, or trifluoromethyl), or heteroarylalkyl (optionally substituted with halogen, hydroxy, methoxy, or trifluoromethyl), each $R^b$ is independently a direct bond or a straight or branched alkylene or alkenylene chain, and $R^c$ is a straight or branched alkylene or alkenylene chain, and where each of the above substituents is unsubstituted unless otherwise indicated.

"N-heteroaryl" refers to a heteroaryl radical as defined above containing at least one nitrogen and where the point of attachment of the heteroaryl radical to the rest of the molecule is through a nitrogen atom in the heteroaryl radical. An N-heteroaryl radical is optionally substituted as described above for heteroaryl radicals.

"C-heteroaryl" refers to a heteroaryl radical as defined above and where the point of attachment of the heteroaryl radical to the rest of the molecule is through a carbon atom in the heteroaryl radical. A C-heteroaryl radical is optionally substituted as described above for heteroaryl radicals.

"Heteroarylalkyl" refers to a radical of the formula $-R^c$-heteroaryl, where $R^c$ is an alkylene chain as defined above. If the heteroaryl is a nitrogen-containing heteroaryl, the heteroaryl is optionally attached to the alkyl radical at the nitrogen atom. The alkylene chain of the heteroarylalkyl radical is optionally substituted as defined above for an alkylene chain. The heteroaryl part of the heteroarylalkyl radical is optionally substituted as defined above for a heteroaryl group.

"Heteroarylalkoxy" refers to a radical bonded through an oxygen atom of the formula $-O-R^c$-heteroaryl, where $R^c$ is an alkylene chain as defined above. If the heteroaryl is a nitrogen-containing heteroaryl, the heteroaryl is optionally attached to the alkyl radical at the nitrogen atom. The alkylene chain of the heteroarylalkoxy radical is optionally substituted as defined above for an alkylene chain. The heteroaryl part of the heteroarylalkoxy radical is optionally substituted as defined above for a heteroaryl group.

The compounds disclosed herein, in some embodiments, contain one or more asymmetric centers and thus give rise to enantiomers, diastereomers, and other stereoisomeric forms that are defined, in terms of absolute stereochemistry, as (R)- or (S)-. Unless stated otherwise, it is intended that all stereoisomeric forms of the compounds disclosed herein are contemplated by this disclosure. When the compounds described herein contain alkene double bonds, and unless specified otherwise, it is intended that this disclosure includes both E and Z geometric isomers (e.g., cis or trans.) Likewise, all possible isomers, as well as their racemic and optically pure forms, and all tautomeric forms are also intended to be included. The term "geometric isomer" refers to E or Z geometric isomers (e.g., cis or trans) of an alkene double bond. The term "positional isomer" refers to structural isomers around a central ring, such as ortho-, meta-, and para-isomers around a benzene ring.

A "tautomer" refers to a molecule wherein a proton shift from one atom of a molecule to another atom of the same molecule is possible. The compounds presented herein, in certain embodiments, exist as tautomers. In circumstances where tautomerization is possible, a chemical equilibrium of the tautomers will exist. The exact ratio of the tautomers depends on several factors, including physical state, temperature, solvent, and pH. Some examples of tautomeric equilibrium include:

in the content of $^2$H, $^3$H, $^{11}$C, $^{13}$C and/or $^{14}$C. In one particular embodiment, the compound is deuterated in at least one position. Such deuterated forms can be made by the procedure described in U.S. Pat. Nos. 5,846,514 and 6,334,997. As described in U.S. Pat. Nos. 5,846,514 and 6,334,997, deuteration can improve the metabolic stability and or efficacy, thus increasing the duration of action of drugs.

Unless otherwise stated, structures depicted herein are intended to include compounds which differ only in the presence of one or more isotopically enriched atoms. For example, compounds having the present structures except for the replacement of a hydrogen by a deuterium or tritium, or the replacement of a carbon by $^{13}$C- or $^{14}$C-enriched carbon are within the scope of the present disclosure.

The compounds of the present disclosure optionally contain unnatural proportions of atomic isotopes at one or more atoms that constitute such compounds. For example, the compounds may be labeled with isotopes, such as for example, deuterium ($^2$H), tritium ($^3$H), iodine-125 ($^{125}$I) or carbon-14 ($^{14}$C). Isotopic substitution with $^2$H, $^{11}$C, $^{13}$C, $^{14}$C, $^{15}$C, $^{12}$N, $^{13}$N, $^{15}$N, $^{16}$N, $^{16}$O, $^{17}$O, $^{14}$F, $^{15}$F, $^{16}$F, $^{17}$F, $^{18}$F, $^{33}$S, $^{34}$S, $^{35}$S, $^{36}$S, $^{35}$Cl, $^{37}$Cl, $^{79}$Br, $^{81}$Br, $^{125}$I are all contemplated. All isotopic variations of the compounds of the

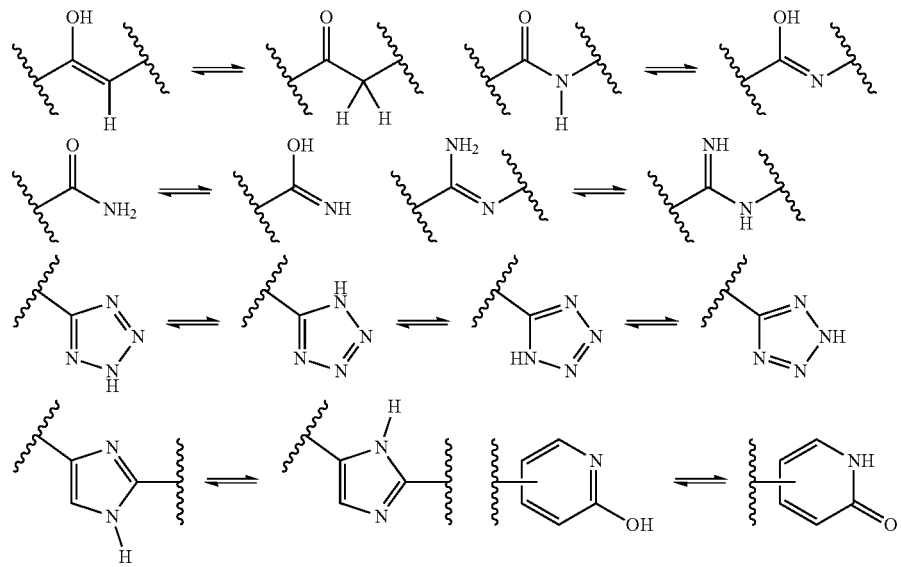

In some instances, the heterocyclic LpxC inhibitory compounds disclosed herein exist in tautomeric forms. The structures of said compounds are illustrated in the one tautomeric form for clarity. The alternative tautomeric forms are expressly included in this disclosure, such as, for example, the structures illustrated below.

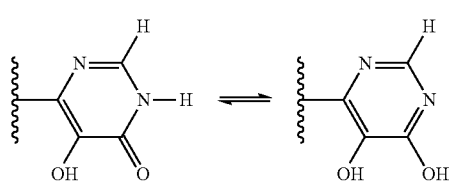 [SMILES: *c1nc[nH]c(=O)c1O ; *c1ncnc(O)c1O]

The compounds disclosed herein, in some embodiments, are used in different enriched isotopic forms, e.g., enriched present invention, whether radioactive or not, are encompassed within the scope of the present invention.

In certain embodiments, the compounds disclosed herein have some or all of the $^1$H atoms replaced with $^2$H atoms. The methods of synthesis for deuterium-containing compounds are known in the art and include, by way of non-limiting example only, the following synthetic methods.

Deuterium substituted compounds are synthesized using various methods such as described in: Dean, Dennis C.; Editor. Recent Advances in the Synthesis and Applications of Radiolabeled Compounds for Drug Discovery and Development. [In: Curr., Pharm. Des., 2000; 6(10)]2000, 110 pp; George W.; Varma, Rajender S. The Synthesis of Radiolabeled Compounds via Organometallic Intermediates, Tetrahedron, 1989, 45(21), 6601-21; and Evans, E. Anthony. Synthesis of radiolabeled compounds, J. Radioanal. Chem., 1981, 64(1-2), 9-32.

Deuterated starting materials are readily available and are subjected to the synthetic methods described herein to provide for the synthesis of deuterium-containing compounds. Large numbers of deuterium-containing reagents and building blocks are available commercially from chemical vendors, such as Aldrich Chemical Co.

Deuterium-transfer reagents suitable for use in nucleophilic substitution reactions, such as iodomethane-$d_3$ ($CD_3I$), are readily available and may be employed to transfer a deuterium-substituted carbon atom under nucleophilic substitution reaction conditions to the reaction substrate. The use of $CD_3I$ is illustrated, by way of example only, in the reaction schemes below.

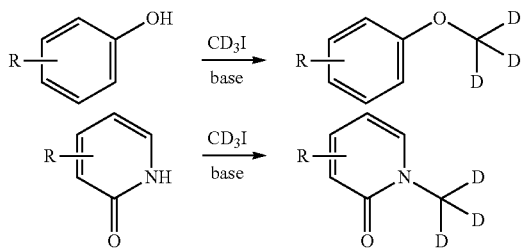

Deuterium-transfer reagents, such as lithium aluminum deuteride ($LiAlD_4$), are employed to transfer deuterium under reducing conditions to the reaction substrate. The use of $LiAlD_4$ is illustrated, by way of example only, in the reaction schemes below.

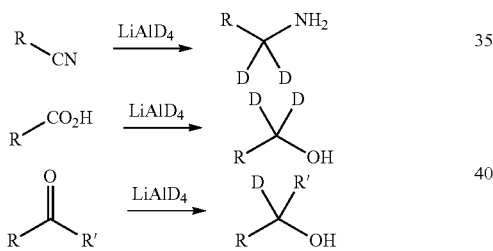

Deuterium gas and palladium catalyst are employed to reduce unsaturated carbon-carbon linkages and to perform a reductive substitution of aryl carbon-halogen bonds as illustrated, by way of example only, in the reaction schemes below.

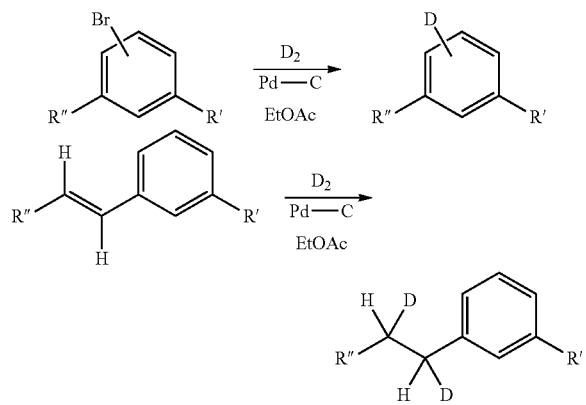

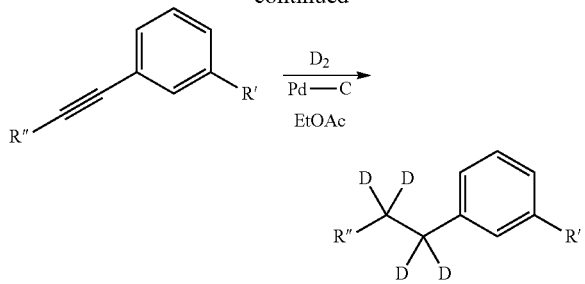

"Pharmaceutically acceptable salt" includes both acid and base addition salts. A pharmaceutically acceptable salt of any one of the heterocyclic LpxC inhibitory compounds described herein is intended to encompass any and all pharmaceutically suitable salt forms. Preferred pharmaceutically acceptable salts of the compounds described herein are pharmaceutically acceptable acid addition salts and pharmaceutically acceptable base addition salts.

"Pharmaceutically acceptable acid addition salt" refers to those salts which retain the biological effectiveness and properties of the free bases, which are not biologically or otherwise undesirable, and which are formed with inorganic acids such as hydrochloric acid, hydrobromic acid, sulfuric acid, nitric acid, phosphoric acid, hydroiodic acid, hydrofluoric acid, phosphorous acid, and the like. Also included are salts that are formed with organic acids such as aliphatic mono- and dicarboxylic acids, phenyl-substituted alkanoic acids, hydroxy alkanoic acids, alkanedioic acids, aromatic acids, aliphatic and, aromatic sulfonic acids, etc. and include, for example, acetic acid, trifluoroacetic acid, propionic acid, glycolic acid, pyruvic acid, oxalic acid, maleic acid, malonic acid, succinic acid, fumaric acid, tartaric acid, citric acid, benzoic acid, cinnamic acid, mandelic acid, methanesulfonic acid, ethanesulfonic acid, p-toluenesulfonic acid, salicylic acid, and the like. Exemplary salts thus include sulfates, pyrosulfates, bisulfates, sulfites, bisulfites, nitrates, phosphates, monohydrogenphosphates, dihydrogenphosphates, metaphosphates, pyrophosphates, chlorides, bromides, iodides, acetates, trifluoroacetates, propionates, caprylates, isobutyrates, oxalates, malonates, succinate suberates, sebacates, fumarates, maleates, mandelates, benzoates, chlorobenzoates, methylbenzoates, dinitrobenzoates, phthalates, benzenesulfonates, toluenesulfonates, phenylacetates, citrates, lactates, malates, tartrates, methanesulfonates, and the like. Also contemplated are salts of amino acids, such as arginates, gluconates, and galacturonates (see, for example, Berge S. M. et al., "Pharmaceutical Salts," *Journal of Pharmaceutical Science*, 66:1-19 (1997)). Acid addition salts of basic compounds am, in some embodiments, prepared by contacting the free base forms with a sufficient amount of the desired acid to produce the salt according to methods and techniques with which a skilled artisan is familiar.

"Pharmaceutically acceptable base addition salt" refers to those salts that retain the biological effectiveness and properties of the free acids, which are not biologically or otherwise undesirable. These salts are prepared from addition of an inorganic base or an organic base to the free acid. Pharmaceutically acceptable base addition salts are, in some embodiments, formed with metals or amines, such as alkali and alkaline earth metals or organic amines. Salts derived from inorganic bases include, but are not limited to, sodium, potassium, lithium, ammonium, calcium, magnesium, iron, zinc, copper, manganese, aluminum salts and the like. Salts derived from organic bases include, but are not limited to, salts of primary, secondary, and tertiary amines, substituted amines including naturally occurring substituted amines, cyclic amines and basic ion exchange resins, for example, isopropylamine, trimethylamine, diethylamine, triethylamine, tripropylamine, ethanolamine, diethanolamine, 2-dimethylaminoethanol, 2-diethylaminoethanol, dicyclohexylamine, lysine, arginine, histidine, caffeine, procaine, N,N-dibenzylethylenediamine, chloroprocaine, hydrabamine, choline, betaine, ethylenediamine, ethylenedianiline, N-methylglucamine, glucosamine, methylglucamine, theobromine, purines, piperazine, piperidine, N-ethylpiperidine, polyamine resins and the like. See Berge et al., supra.

In an aspect, the present disclosure provides a method of potentiating immunity of a subject in need thereof, comprising administering (e.g., systemically administering) a PTPN2 inhibitor to the subject, thereby to potentiate immunity of the subject.

In another aspect, the present disclosure provides a method of potentiating immunity of a subject in need thereof, comprising transiently downregulating expression or activity of PTPN2 in vivo in a cell of the subject, thereby to potentiate immunity of the subject.

In another aspect, the present disclosure provides a method of potentiating immunity of a subject in need thereof, comprising (a) selecting the subject, wherein a cell of the subject exhibits expression or activity of PTPN2; and (b) downregulating the expression or activity of PTPN2 in a cell of the subject, thereby to potentiate immunity of the subject.

In another aspect, the present disclosure provides a method of potentiating immunity of a subject in need thereof, comprising (a) administering a lymphoid cell to the subject, wherein the lymphoid cell comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen; and (b) separately administering a PTPN2 inhibitor to the subject, thereby to potentiate immunity of the subject.

In another aspect, the present disclosure provides a method of potentiating immunity of a cell, comprising (a) contacting the cell with a PTPN2 inhibitor; and (b) introducing to the cell (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen, thereby to potentiate immunity of the cell, wherein (a) is performed prior to or concurrent with (b), thereby to potentiate immunity of the cell.

In another aspect, the present disclosure provides a method of increasing efficacy or reducing side effect of a cell therapy for a subject in need thereof, comprising (a) administering to the subject a cell comprising a chimeric antigen receptor (CAR) sequence encoding a CAR, wherein the CAR comprises an antigen-binding domain and an intracellular signaling domain, wherein the intracellular signaling domain is minimally required for activation of the CAR upon binding to an antigen; and (b) administering a PTNP2 inhibitor to said subject prior to, concurrent with, or subsequent to (a).

In another aspect, the present disclosure provides a method of increasing efficacy or reducing side effect of a cell therapy for a subject in need thereof, comprising (a) administering to the subject a sub-therapeutic amount of a cell comprising a chimeric antigen receptor (CAR) sequence encoding a CAR, and (b) administering a PTNP2 inhibitor to said subject prior to, concurrent with, or subsequent to (a).

In another aspect, the present disclosure provides a method of treating cancer in a subject in need thereof, comprising: (a) administering systemically a small molecule PTPN2 inhibitor to the subject; and (b) administering a second agent or a second therapy concurrently, before, or after step (a), wherein the second agent or the second therapy comprises a lymphoid cell that (1) retains expression or activity of PTPN2 prior to being exposed to the small molecule PTPN2 inhibitor, and (2) expresses (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to a tumor antigen. In some embodiments, the second agent or the second therapy comprises a lymphoid cell that (1) retains expression or activity of PTPN2 prior to being exposed to the PTPN2 inhibitor, and (2) expresses a chimeric antigen receptor (CAR) sequence encoding a CAR, wherein each of TFP and CAR exhibits specific binding to a tumor antigen. In some embodiments, the small molecule PTPN2 inhibitor is systemically and transiently administered to the subject in need thereof, wherein the second agent or the second therapy comprises a lymphoid cell that (1) retains expression or activity of PTPN2 prior to being exposed to the small molecule PTPN2 inhibitor, and (2) comprises a chimeric antigen receptor (CAR) sequence encoding a CAR, wherein the CAR exhibits specific binding to a tumor antigen.

In practicing any of the methods disclosed herein, a small molecule PTPN2 inhibitor may be systemically administered to a subject in need thereof. In contrast to conventional teaching that precludes the use of PTPN2 inhibitors for systemic therapy and the promotion of T cell mediated anti-tumor immunity (see, The EMBO Journal, Dec. 5, 2019, 39(2):e103637), the present disclosure provides, in an aspect, a systemic application of a small molecule PTPN2 inhibitor, which mediates regulatable inhibition of PTPN2 signaling. Distinguished from the conventional approach that resorts to cell-specific knock-out of PTPN2 (e.g., utilizing CAR-T cells whose PTPN2 expression is knocked out or knocked down), the present disclosure, in an aspect, demonstrates the utility of direct and systemic use of small molecule PTPN2 inhibitor in potentiating an immune response in a subject. Such approach obviates the needs of separately modifying a therapeutic cell by knocking out its PTPN2 gene expression. In some embodiments, small molecule PTPN2 inhibitors exemplified herein potentiate the tumor cell killing activity of CAR- and TFP-expressing immune cells. In some embodiments, such activity is effective and regulatable in that (1) the enhanced tumor cell killing activity of the CAR-T cells persisted for some period of time even after ceasing the application of the small molecule PTPN2 inhibitor; and/or (2) the enhanced tumor cell killing activity of the CAR-T cells is attenuated by intermittent or non-continuous application of the small molecule inhibitor. See Examples 7 and 11. The systemic and transient administration of small molecule PTPN2 inhibitors in conjunction with a cell therapy (e.g., CAR- or TFP-expressing lymphoid cells directed to a tumor antigen) can be particularly advantageous in avoiding autoreactivity, cytokine release syndrome, and/or other undesired inflammation associated with constitutive or permanent suppression of PTPN2. In some embodiments, a small molecule PTPN2 inhibitor for systemic and transient application is a compound of a formula selected the group consisting of Formula A, Formula B, Formula C, Formula Z, Formula (I), Formula (I-A), Formula (I-A1), Formula (I-B), Formula (I-B1), and Formula (I-B2). In some embodiments, a small molecule PTPN2 inhibitor for systemic and transient application is Compound A having a structure of Formula Z. In some embodiments, a small molecule PTPN2 inhibitor for systemic and transient application is Compound B having a structure of Formula (I-A), Compound C having a structure of Formula (I-A), Compound D having a structure of Formula (I-B), or Compound E having a structure of Formula (I-B). In some embodiments, a small molecule PTPN2 inhibitor for systemic and transient application is a compound of Formula (I-A1). In some embodiments, a small molecule PTPN2 inhibitor for systemic and transient application is a compound of Formula (I-B1).

In some embodiments, the small molecule PTPN2 inhibitor for systemic and transient application exhibits $IC_{50}$ of less than or equal to 10 µM, 5 µM, 1 µM, 500 nM, 200 nM, 100 nM, 50 nM, 10 nM, 1 nM for PTPN2 as ascertained in a phosphatase activity assay utilizing a PTPN2 substrate including but not limited to DiFMUP, STAT1 and STAT5. In some embodiments, the small molecule PTPN2 inhibitor for systemic and transient application exhibits $IC_{50}$ for PTPN2 less than 10 nM, 5 nM, 4 nM, 3 nM, 2 nM, 1 nM, as ascertained in a phosphatase activity assay utilizing DiFMUP as a substrate. In some embodiments, the small molecule PTPN2 inhibitor for systemic and transient application exhibits $IC_{50}$ for PTPN2 less than 5 nM, 4 nM, 3 nM, 2 nM, 1 nM, as ascertained in a phosphatase activity assay utilizing DiFMUP as a substrate. In some embodiments, the small molecule PTPN2 inhibitor for systemic and transient application exhibits $IC_{50}$ (also can be referred to as $EC_{50}$ as applied to cellular assay) for PTPN2 less than 10 µM, 5 µM, 1 µM, 500 nM, 200 nM, 100 nM, 50 nM, 10 nM, 1 nM as tested in a pSTAT1 assay. In some embodiments, the small molecule PTPN2 inhibitor for systemic and transient application exhibits $EC_{50}$ for PTPN2 of less than 15 µM, 10 µM, 5 µM, 1 µM, 500 nM, 200 nM, 100 nM when tested in the CD25 assay disclosed herein. In some embodiments, the small molecule PTPN2 inhibitor for systemic and transient application exhibits $IC_{50}$ (also can be referred to as $EC_{50}$ as applied to cellular assay) for PTPN2 less than 10 nM or less than 1 nM as tested in a phosphatase assay utilizing DiFMUP as the substrate, and $EC_{50}$ less than 10 µM or less than 5 µM in a pSTAT1 assay. In some embodiments, the small molecule PTPN2 inhibitor for systemic and transient application exhibits $IC_{50}$ (also can be referred to as $EC_{50}$ as applied to cellular assay) for PTPN2 (i) less than 5 nM as tested in a phosphatase assay utilizing DiFMUP as the substrate, (ii) $EC_{50}$ less than 5 µM in a pSTAT1 assay, and (iii) $EC_{50}$ less than 1 µM when tested in the CD25 assay disclosed herein.

In practicing any of the methods disclosed herein, a cell or a plurality of such cell may be administered (e.g., systemically administered) to the subject. In some cases, the cell may be a lymphoid cell that optically comprises (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to an antigen. In some cases, the cell may be administered (e.g., systemically administered) to the subject sequentially (e.g., prior to or subsequent to) or concurrent with administering (e.g., systemically administering) a PTPN2 inhibitor to the subject. The cell may have been contacted previously with a PTPN2 inhibitor. Alternatively, the cell may not or need not be contacted with a PTPN2 inhibitor prior to the administration of the cell to the subject.

In some embodiments, (i) the chimeric T-cell receptor sequence and/or (ii) the CAR sequence may be introduced to the cell directly (e.g., via a solution comprising (i) the chimeric T-cell receptor sequence and/or (ii) the CAR sequence), by chemical means (e.g., via one or more carriers such as liposomes for delivery of one or more nucleic acid sequences comprising (i) the chimeric T-cell receptor sequence and/or (ii) the CAR sequence), and/or viral means (e.g., when delivering one or more nucleic acid sequences comprising (i) the chimeric T-cell receptor sequence and/or (ii) the CAR sequence). For the viral means, the one or more nucleic acid sequence may in introduced in a chromosome of the cell, such as a nuclear chromosome and/or a mitochondrial chromosome. In other embodiments, the one or more nucleic acid sequence may not or need not be introduced in the chromosome of the cell, and as such be introduced to the cell as an epichromosomal molecule (e.g., a linear or circular nucleic acid molecule). In some embodiments, the cell may be a lymphoid cell.

Subsequent to the introduction, (i) the chimeric T-cell receptor sequence and/or (ii) the CAR sequence may persist in the cell for at least 1 day, 2 days, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 2 months, 3 months, 4 months, 5 months, 6 months, 7 months, 8 months, 9 months, 10 months, 11 months, 12 months, 13 months, 14 months, 15 months, 16 months, 17 months, 18 months, 19 months, 20 months, 21 months, 22 months, 23 months, 24 months, 3 years, 4 years, 5 years, or more, or any time in between. Subsequent to the introduction, (i) the chimeric T-cell receptor sequence and/or (ii) the CAR sequence may persist in the cell for at most 5 years, 4 years, 3 years, 24 months, 23 months, 22 months, 21 months, 20 months, 19 months, 18 months, 17 months, 16 months, 15 months, 14 months, 13 months, 12 months, 11 months, 10 months, 9 months, 8 months, 7 months, 6 months, 5 months, 4 months, 3 months, 2 months, 31 days, 30 days, 29 days, 28 days, 27 days, 26 days, 25 days, 24 days, 23 days, 22 days, 21 days, 20 days, 19 days, 18 days, 17 days, 16 days, 15 days, 14 days, 13 days, 12 days, 11 days, 10 days, 9 days, 8 days, 7 days, 6 days, 5 days, 4 days, 3 days, 2 days, 1 day, or less, or any time in between.

In some embodiments, introducing to the cell (i) the chimeric T-cell receptor sequence and/or (ii) the CAR sequence may be performed sequentially (e.g., prior to or subsequent to) or concurrent with contacting the cell with a PTPN2 inhibitor. When introduced sequentially, introducing (i) the chimeric T-cell receptor sequence and/or (ii) the CAR sequence and contacting with the PTPN2 inhibitor may be performed by the same route (e.g. injections to the same location; tablets taken orally at the same time), or by a different route (e.g. a tablet taken orally while receiving an intravenous infusion). When introduced concurrently, for example, a first composition comprising (i) the chimeric T-cell receptor sequence and/or (ii) the CAR sequence and a second composition comprising the PTPN2 inhibitor may be part of the same composition (e.g., the same condition media or a therapeutic regimen).

Contacting the cell with the PTPN2 inhibitor, whether systemically and/or transiently, as described in the present disclosure, may reduce PTPN2 signaling via reduction of PTPN2 activity or PTPN2 expression in the cell. For example, the cell can be cultured in a suitable medium, to which a PTPN2 inhibitor is introduced for period of time sufficient to effect such reduction (or inhibition). Depending on the choice of the type of PTPN2 inhibitor, the contacting step may be effected by direct physical contact, pressure (e.g. by changing the shape of the cell via squeezing), chemical means (e.g., liposomes for delivery of nucleic acid based PTPN2 inhibitors), or viral means (e.g., when delivering shRNA, siRNA, or CRISPR-based PTPN2 inhibitors). The PTPN2 inhibitor may directly be introduced to a subject lymphoid cell ex vivo or in vitro. In some embodiments, the cell can be in a subject, and the PTPN2 inhibitor may be administered (e.g., systemically administered) to the subject to contact the cell in vivo. Upon such administration, at least a portion of the PTPN2 inhibitor may contact a cell (e.g., a lymphoid cell, a cancer, or tumor cell, etc.) of the subject in vivo. A composition (e.g., a therapeutic regimen) comprising the PTPN2 inhibitor may be administered to a target site comprising the cell (e.g., the cell may be part of the vascular or lymphatic system of the subject, or a localized tissue of interest or tumor). Alternatively or in addition to, the composition comprising the PTPN2 inhibitor may be administered to a different site than the target site. Upon such administration, the PTPN2 inhibitor may be directed to the target site or the cell via diffusion or via a medium such as a bodily fluid (e.g., blood).

When contacting a cell (e.g., a lymphoid cell) with the PTPN2 inhibitor ex vivo, the cell may be treated with a composition (e.g., a solution) comprising the PTPN2 inhibitor for at least 1 minute, 2 minutes, 3 minutes, 4 minutes, 5 minutes, 6 minutes, 7 minutes, 8 minutes, 9 minutes, 10 minutes, 20 minutes, 30 minutes, 40 minutes, 50 minutes, 60 minutes, 2 hours, 3 hours, 4 hours, 5 hours, 6 hours, 7 hours, 8 hours, 9 hours, 10 hours, 12 hours, 16 hours, 20 hours, 24 hours, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 2 months, 3 months, 4 months, 5 months, 6 months, or more, or any time in between. The cell may be treated with the composition comprising the PTPN2 inhibitor for at most 6 months, 5 months, 4 months, 3 months, 2 months, 31 days, 30 days, 29 days, 28 days, 27 days, 26 days, 25 days, 24 days, 23 days, 22 days, 21 days, 20 days, 19 days, 18 days, 17 days, 16 days, 15 days, 14 days, 13 days, 12 days, 11 days, 10 days, 9 days, 8 days, 7 days, 6 days, 5 days, 4 days, 3 days, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 60 minutes, 50 minutes, 40 minutes, 30 minutes, 20 minutes, 10 minutes, 9 minutes, 8 minutes, 7 minutes, 6 minutes, 5 minutes, 4 minutes, 3 minutes, 2 minutes, 1 minute, or less, or any time in between. During the contacting period, the cell may be subjected to additional PTPN2 inhibitor (e.g., to compensate for a limited half-life of the PTPN2 inhibitor in culture media). Alternatively, during the contacting period, the cell may not be subjected to any additional PTPN2 inhibitor.

A process of contacting the cell with the PTPN2 inhibitor (e.g., treating the cell with a composition comprising the PTPN2 inhibitor) may be performed at least 1, 2, 3, 4, 5, or more times. In other embodiments, such process may be performed at most 5, 4, 3, 2, or 1 time.

In some embodiments, the cell as provided herein may retain expression or activity of PTPN2 prior to contacting (e.g., in vivo or ex vivo) the cell with the PTPN2 inhibitor. In some cases, any one of the methods disclosed herein may involve assessing the expression or activity of PTPN2 in the cell prior to contacting the cell with the PTPN2 inhibitor. In some examples, the cell may not exhibit any loss of the expression or activity of PTPN2, as compared to that present in a control sample, derived from e.g., another cell of the same origin of the cell or a progeny of the cell. In other examples, the cell may exhibit an expression or activity level of PTPN2 that is at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more of that present in a control sample, derived from e.g., another cell of the same origin of the cell or a progeny of the cell. In yet some examples, the PTPN2 mRNA level, cDNA level, or PTPN2 polypeptide level expressed in the cell may be at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more of that present in a control sample, derived from e.g., another cell of the same origin of the cell or a progeny of the cell, or a wildtype cell whose PTPN2 expression or activity has not been reduced. In other examples, the cell may exhibit an activity level of PTPN2 (e.g., a degree of dephosphorylation of a target substrate) that is at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more of that present in a control sample, derived from e.g., another cell of the same origin of the cell or a progeny of the cell, or a wildtype cell whose PTPN2 expression or activity has not been reduced. In other examples, an amount of PTPN2-associated cfDNA or cfRNA level within a source of the cell (e.g., from a plasma of a subject from whom/which the cell was obtained or derived from) may be indicative of an expression level of PTPN2 in the cell. As such, the amount of PTPN2-associated cfDNA or cfRNA level within a source of the cell may be at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more of that present in a control sample, e.g., a wildtype cell whose PTPN2 expression or activity has not been reduced, or from another healthy subject who does not comprise or is not suspected of having a condition/disease of interest.

For any cell that is administered to a subject in need thereof, either with or without having been treated with a PTPN2 inhibitor, as provided in the present disclosure, the cell may be autologous or allogenic to the subject. The cell may have been obtained from the subject and treated ex vivo (e.g., contacting with the PTPN2 inhibitor, engineered to express (i) the TFG and/or (ii) the CAR, etc.) prior to the administration. Alternatively, the cell may be a progeny of a cell obtained from the subject, and the progeny may have been treated ex vivo (e.g., contacting with the PTPN2 inhibitor, engineered to express (i) the TFG and/or (ii) the CAR, etc.) prior to the administration. In a different alternative, the cell may be a progeny of a cell obtained from the subject, and the progeny may be administered to the subject without any engineering or modification thereof. In other embodiments, the cell may be heterologous to the subject. In some examples, the cell may be an allogeneic cell, derived from, e.g., another human subject.

Any one of the subject methods disclosed herein may further comprise administering a PTPN2 inhibitor to the subject sequentially (e.g., prior to or subsequent to) or concurrent with administering a cell (e.g., a lymphoid cell) to the subject. In some embodiments, the cell may have been at least contacted previously with a PTPN2 inhibitor and, optionally, express the TFP and/or the CAR. In other embodiments, the cell may not have been contacted previously with a PTPN2 inhibitor and, optionally, express the TFP and/or the CAR. When introduced sequentially, the PTPN2 inhibitor and the cell may be administered by the same route (e.g. injections to the same location; tablets taken orally at the same time), or separately by a different route (e.g. a tablet taken orally while receiving an intravenous infusion). When introduced concurrently, the PTPN2 inhibitor and the cell may be, e.g., part of the same composition (e.g., the same condition media or a therapeutic regimen).

In some embodiments, a PTPN2 inhibitor is administered into a subject in need thereof systemically and transiently (including intermittently) to potentiate a subject's immunity. In some embodiments, a PTPN2 inhibitor is administered as a single agent. In some embodiments, a PTPN2 inhibitor is administered in combination with another agent as a single or unit dose, or as a separate dose. In some embodiments, the another agent can be a cell, including but not limited to a lymphoid cell (e.g., expressing a CAR and/or TCR).

In some embodiments, separate administrations of a cell (e.g., a lymphoid cell optionally configured to express a TFP and/or a CAR) and a PTPN2 inhibitor to a subject may occur simultaneously, e.g., administering the cell via a first site of the subject's body and administering the PTPN2 inhibitor via a second site of the subject's body at the same time. In other embodiments, separate administrations of the cell and the PTPN2 inhibitor may occur sequentially to a same site or to different sites of the subject's body, e.g., administering the PTPN2 inhibitor subsequent to the cell, or administering the PTPN2 inhibitor prior to the cell. A sequential administration of the cell and the PTPN2 inhibitor may be separated by at least 1 minute, 2 minutes, 3 minutes, 4 minutes, 5 minutes, 6 minutes, 7 minutes, 8 minutes, 9 minutes, 10 minutes, 20 minutes, 30 minutes, 40 minutes, 50 minutes, 60 minutes, 2 hours, 3 hours, 4 hours, 5 hours, 6 hours, 7 hours, 8 hours, 9 hours, 10 hours, 12 hours, 16 hours, 20 hours, 24 hours, 3 days, 4 days, 5 days, 6 days, 7 days, 8 days, 9 days, 10 days, 11 days, 12 days, 13 days, 14 days, 15 days, 16 days, 17 days, 18 days, 19 days, 20 days, 21 days, 22 days, 23 days, 24 days, 25 days, 26 days, 27 days, 28 days, 29 days, 30 days, 31 days, 2 months, 3 months, 4 months, 5 months, 6 months, or more, or any time in between. A sequential administration of the cell and the PTPN2 inhibitor may be separated by at most 6 months, 5 months, 4 months, 3 months, 2 months, 31 days, 30 days, 29 days, 28 days, 27 days, 26 days, 25 days, 24 days, 23 days, 22 days, 21 days, 20 days, 19 days, 18 days, 17 days, 16 days, 15 days, 14 days, 13 days, 12 days, 11 days, 10 days, 9 days, 8 days, 7 days, 6 days, 5 days, 4 days, 3 days, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 60 minutes, 50 minutes, 40 minutes, 30 minutes, 20 minutes, 10 minutes, 9 minutes, 8 minutes, 7 minutes, 6 minutes, 5 minutes, 4 minutes, 3 minutes, 2 minutes, 1 minute, or less, or any time in between.

In practicing any one of the methods disclosed herein, the subject being administered (e.g., systemically administered) with a PTPN2 inhibitor can retain, prior to the administration of the PTPN2 inhibitor, expression or activity of PTPN2 in the subject's cells, such as lymphoid cells (e.g., T cells, NK cells, HKGY cells, and B cells), cancer cells, or tumor cells. For example, the subject retains a PTPN2 expression or activity level in his or her lymphoid cells, cancer cells, or tumor cells that is at least 10%, 20%, 30%, 40%, 50%, 60%, 70%, 80%, 90%, 95%, 96%, 97%, 98%, 99%, 100% or more of that present in a control sample prior to systemically administering a PTPN2 inhibitor. In some examples, the PTPN2 mRNA level, cDNA level, PTPN2 or PTPN2-associated cfDNA or cfRNA level, expressed in the subject's lymphoid cells, cancer cells, or tumor cells is at least 10%, 20%, 30%, 40%, 50%, 60%, 70%, 80%, 90%, 95%, 96%, 97%, 98%, 99%, 100% or more of that present in a control sample. In some examples, the PTPN2 mRNA level, cDNA level, PTPN2 or PTPN2-associated cfDNA or cfRNA level, expressed in the subject's lymphoid cells is at least 10%, 20%, 30%, 40%, 50%, 60%, 70%, 80%, 90%, 95%, 96%, 97%, 98%, 99%, 100% or more of that present in a control sample. In some examples, the subject's lymphoid cells, cancer cells, or tumor cells carry two copies or least one copy of PTPN2 genomic DNA. In some examples, the PTPN2 polypeptide level expressed in the subject's lymphoid cells is at least 10%, 20%, 30%, 40%, 50%, 60%, 70%, 80%, 90%, 95%, 96%, 97%, 98%, 99%, 100% or more of that present in a control sample. In some examples, the subject's lymphoid cells, cancer cells, or tumor cells exhibit a normal level of expression or activity of PTPN2 as compared to that of a control sample.

The control sample utilized in assessing the PTPN2 expression level can be a biological sample from a subject that does not exhibit a tumor or cancer, or from a subject that has not been diagnosed with a tumor or cancer and that has not been treated with a PTPN2 inhibitor. Such control sample can comprise PTPN2 polynucleotides or PTPN2 polypeptides from any of such subject's tissues or cells, including but not limited to such subject's lymphoid cells.

Subsequent to the administration (e.g., systemic administration) of the PTPN2 inhibitor to the subject, the subject may exhibit a reduced expression or activity level of PTPN2 in a cell of the subject (e.g., a lymphoid cell, a tumor cell, a cancer cell, etc.) as compared to that present in a control sample from the subject prior to the administration of the PTPN2 inhibitor. In some cases, subsequent to a systemic administration of the PTPN2 inhibitor to the subject, the subject may exhibit at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more reduction in the expression or activity level of PTPN2 in a cell of the subject (e.g., a lymphoid cell, a tumor cell, a cancer cell, etc.) as compared to that present in a control sample from the subject prior to the systemic administration of the PTPN2 inhibitor. In some cases, the reduced expression or activity level of PTPN2 may be transient, thus may increase over time to, e.g., a normal level comparable to the control sample. In other cases, the reduced expression or activity level of PTPN2 may be maintained or may even continue to decrease for a period of time.

In practicing any one of the methods disclosed herein, downregulation (e.g., transient downregulation) of PTPN2 expression or activity may be performed in vivo in a cell, such as a lymphoid cell or a diseased cell (e.g., a cancer cell or a tumor cell). In some embodiments, a transient downregulation of expression or activity of a target molecule (e.g., PTPN2) in a cell may involve downregulating the expression or activity of the target molecule for at most about, 6 months, 5 months, 4 months, 3 months, 2 months, 1 month, 21 days, 14 days, 13 days, 12 days, 11 days, 10 days, 9 days, 8 days, 7 days, 6 days, 5 days, 4 days, 3 days, 48 hours, 44 hours, 40 hours, 36 hours, 32 hours, 28 hours, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 60 minutes, 55 minutes, 50 minutes, 45 minutes, 40 minutes, 35 minutes, 30 minutes, 25 minutes, 20 minutes, 15 minutes, 10 minutes, 9 minutes, 8 minutes, 7 minutes, 6 minutes, 5 minutes, 4 minutes, 3 minutes, 2 minutes, 1 minute, or a shorter period of time. Subsequent to the transient downregulation, the resulting expression or activity level of the target molecule may be maintained. In other embodiments, subsequent to the transient downregulation, at least about 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more of the downregulated expression or activity level of the target molecule may be regained.

In practicing any one of the methods disclosed herein, a process of downregulating (e.g., transiently downregulating) expression or activity of a target molecule (e.g., PTPN2) may comprise introducing an inhibitor of the target molecule (e.g., a PTPN2 inhibitor). In some embodiments, transiently downregulating expression or activity of PTPN2 in a cell (e.g., a lymphoid cell, a tumor cell, a cancer cell) may comprise introducing a PTPN2 inhibitor to the cell (e.g., treating the cell with a solution comprising a PTPN2 inhibitor) for at most 14 days, 13 days, 12 days, 11 days, 10 days, 9 days, 8 days, 7 days, 6 days, 5 days, 4 days, 3 days, 48 hours, 44 hours, 40 hours, 36 hours, 32 hours, 28 hours, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 60 minutes, 55 minutes, 50 minutes, 45 minutes, 40 minutes, 35 minutes, 30 minutes, 25 minutes, 20 minutes, 15 minutes, 10 minutes, 9 minutes, 8 minutes, 7 minutes, 6 minutes, 5 minutes, 4 minutes, 3 minutes, 2 minutes, 1 minute, or a shorter period of time.

In practicing any one of the methods disclosed herein, a cell (e.g., lymphoid cell, a cancer cell, or a tumor cell) of the subject may exhibit expression or activity of PTPN2 (e.g., exhibiting such at a detectable level) before the expression or activity of PTPN2 is downregulated (e.g., transiently downregulated). For example, the cell may exhibit PTPN2 expression or activity level that is at least 10%, 20%, 30%, 40%, 50%, 60%, 70%, 80%, 90%, 95%, 96%, 97%, 98%, 99%, 100% or more of that present in a control sample. In some examples, the PTPN2 mRNA level or cDNA level expressed in the cell is at least 10%, 20%, 30%, 40%, 50%, 60%, 70%, 80%, 90%, 95%, 96%, 97%, 98%, 99%, 100% or more of that present in a control sample. In some examples, the PTPN2 or PTPN2-associated cfDNA or cfRNA level from the cell is at least 10%, 20%, 30%, 40%, 50%, 60%, 70%, 80%, 90%, 95%, 96%, 97%, 98%, 99%, 100% or more of that present in a control sample. In some examples, the cell of interest carries two copies or least one copy of PTPN2 genomic DNA. In some examples, the PTPN2 polypeptide level expressed in the cell is at least 10%, 20%, 30%, 40%, 50%, 60%, 70%, 80%, 90%, 95%, 96%, 97%, 98%, 99%, 100% or more of that present in a control sample. In some examples, the cell exhibits a normal level of expression or activity of PTPN2 as compared to that of a control sample.

The control sample utilized in assessing the PTPN2 expression level in the cell can be a biological sample from a subject that does not exhibit a tumor or cancer, or from a subject that has not been diagnosed with a tumor or cancer and that has not been treated with a PTPN2 inhibitor. Such control sample can comprise PTPN2 polynucleotides or PTPN2 polypeptides from any of such subject's tissues or cells, including but not limited to such subject's blood plasma.

While expression or activity of PTPN2 in the cell is downregulated (e.g., transiently downregulated), the cell may exhibit a reduced expression or activity level of PTPN2 as compared to that present in the cell prior to the downregulation. In some cases, while expression or activity of PTPN2 in the cell is downregulated (e.g., transiently downregulated), the cell may exhibit at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, or more reduction in the expression or activity level of PTPN2 as compared to that present in a control sample from the subject prior to the downregulation.

For any one of the subject methods disclosed herein, a process of transiently downregulating the expression or activity of PTPN2 may be performed once. In other embodiments, a process of transiently downregulating the expression or activity of PTPN2 may be performed two or more times. In some cases, the process of transiently downregulating the expression or activity of PTPN2 may be performed intermittently for at least 2, 3, 4, 5, 6, 7, 8, 9, 10, or more times. In some examples, a first transient downregulation of expression or activity of PTPN2 and a second transient downregulation of expression or activity of PTPN2 may be separated by period of at least 1 minute, 2 minutes, 3 minutes, 4 minutes, 5 minutes, 6 minutes, 7 minutes, 8 minutes, 9 minutes, 10 minutes, 15 minutes, 20 minutes, 25 minutes, 30 minutes, 35 minutes, 40 minutes, 45 minutes, 50 minutes, 55 minutes, 60 minutes, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, 28 hours, 32 hours, 36 hours, 40 hours, 44 hours, 48 hours, 3 days, 4 days, 5 days, 6 days, 7 days, 8 days, 9 days, 10 days, 11 days, 12 days, 13 days, 14 days, or a longer period of time. In other examples, a first transient downregulation of expression or activity of PTPN2 and a second transient downregulation of expression or activity of PTPN2 may be separated by period of at most about, 6 months, 5 months, 4 months, 3 months, 2 months, 1 month, 21 days, 14 days, 13 days, 12 days, 11 days, 10 days, 9 days, 8 days, 7 days, 6 days, 5 days, 4 days, 3 days, 48 hours, 44 hours, 40 hours, 36 hours, 32 hours, 28 hours, 24 hours, 23 hours, 22 hours, 21 hours, 20 hours, 19 hours, 18 hours, 17 hours, 16 hours, 15 hours, 14 hours, 13 hours, 12 hours, 11 hours, 10 hours, 9 hours, 8 hours, 7 hours, 6 hours, 5 hours, 4 hours, 3 hours, 2 hours, 60 minutes, 55 minutes, 50 minutes, 45 minutes, 40 minutes, 35 minutes, 30 minutes, 25 minutes, 20 minutes, 15 minutes, 10 minutes, 9 minutes, 8 minutes, 7 minutes, 6 minutes, 5 minutes, 4 minutes, 3 minutes, 2 minutes, 1 minute, or a shorter period of time.

In some embodiments, transiently downregulating expression or activity of PTPN2 may comprise introducing a PTPN2 inhibitor to a cell (e.g., a lymphoid cell, a cancer cell, or a tumor cell) or a subject comprising the same intermittently for two or more times, as provided in the present disclosure. In some examples, a first intermittent dosing regimen of the PTPN2 inhibitor and a second intermittent dosing regimen of the PTPN2 inhibitor is the same. In yet other examples, a first intermittent dosing regimen of the PTPN2 inhibitor and a second intermittent dosing regimen of the PTPN2 inhibitor are different. The first intermittent dosing regimen of the PTPN2 inhibitor may comprise a PTPN2 inhibitor content that is at least 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 100%, 200%, 300%, 400%, 500%, or more than that in the second intermittent dosing regimen. Alternatively, the second intermittent dosing regimen of the PTPN2 inhibitor may comprise a PTPN2 inhibitor content that is at least 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, 85%, 90%, 100%, 200%, 300%, 400%, 500%, or more than that in the first intermittent dosing regimen. In some examples, the first intermittent dosing regimen and the second intermittent dosing regimen may be administered by the same route (e.g. injections to the same location; tablets taken orally at the same time), or by a different route (e.g. a tablet taken orally while receiving an intravenous infusion).

In practicing any one of the methods disclosed herein, two or more intermittent dosing regimen of a PTPN2 inhibitor may be effective to achieve a therapeutically effective plasma concentration of the PTPN2 inhibitor in a subject for a duration of time that is substantially the same or longer than that achieved by administering an equivalent dose of the PTPN2 inhibitor once daily, thereby potentiating immunity of the subject or a cell of the subject (e.g., a lymphoid cell) without causing a side effect. In some cases, a therapeutically effective plasma concentration of a PTPN2 inhibitor may be at least about 1 nanomolar (nM), 2 nM, 3 nM, 4 nM, 5 nM, 6 nM, 7 nM, 8 nM, 9 nM, 10 nM, 20 nM, 30 nM, 40 nM, 50 nM, 60 nM, 70 nM, 80 nM, 90 nM, 100 nM, 200 nM, 300 nM, 400 nM, 500 nM, 600 nM, 700 nM, 800 nM, 900 nM, 1 micromolar (µM), 2 µM, 3 µM, 4 µM, 5 µM, 6 µM, 7 µM, 8 µM, 9 µM, 10 µM, or more for a duration of time. In some cases, a therapeutically effective plasma concentration of a PTPN2 inhibitor may be at most about 10 µM, 9 µM, 8 µM, 7 µM, 6 µM, 5 µM, 4 µM, 3 µM, 2 µM, 1 µM, 900 nM, 800 nM, 700 nM, 600 nM, 500 nM, 400 nM, 300 nM, 200 nM, 100 nM, 90 nM, 80 nM, 70 nM, 60 nM, 50 nM, 40 nM, 30 nM, 20 nM, 10 nM, 9 nM, 8 nM, 7 nM, 6 nM, 5 nM, 4 nM, 3 nM, 2 nM, 21 nM, or less for a duration of time. Such duration of time may be at least about 0.1 hour, 0.2 hour, 0.3 hour, 0.4 hour, 0.5 hour, 0.6 hour, 0.7 hour, 0.8 hour, 0.9 hour, 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hours, 20 hours, 21 hours, 22 hours, 23 hours, 24 hours, or longer.

Any one of the subject methods disclosed herein may further comprise administering a lymphoid cell to the subject sequentially (e.g., prior to or subsequent to) or concurrent with administering a PTPN2 inhibitor to the subject. The lymphoid cell may optionally comprise (i) the chimeric T-cell receptor sequence and/or (ii) the CAR sequence. When introduced sequentially, the PTPN2 inhibitor and the lymphoid cell may be administered by the same route (e.g. injections to the same location; tablets taken orally at the same time), or by a different route (e.g. a tablet taken orally while receiving an intravenous infusion). When introduced concurrently, the PTPN2 inhibitor and the cell may be, e.g., part of the same composition (e.g., the same condition media or a therapeutic regimen). As described elsewhere in the present disclosure, the subject being administered with a PTPN2 inhibitor can retain, prior to the administration of the PTPN2 inhibitor, expression or activity of PTPN2 in the subject's cells, such as lymphoid cells (e.g., T cells, NK cells, HKGY cells, and B cells), cancer cells, or tumor cells.

In practicing any one of the methods disclosed herein, selecting the subject may be based on one or more thresholds of an expression or activity level of PTPN2 in the subject's cells, such as lymphoid cells including, without limitation, effector cells such as T cells, NK cells, HKGY cells, and B cells, cancer cells, or tumor cells. For example, the subject's lymphoid cells, cancer cells, or tumor cells exhibit a PTPN2 expression or activity level in his or her lymphoid cells, cancer cells, or tumor cells that is at least 30%, 40%, 50%, 60%, 70%, 80%, 90%, 95%, or more of that present in a control sample. In some examples, the PTPN2 mRNA level or cDNA level expressed in the subject's lymphoid cells, cancer cells, or tumor cells is at least 30%, 40%, 50%, 60%, 70%, 80%, 90%, 95%, or more of that present in a control sample. In some examples, the PTPN2 or PTPN2-associated cfDNA or cfRNA level from the subject's lymphoid cells, cancer cells, or tumor cells is at least 30%, 40%, 50%, 60%, 70%, 80%, 90%, 95%, or more of that present in a control sample. In some examples, the subject's lymphoid cells, cancer cells, or tumor cells carry two copies or least one copy of PTPN2 genomic DNA. In some examples, the PTPN2 polypeptide level expressed in the subject's lymphoid cells is at least 30%, 40%, 50%, 60%, 70%, 80%, 90%, 95%, or more of that present in a control sample. In some examples, the subject's lymphoid cells, cancer cells, or tumor cells exhibit a normal level of expression or activity of PTPN2 as compared to that of a control sample. In some cases, selecting the subject that exhibits expression or activity of PTPN2 results in a negative selection against subject that does not express or possess functional PTPN2 as PTPN2-null phenotype, such that the step of downregulating (e.g., transiently downregulating or permanently downregulating) expression or activity of PTPN2 will not be performed.

The control sample utilized in assessing the PTPN2 expression level can be a biological sample from a subject that does not exhibit a tumor or cancer, or from a subject that has not been diagnosed with a tumor or cancer and that has not been treated with a PTPN2 inhibitor. Such control sample can comprise PTPN2 polynucleotides or PTPN2 polypeptides from any of such subject's tissues or cells, including but not limited to such subject's lymphoid cells.

In some embodiments, downregulating (e.g., transiently downregulating or permanently downregulating) expression or activity of PTPN2 in the cell of the subject may be performed in vivo. In some cases, as described elsewhere in the present disclosure, the cell of the subject may be contacted by a PTPN2 inhibitor in vivo by administering the PTPN2 inhibitor to the subject comprising the cell. Administering a PTPN2 inhibitor to a subject disclosed herein can stimulate or prolong anti-tumor or anti-cancer immunity. In other embodiments, downregulating expression or activity of PTPN2 in the cell of the subject may be performed in vivo. In some cases, as described elsewhere in the present disclosure, the cell of the subject may be isolated from the subject and may be contacted by a PTPN2 inhibitor ex vivo, e.g., treated with a composition comprising the PTPN2 inhibitor.

In practicing any one of the methods disclosed herein, administering a cell (e.g., an autologous or allogeneic lymphoid cell that optionally expresses a TFP and/or a CAR) to the subject may be performed sequentially (e.g., prior to or subsequent to) or concurrent with downregulating (e.g., transiently downregulating or permanently downregulating) expression or activity of PTPN2 in the cell. In some embodiments, the downregulating may comprise introducing a PTPN2 inhibitor to the cell, as provided in the present disclosure (e.g., contacting the cell with a PTPN2 inhibitor, or inducing the cell to express a PTPN2 inhibitor). When performed sequentially, a PTPN2 inhibitor and the cell may be introduced to the subject by the same route (e.g. injections to the same location; tablets taken orally at the same time), or by a different route (e.g. a tablet taken orally while receiving an intravenous infusion). When performed concurrently, a PTPN2 inhibitor and the cell may be, e.g., part of the same composition (e.g., the same condition media or a therapeutic regimen).

In some embodiments, a cell (e.g., a lymphoid cell, a cancer or tumor cell, etc.) of the subject may not exhibit a genetic alteration (e.g., mutation) of (i) a first gene encoding PTPN2 or (ii) a second gene operatively linked to PTPN2, wherein the genetic alteration reduces (or substantially inhibits) the expression and/or activity of PTPN2. In some examples, the second gene may be a promoter operatively linked to PTPN2 or an intron operatively linked to a gene product of PTPN2. Genetic alterations can include a mutation in a polynucleotide (e.g., DNA or RNA) encoding PTPN2 gene product. The mutation can affect any portion of the PTPN2 gene. The one or more PTPN2 mutations can include a mutation in the protein. The one or more PTPN2 mutations can be a point mutation, an insertion, a deletion, an amplification, a translocation, an inversion, or loss of heterozygosity. In some embodiments, the mutation is a loss of function. In some embodiments, the loss of function yields a dominant negative mutation. A mutation can be a frameshift mutation. A frameshift mutation can disrupt the reading frame, resulting in a completely different translated protein as compared to the original sequence. The mutation can be a nonsense mutation. The nonsense mutation can result in a premature stop codon, thus encoding a truncated, and possibly nonfunctional protein product. The PTPN2 mutation can be a nonsense mutation, wherein a single nucleotide alteration causes an amino acid substitution in the translated protein. The mutation can cause an alteration in one or more domain of the PTPN2 protein. The mutation can reduce binding efficacy of a PTPN2 protein with a PTPN2 substrate such as INSR, EGFR, CSF1R, PDGFR, JAK1, JAK2, JAK3, Src family kinases, STAT1, STAT3, STAT6, FYN, LCK, variations thereof, or combinations thereof. The mutation can reduce the ability of PTPN2 to dephosphorylate any one of the substrates disclosed herein, or reduce the ability of PTPN2 to interact with its upstream, or a downstream signaling molecules.

A method of potentiating immunity of a subject may comprise administering a lymphoid cell to the subject sequentially (e.g., prior to or subsequent to) and/or concurrent with the downregulation with the PTPN2 inhibitor. In some embodiments, contacting the lymphoid cell with a PTPN2 inhibitor may be performed in vivo, e.g., via administration of the PTPN2 inhibitor to the subject. In some cases, the subject may already comprise the lymphoid cell when the PTPN2 inhibitor is administered to the subject. The lymphoid cell may be an endogenous cell of the subject. Alternatively, the lymphoid cell may be a heterologous lymphoid cell (e.g., an allogeneic cell from a donor or a xenograft cell). In other cases, the subject may not comprise the lymphoid cell when the PTPN2 inhibitor is administered to the subject. Instead, the contact between the PTPN2 inhibitor and the lymphoid cell may occur upon administration of the lymphoid cell to the subject subsequent to the administration of the PTPN2 inhibitor to the subject. In some embodiments, contacting the lymphoid cell with a PTPN2 inhibitor may be performed ex vivo, e.g., in an in vitro culture composition. The lymphoid cell of the subject may be subjected to ex vivo expansion (or cell proliferation) prior to, during, or subsequent to being contacted by the PTPN2 inhibitor. When the resulting lymphoid cell and/or a progeny thereof is administered to the subject, the lymphoid cell and/or the progeny thereof may be washed to be substantially free of the PTPN2 inhibitor. Alternatively, the lymphoid cell and/or the progeny may not or need not be washed to rid of any excess, used, or expressed PTPN2 inhibitor prior to the administration to the subject.

In some embodiments, the method may further comprise introducing to the lymphoid cell (i) a chimeric T-cell receptor sequence encoding a T-cell receptor fusion protein (TFP) and/or (ii) a chimeric antigen receptor (CAR) sequence encoding a CAR, wherein each of TFP and CAR exhibits specific binding to an antigen. In some cases, the contacting of the lymphoid cell by the PTPN2 inhibitor may be performed sequentially (e.g., prior to or subsequent to) or concurrent with the introducing to the lymphoid cell the chimeric T-cell receptor sequence and/or the CAR sequence. In some examples, the lymphoid cell may be contacted with a PTPN2 inhibitor prior to being conditioned to express the TFP and/or the CAR. In other examples, the lymphoid cell may be contacted with a PTPN2 inhibitor while being conditioned to express the TFP and/or the CAR. In different examples, the lymphoid cell may be configured to express the TFP and/or the CAR prior to being contacted with a PTPN2 inhibitor.

In some embodiments, the downregulation of the expression or activity of PTPN2 in the lymphoid cell of the subject may be permanent. In other embodiments, as disclosed herein, the downregulation of the expression or activity of PTPN2 in a cell (e.g., the lymphoid cell of the subject) may comprise transiently downregulating the expression or activity of PTPN2.

In some cases, downregulating the expression or activity of PTPN2 in the lymphoid cell performed sequentially (e.g., prior to or subsequent to) or concurrent with the introducing to the lymphoid cell the chimeric T-cell receptor sequence and/or the CAR sequence. In some examples, the expression or activity of PTPN2 in the lymphoid cell may be downregulated (e.g., with a PTPN2 inhibitor) prior to being conditioned to express the TFP and/or the CAR. In other examples, the expression or activity of PTPN2 in the lymphoid cell may be downregulated (e.g., with a PTPN2 inhibitor) while being conditioned to express the TFP and/or the CAR. In different examples, the lymphoid cell may be configured to express the TFP and/or the CAR prior to downregulating the expression or activity of PTPN2 in the lymphoid cell (e.g., with a PTPN2 inhibitor).

In some embodiments, a CAR of the present disclosure contains a minimally required intracellular signaling domain capable of activating a signaling cascade (e.g., an immunoreceptor signaling cascade) of the cell (e.g., in a lymphoid cell) in comparison to a control cell that is (i) without the CAR and/or (ii) in absence of any CAR activation (e.g., in absence of any antigen of the antigen-binding domain of the CAR). A minimally required intracellular signaling domain of the CAR typically consists of a primary signaling domain and lacks a co-stimulatory signaling domain sequence or a functional co-stimulatory signaling domain, and hence exhibiting less potency in activating an immune signaling cascade as compared to one with the co-stimulatory signaling domain. In some examples, the CAR with a minimally required intracellular signaling domain is a first generation CAR. In some examples, the first generation CAR contains only a primary signaling domain selected from the group consisting of CD3zeta, CD28, 4-1BB, OX40, DAP10, ICOS, and a variant thereof. In some examples, the CAR with a minimally required intracellular signaling domain is a second generation CAR. In some examples, the second generation CAR contains only a primary signaling domain selected from the group consisting of CD3zeta, CD28, 4-1BB, OX40, DAP10, ICOS, and a variant thereof, and a co-stimulatory signaling domain that is a different member from the primary signaling domain. In some examples, a cell comprising the CAR with the minimally required intracellular signaling domain may induce a target activity of the cell of at least about 1%, 2%, 3%, 4%, 5%, 6%, 7%, 8%, 9%, 10%, 15%, 20%, 25%, 30%, 35%, 40%, 45%, 50%, 55%, 60%, 65%, 70%, 75%, 80%, or more than that of a control cell. In some examples, a cell comprising the CAR with the minimally required intracellular signaling domain may induce a target activity of the cell of at most about 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, or 1% or less than that of a control sample comprising a CAR with a more potent intracellular signaling domain. The more potent intracellular signaling domain may comprise a different polypeptide sequence (e.g., a polypeptide fragment derived from a different intracellular protein than the minimally required intracellular signaling domain) or an additional polypeptide sequence (e.g., the minimally required intracellular signaling domain plus one or more additional intracellular signaling domains). The additional polypeptide sequence may comprise at least 1, 2, 3, 4, 5, or more different intracellular signaling domains. Without wishing to be bound by theory, use of a CAR with the minimally required intracellular signaling domain may help to lower toxicity of a cell (e.g., a lymphocyte) expressing the CAR and/or increase persistence of the cell in the body of the subject in need of such cell therapy. In some cases, the use of PTPN2 inhibitor in conjunction with CAR-T therapy obviates the need to use other CAR-T cell proliferation inhibitors to control the toxicities inherent in CAR-T therapy. Non-limiting CAR-T cell proliferation inhibitors are specific protein kinase inhibitors such as INSR, EGFR, CSF1R, PDGFR, JAK1, JAK2, JAK3, Src family kinases, STAT1, STAT3, STAT6, FYN, LCK, variations thereof, or combinations thereof. In some embodiments, the methods disclosed herein obviate the need to utilize Nintedanib, Dasatinib, Saracatinib, Ponatinib, Nilotinib, Danusertib, AT9283, Degrasyn, Bafetinib, KW-2449, NVP-BHG712, DCC-2036, GZD824, GNF-2, PD173955, GNF-5, Bosutinib, Gefitinib, Erlotinib, and/or Sunitinib in conjunction of a CAR-T therapy. Another advantage of using PTPN2 inhibitor in conjunction with CAR-T therapy is that the amount of CAR-T cells required to yield a comparable level of in vivo efficacy is reduced. In some cases, a subtherapeutic amount of CAR-T cells is infused into a subject in need thereof. For example, one, two, or three orders of magnitude less of CAR-T cells are needed for treating a subject in need thereof. Where desired, less than $5 \times 10^6$, $1 \times 10^6$, $5 \times 10^5$, $1 \times 10^5$, $5 \times 10^4$, $1 \times 10^4$ CAR-T cells are needed to yield a comparable level of therapeutic effect as compared to a CAR-T therapy without the use of a PTPN2 inhibitor.

In practicing any one of the methods disclosed herein, examples of the target activity of the cell may include, but are not limited to, cytokine secretion, gene expression, cell proliferation, cytotoxicity against a target cell, cell death, chemotaxis, cellular metabolism, and/or cell exhaustion.

In practicing any one of the methods disclosed herein, a cell to be administered (e.g., systemically administered) may retain expression or activity of PTPN2 prior to administering a PTPN2 inhibitor to the subject. In some examples, a PTPN2 inhibitor may be administered to the subject prior to the administration of the cell, and the cell may be administered and contacted by the PTPN2 inhibitor in vivo to effect downregulation (e.g., transient downregulation) of expression or activity of PTPN2 in the cell in vivo. In other examples, a PTPN2 inhibitor and the cell may be administered at the same time, e.g., in a same composition or in different compositions, and the cell may be contacted by the PTPN2 inhibitor ex vivo and/or in vivo to effect downregulation of expression or activity of PTPN2 in the cell. In different examples, a PTPN2 inhibitor may be administered to the subject subsequent to the administration of the cell to the subject, and the cell may be contacted by the PTPN2 inhibitor in vivo to effect downregulation of expression or activity of PTPN2 in the cell in vivo.

In practicing any one of the methods disclosed herein, a therapeutic amount or an effective amount may be an amount of a composition or a pharmaceutical formulation (e.g., a cell, a PTPN2 inhibitor, etc.) that is sufficient to elicit a desired response in the subject upon a treatment or method of the present disclosure. In some embodiments, a sub-therapeutic amount of a composition or a pharmaceutical formulation may be an amount of the composition or pharmaceutical formulation that is a fragment of the therapeutic amount. In some examples, a sub-therapeutic amount of a cell (e.g., a cell expression the CAR) may comprise a cell number that is at most 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, or less than a cell number of a therapeutic amount. For example, one, two, or three orders of magnitude less of CAR-T cells that are normally required absent of the use of PTPN2 inhibitor are contemplated for administering into a subject in need thereof. Where desired, a sub-therapeutic amount of cells such as $5 \times 10^6$, $1 \times 10^6$, $5 \times 10^5$, $1 \times 10^5$, $5 \times 10^4$, $1 \times 10^4$ CAR-T cells, or less are utilized to yield a comparable level of therapeutic effect as compared to a CAR-T therapy without the use of a PTPN2 inhibitor.

In some examples, a sub-therapeutic amount of a drug (e.g., a PTPN2 inhibitor) may comprise a dose of the drug that is at most 95%, 90%, 85%, 80%, 75%, 70%, 65%, 60%, 55%, 50%, 45%, 40%, 35%, 30%, 25%, 20%, 15%, 10%, 9%, 8%, 7%, 6%, 5%, 4%, 3%, 2%, 1%, or less than a dose of the drug of a therapeutic amount. Without wishing to be bound by theory, use of a sub-therapeutic amount (or dose) of a cell expressing the CAR may help to lower toxicity of such cell therapy and/or increase persistence of the cell in the body of the subject in need of such cell therapy.

In practicing any one of the methods disclosed herein, the immunity of a cell or a subject may be anti-tumor, anti-cancer activity, anti-viral infection activity, and/or anti-bacterial infection activity. In some embodiments, examples of a viral infection and bacterial infection may comprise human bacterial, human parasitic protozoan or human viral infections caused by microbial species including *Plasmodium*, *Pneumocystis*, herpes viruses (CMV, HSV 1, HSV 2, VZV, and the like), retroviruses, adenoviruses, and the like. In some examples, any one of the subject methods of the present disclosure may be used to treat or regulate HIV infections and related conditions such as tuberculosis, malaria, *Pneumocystis* pneumonia, CMV retinitis, AIDS, AIDS-related complex (ARC) and progressive generalized lymphadenopathy (PGL), and AIDS-related neurological conditions such as multiple sclerosis, and tropical spastic paraparesis. Other human retroviral infections that may be treated or regulated by any one of the subject methods of the present disclosure include Human T-cell Lymphotropic virus and HIV-2 infections.

In practicing any one of the methods disclosed herein, the PTPN2 inhibitor does not regulate site-specific recombination of a gene encoding PTPN2. In some examples, the gene encoding PTPN2 or a gene operatively linked to the gene encoding PTPN2 (e.g., a transcription factor, an intron sequence, etc.) may not be flanked by a recombinase site (e.g., Cre recombinase or Flp recombinase substrates). In some examples, the PTPN2 inhibitor may not be an activator of recombination of a recombinase site. In an example, the PTPN2 inhibitor may not be an estrogen antagonist. In some examples, a subject small molecule PTPN2 inhibitor is a compound capable of inhibiting PTPN2 activity resulting in an increase in steady-state level of the phosphorylated STAT1 and/or phosphorylated STAT5, which are substrates of PTPN2 enzyme.

In practicing any one of the methods disclosed herein, the PTPN2 expression or activity level can be determined by detecting the PTPN2 polynucleotides or PTPN2 polypeptides present in a cell or tissue. A wide variety of nucleic acid assays are available for detecting and/or quantifying PTPN2 polynucleotides, including PTPN2 DNAs and PTPN2 RNAs. Exemplary nucleic acid assays include but are not limited to genotyping assays and sequencing methods. Sequencing methods can include next-generation sequencing, targeted sequencing, exome sequencing, whole genome sequencing, massively parallel sequencing, and the like. Several platforms for next generation sequencing are commercially available. Commercially available platforms include, e.g., platforms for sequencing-by-synthesis, ion semiconductor sequencing, pyrosequencing, reversible dye terminator sequencing, sequencing by ligation, single-molecule sequencing, sequencing by hybridization, and nanopore sequencing. Platforms for sequencing by synthesis are available from, e.g., Illumina, 454 Life Sciences, Helicos Biosciences, and Qiagen. Illumina platforms can include, e.g., Illumina's Solexa platform, Illumina's Genome Analyzer, and are described in Gudmundsson et al (Nat. Genet. 2009 41:1122-6), Out et al (Hum. Mutat. 2009 30:1703-12) and Turner (Nat. Methods 2009 6:315-6), U.S. Patent Application Pub nos. US20080160580 and US20080286795, U.S. Pat. Nos. 6,306,597, 7,115,400, and 7,232,656, which are hereby incorporated by reference. 454 Life Science platforms include, e.g., the GS Flex and GS Junior, and are described in U.S. Pat. No. 7,323,305, hereby incorporated by reference. Platforms for ion semiconductor sequencing include, e.g., the Ion Torrent Personal Genome Machine (PGM) and are described in U.S. Pat. No. 7,948,015, hereby incorporated by reference. Platforms for pryosequencing include the GS Flex 454 system and are described in U.S. Pat. Nos. 7,211,390; 7,244,559; 7,264,929, which are hereby incorporated by reference. Platforms and methods for sequencing by ligation include, e.g., the SOLiD sequencing platform and are described in U.S. Pat. No. 5,750,341, hereby incorporated by reference. Platforms for single-molecule sequencing include the SMRT system from Pacific Bioscience. Nanopore sequencing methodologies are described in Soni G V and Meller A. Clin Chem 53: 1996-2001 [2007], hereby incorporated by reference. Nanopore sequencing DNA analysis techniques are being industrially developed by a number of companies, including Oxford Nanopore Technologies (Oxford, United Kingdom). Nanopore sequencing generally refers to a single-molecule sequencing technology whereby a single molecule of DNA is sequenced directly as it passes through a nanopore. A nanopore can be a small hole, of the order of 1 nanometer in diameter. Immersion of a nanopore in a conducting fluid and application of a potential (voltage) across can result in a slight electrical current due to conduction of ions through the nanopore. The amount of current which flows is sensitive to the size and shape of the nanopore and to occlusion by, e.g., a DNA molecule. As a DNA molecule passes through a nanopore, each nucleotide on the DNA molecule can obstruct the nanopore to a different degree, changing the magnitude of the current through the nanopore in different degrees. This change in the current as the DNA molecule passes through the nanopore represents a reading of the DNA sequence. Where genetic mutations are to be assessed with a single cell, a number of single cell amplification and/or sequencing techniques are available in the art, e.g., Cell Rep. (2012) 2:666-73; Mol Cell (2015)58:610-20; Cell (2015) 163:799-810; Nat Biotechnol. (2012) 30:777-829: 171-81; Nat Methods (2014)11:163-6, all of which are incorporated herein by reference in their entirety.

Additional methods for assessing levels and/or concentration of PTPN2 polynucleotides in a tissue or a cell may include, but are not limited to, microarray hybridization assay, nucleic acid amplification assays including without limitation polymerase chain reaction (PCR), quantitative PCR (qPCR), real-time PCR (RT-PCR), digital PCR, and in situ sequencing (US20190024144, US20140349294, incorporated hereby by reference). Nucleic acid amplification can be linear or non-linear (e.g., exponential). Amplification may comprise directed changes in temperature, or may be isothermal. Conditions favorable to the amplification of target sequences by nucleic acid amplification assays are known in the art, can be optimized at a variety of steps in the process, and depend on characteristics of elements in the reaction, such as target type, target concentration, sequence length to be amplified, sequence of the target and/or one or more primers, primer length, primer concentration, polymerase used, reaction volume, ratio of one or more elements to one or more other elements, some or all of which can be altered. In general, various forms of PCR involve the steps of denaturation of the target to be amplified (if double stranded), hybridization of one or more primers to the target, and extension of the primers by a DNA polymerase, with the steps repeated (or "cycled") in order to amplify the target sequence. Steps in this process can be optimized for various outcomes, such as to enhance yield, decrease the formation of spurious products, and/or increase or decrease specificity of primer annealing. Methods of optimization are well known in the art and include adjustments to the type or amount of elements in the amplification reaction and/or to the conditions of a given step in the process, such as temperature at a particular step, duration of a particular step, and/or number of cycles. In some embodiments, an amplification reaction comprises at least 5, 10, 15, 20, 25, 30, 35, 50, or more cycles. In some embodiments, an amplification reaction comprises no more than 5, 10, 15, 20, 25, 35, 50, or more cycles. Steps can comprise any temperature or gradient of temperatures, suitable for achieving the purpose of the given step, including but not limited to, primer annealing, primer extension, and strand denaturation. Steps can be of any duration, including but not limited to about, less than about, or more than about 1, 5, 10, 15, 20, 25, 30, 35, 40, 45, 50, 55, 60, 70, 80, 90, 100, 120, 180, 240, 300, 360, 420, 480, 540, 600, or more seconds, including indefinitely until manually interrupted. Cycles of any number comprising different steps can be combined in any order. In some embodiments, different cycles comprising different steps are combined such that the total number of cycles in the combination is about, less that about, or more than about 5, 10, 15, 20, 25, 30, 35, 50, or more cycles.

In situ hybridization (ISH), RNase protection assay, and the like assays can also be employed for detecting PTPN2 polynucleotides and the expression level.

In some embodiments, the copy number PTPN2 gene is assessed by a method selected from the group consisting of in situ hybridization (ISH), Southern blot, immunohistochemistry (IHC), polymerase chain reaction (PCR), quantitative PCR (qPCR), quantitative real-time PCR (qRT-PCR), comparative genomic hybridization (CGH), microarray-based comparative genomic hybridization, and ligase chain reaction (LCR). In some embodiments, the in situ hybridization is selected from fluorescence in situ hybridization (FISH), chromogenic in situ hybridization (CISH) and silver in situ hybridization (SISH). In some embodiments, the copy number is assessed using a nucleic acid sample from the subject, such as genomic DNA, cDNA, ctDNA, cell-free DNA, RNA or mRNA.

PTPN2 expression and/or activity level can also be assessed by detecting and/or quantifying PTPN2 polypeptide level in a subject's tissue or cell. A variety of techniques are available in the art for protein analysis. They include but are not limited to immunohistochemistry (IHC), radioimmunoassays, ELISA (enzyme linked immunosorbent assays), "sandwich" immunoassays, immunoradiometric assays, in situ immunoassays (using e.g., colloidal gold, enzyme or radioisotope labels), western blot analysis, immunoprecipitation assays, immunofluorescent assays, flow cytometry, confocal microscopy, enzymatic assays, surface plasmon resonance and PAGE-SDS. One or more of these protein assays utilizes antibodies or fragments thereof that exhibits specific binding to PTPN2 polypeptides. A large number of anti-PTPN2 antibodies are available, including those provided by Invitrogen, Santa Cruz Biotechnology, OriGene Technologies, MilliporeSigma, Bio-Rad, Abcam, and Cell Signaling Technology. Anti-PTPN2 monoclonal antibodies directed to a given epitope on PTPN2 polypeptide can also be generated by methods known in the art. Such antibodies can be conjugated with an enzyme or other labels for performance of ELISA or other immunoassays described herein. Without wishing to be bound by theory, an anti-PTPN2 antibody may be specific for a functionally active PTPN2, thereby useful for, e.g., selecting a cell or a subject comprising a cell that exhibits expression or activity of PTPN2 above a predetermined threshold level. In other examples, an anti-PTPN2 antibody may be specific for a functionally inactive PTPN2, thereby useful for, e.g., selecting a cell or a subject comprising the cell that expresses PTPN2 variants with genetic alternation(s) that render the protein inactive.

In practicing any one of the subject methods as provided herein, the PTPN2 expression or activity, e.g., in a tumor tissue, a cancer cell, or a lymphoid cell, can be determined using any biological sample comprising the target cells (e.g., plasma cells or cells from a tumor site under investigation) or constituents thereof (e.g., constituents such as cfDNA from the plasma or the tumor site). The biological sample may be a solid or liquid biological sample from the subject under investigation or treatment. The biological sample may be a biopsy sample that is fixed, paraffin-embedded, fresh, or frozen. The biological sample may be obtained by any suitable means, including but not limited to needle aspiration, fine needle aspiration, core needle biopsy, vacuum assisted biopsy, large core biopsy, incisional biopsy, excisional biopsy, punch biopsy, shave biopsy, skin biopsy, and venipuncture.

The biological sample can be obtained from, without limitation, skin, heart, lung, kidney, bone marrow, breast, pancreas, liver, muscle, smooth muscle, bladder, gall bladder, colon, intestine, brain, prostate, esophagus, thyroid, serum, saliva, urine, gastric and digestive fluid, tears, stool, semen, vaginal fluid, interstitial fluids derived from tumorous tissue, ocular fluids, sweat, mucus, earwax, oil, glandular secretions, spinal fluid, hair, fingernails, plasma, nasal swab or nasopharyngeal wash, spinal fluid, cerebral spinal fluid, tissue, throat swab, biopsy, placental fluid, amniotic fluid, cord blood, emphatic fluids, cavity fluids, sputum, pus, microbiota, meconium, breast milk, and/or other excretions or body tissues of the subject. In some embodiments, a selection of the biological sample may depend on the condition of the subject to be treated.

In some embodiments, a biological sample comprises cell-free DNA (cfDNA) derived from a whole blood or plasma of the subject. A sample may be analyzed directly for its contents, or may be processed to purify one or more of its contents for analysis. Methods of direct analysis of samples are known in the art and include, without limitation, mass spectrometry and histological staining procedures. In some embodiments, one or more components are purified from the sample for the detection of PTPN2 expression level or activity level. In some embodiments, the purified component of the biological sample is protein (e.g. total protein, cytoplasmic protein, or membrane protein). In some embodiments, the purified component of the sample is a nucleic acid, such as DNA (e.g. genomic DNA, cDNA, ctDNA, or cfDNA) or RNA (e.g. total RNA or mRNA).

Methods for the extraction, purification, and amplification of nucleic acids are known in the art. For example, nucleic acids can be purified by organic extraction with phenol, phenol/chloroform/isoamyl alcohol, or similar formulations, including TRIzol and TriReagent. Other non-limiting examples of extraction techniques include: organic extraction followed by ethanol precipitation, e.g., using a phenol/chloroform organic reagent (Ausubel et al., 1993), with or without the use of an automated nucleic acid extractor, e.g., the Model 341 DNA Extractor available from Applied Biosystems (Foster City, Calif); stationary phase adsorption methods (U.S. Pat. No. 5,234,809; Walsh et al., 1991); and salt-induced nucleic acid precipitation methods (Miller et al., (1988), such precipitation methods being typically referred to as "salting-out" methods. Another example of nucleic acid isolation and/or purification includes the use of magnetic particles to which nucleic acids can specifically or non-specifically bind, followed by isolation of the beads using a magnet, and washing and eluting the nucleic acids from the beads (see e.g. U.S. Pat. No. 5,705,628). In some embodiments, the above isolation methods may be preceded by an enzyme digestion step to help eliminate unwanted protein from the sample, e.g., digestion with proteinase K, or other like proteases. See, e.g., U.S. Pat. No. 7,001,724. If desired, RNase inhibitors may be added to the lysis buffer. For certain cell or sample types, it may be desirable to add a protein denaturation/digestion step to the protocol. Purification methods may be directed to isolate DNA, RNA, or both. When both DNA and RNA are isolated together during or subsequent to an extraction procedure, further steps may be employed to purify one or both separately from the other. Sub-fractions of extracted nucleic acids can also be generated, for example, purification by size, sequence, or other physical or chemical characteristics. In addition to an initial nucleic acid isolation step, purification of nucleic acids can be performed after any step in the methods of the disclosure, such as to remove excess or unwanted reagents, reactants, or products.

In some embodiments, as abovementioned, the cell may be contacted by a PTPN2 inhibitor in vivo by administering the PTPN2 inhibitor to the subject comprising the cell. Administering a PTPN2 inhibitor to a subject disclosed herein can stimulate or prolong anti-tumor or anti-cancer immunity. Not wishing to be bound by any particular theory, a PTPN2 inhibitor reduces PTPN2 activity in a cell, leading to an augmented immunoreceptor signaling pathways, which in turn results in the activation of adaptive immunity against tumor or cancer cells.

Stimulation of anti-tumor or anti-cancer immunity can be established by any of the readout known in the art including without limitation: lymphoid cell proliferation (including proliferation of T cells such as CD4+ and/or CD8+ T cells, and clonal expansion other lymphoid cells), cytokine secretion, activation of effector function of lymphoid cells, reduction in T cell exhaustion, destabilization of regulatory T cells (Tregs) and/or their function, movement and/or trafficking of lymphoid cells, release of other intracellular signaling molecules, and phosphorylation of intracellular signaling molecules.

In some embodiments, anti-tumor immunity encompasses proliferation of the lymphoid cells including clonal expansion of the lymphoid cells that are capable of directly or indirectly mediating anti-tumor activity. Non-limiting examples of anti-tumor lymphoid cells are CD4+ and/or CD8+ T cells, NK cells, tumor infiltrating lymphocytes (TIL), especially those T cells capable of specific binding to one or more tumor antigens. Proliferation of the lymphoid cell can lead to a phenotypic change of the lymphoid cell. Treatment of a PTPN2 inhibitor can stimulate or prolong lymphoid cell proliferation by about 1 fold, about 2 to about 5 fold, about 5 to about 10 fold, about 10 fold to about 50 fold, about 50 fold to about 100 fold or higher. Assessing lymphoid cell proliferation can be performed by a wide variety of assays known in the art, including without limitation, the use of cell staining, microscopy, flow cytometry, cell sorting, and combinations of these. A number of commercial kits for assessing various types of T cell or B cell proliferations are also suitable to assess the effect of PTPN2 inhibitor on T cell or B cell proliferation (e.g., IncuCyte, CellTRrace Cell Proliferation Kits marketed by ThermoFisher). Proliferation can also be determined by phenotypic analysis of the lymphoid cells. For example, clumping of lymphoid cells in culture can signify proliferation of lymphoid cells as compared to comparable lymphoid cells without the treatment with a PTPN2 inhibitor.

In some embodiments, anti-tumor immunity stimulated or prolonged in response to a PTPN2 inhibitor is evidenced by cytokine release from the lymphoid cells. Cytokine release by the lymphoid cell can comprise the release of IFNγ, TNFα, CSF, TGFβ, IL-1, IL-2, IL-4, IL-5, IL-6, IL-13, IL-17, IL-21, IL-22, granzyme, and the like. Lymphoid cells can generate about 1 fold, 2 fold, 3 fold, 4 fold, 5 fold, 6 fold, 7 fold, 8 fold, 9 fold, 10 fold, 50 fold, 100 fold or greater cytokine release in response to a PTPN2 inhibitor treatment as compared to comparable lymphoid cells that are not being exposed to the PTPN2 inhibitor. Cytokine release may be determined and quantified using any immunoassays such as western blot, ELISA, flow cytometry, and the like.

In some embodiments, stimulated or prolonged anti-tumor immunity is evidenced by T cell activation. T cell activation can involve differential expression of antigen specific TCRs, certain cell surface markers and induction of cell proliferation signals. T cell activation may also involve stimulating its effector function including cytolytic activity against tumor or cancer cells, or helper activity including releasing cytokines. In some examples, T cells can be used to kill a tumor or cancer cell in vivo or in vitro in the presence of a PTPN2 inhibitor. Cell killing can be mediated by the release of one or more cytotoxic cytokines, for example IFNγ or granzyme, by the T cells. In some cases, a subject method can stimulate or prolong the (i) release of cytotoxins such as perform, granzymes, and granulysin and/or (ii) induction of apoptosis via e.g., Fas-Fas ligand interaction between the T cells and a tumor or cancer cell, thereby triggering the destruction of the target cell. Cytotoxicity can be detected by staining, microscopy, flow cytometry, cell sorting, ELISPOT, chromium release cytotoxicity assay, and other cell death assays described in WO2011131472A1, which is incorporated herein by reference.

Cytotoxicity of a lymphoid cell can be greater in response to treating with a PTPN2 inhibitor as compared to a comparable lymphoid cell lacking such treatment. A lymphoid cell treated with a PTPN2 inhibitor can be about 5%, 10%, 15%, 20%, 25%, 30%, 35%, 40%, 45%, 50%, 55%, 60%, 65%, 70%, 75%, 80%, 85%, 90%, 95%, 100%, 500% or more cytotoxic against tumor or cancer cells as compared to a comparable lymphoid cell lacking the treatment. In some embodiments, a change in cytotoxicity can comprise comparing such activity before and after treating the lymphoid cell with a PTPN2 inhibitor.

In some examples, a reduction in expression or activity of such markers including PD1, Foxp3, or FoxO3a is indicative of Treg destabilization, and hence an enhanced anti-tumor immunity. In addition, Treg destabilization, as reflected by a decreased T cell exhaustion, can be demonstrated by an enhanced cytokine release, e.g., release of IL-2, IFNγ, TNF and other chemokines.

Anti-tumor immunity can also be evidenced by movement and/or trafficking of the lymphoid cells in response to a treatment with a PTPN2 inhibitor. In some embodiments, movement can be determined by quantifying localization of the lymphoid cell to a target site such as a tumor tissue. For example, lymphoid cells can be quantified at the target before or after administration of a PTPN2 inhibitor. Quantification can be performed by isolating a lesion and quantifying a number of lymphoid cells, for example tumor infiltrating lymphocytes. Movement and/or trafficking of lymphoid cells in a tumor tissue after administering a PTPN2 inhibitor can be greater than that of a control lacking the administration of a PTPN2 inhibitor. In some embodiments, the number of lymphoid cells accumulated at the tumor tissue of interest can be about 1 fold, 5 fold, 10 fold, 15 fold, 50 fold, 100 fold or greater than that of a control not being treated with a PTPN2 inhibitor. Trafficking can also be determined in vitro utilizing a transwell migration assay. In some embodiments, the number of lymphoid cells administered with a PTPN2 inhibitor exhibits about 1 fold, 5 fold, 10 fold, 15 fold, 50 fold, 100 fold or greater as compared to that of control lymphoid cells not being administered with a PTPN2 inhibitor.

Stimulating and/or prolonging anti-tumor immunity in a subject can also be assessed by one or more (in any combination) of the foregoing results, although alternative or additional results of the referenced tests and/or other tests can evidence such desired outcome. In some embodiments, anti-tumor immunity is considered stimulated if there exists at least about 10%, 20%, 30%, 40%, 50%, 60%, 70%, 75%, 80%, 90%, 95%, 100%, 110%, 120%, 150%, 200%, 300%, 400%, 500%, 600%, 700%, 1000%, 10000% or more improvement, using an appropriate measure (e.g. tumor size reduction, duration of tumor size stability, duration of time free from metastatic events, duration of disease-free survival). Improved immunity may also be expressed as fold improvement, such as at least about 2-fold, 3-fold, 4-fold, 5-fold, 6-fold, 7-fold, 8-fold, 9-fold, 10-fold, 20-fold, 30-fold, 40-fold, 50-fold, 60-fold, 70-fold, 80-fold, 90-fold, 100-fold, 1000-fold, 10000-fold, or more, using an appropriate measure (e.g. tumor size reduction, duration of tumor size stability, duration of time free from metastatic events, duration of disease-free survival).

A number of secondary parameters can be employed to determine stimulated and/or prolonged anti-tumor immunity. Examples of secondary parameters include, but are not limited to, the lack of new tumors, a reduction of circulating tumor antigens or markers (e.g., CEA, PSA, CA-125, or cfDNA, ctDNA), the lack of detectable cancer cell or tumor marker by way of biopsy, surgical downstaging (i.e., conversion of the surgical stage of a tumor from unresectable to respectable), MRI, ultrasound, PET scans and any other detection means, all of which can point to the overall immunity to tumor or cancer in a subject. Examples of tumor markers and tumor-associated antigens that can be evaluated as indicators of improved immunity include, but are not limited to, carcinembryonic antigen (CEA) prostate-specific antigen (PSA), CA-125, CA19-9, ganglioside molecules (e.g., GM2, GD2, and GD3), MART-1, heat shock proteins (e.g., gp96), sialyl Tn (STn), tyrosinase, MUC-1, HER-2/neu, c-erb-B2, KSA, PSMA, p53, RAS, EGF-R, VEGF, MAGE, gp100, Ki-67, STK15, Survivin, CyclinB1, Stromelysin, CathepsinL2, 3MYBL2, and any ctDNA known in the art. BMC Med. 16:166, 2018.

In some embodiments, prolonged immunity is evidenced by tumor being stabilized (e.g., one or more tumors do not increase more than 1%, 5%, 10%, 15%, or 20% in size, and/or do not metastasize) as a result of treatment with a PTPN2 inhibitor. In some embodiments, a tumor is stabilized for at least about 1, 2, 3, 4, 5, 6, 7, 8, 9, 10, 11, 12, or more weeks. In some embodiments, a tumor is stabilized for at least about 1, 2, 3, 4, 5, 6, 7, 8, 9, 10, 11, 12, or more months. In some embodiments, a tumor is stabilized for at least about 1, 2, 3, 4, 5, 6, 7, 8, 9, 10, or more years. In some embodiments, the size of a tumor or the number of tumor cells is reduced by at least about 5%, 10%, 15%, 20%, 25%, 30%, 35%, 40%, 45%, 50%, 55%, 60%, 65%, 70%, 75%, 80%, 85%, 90%, 95%, or more. In some embodiments, the tumor is completely eliminated, or reduced below a level of detection. In some embodiments, a subject remains tumor free (e.g. in remission) for at least about 1, 2, 3, 4, 5, 6, 7, 8, 9, 10, 11, 12, or more weeks following treatment. In some embodiments, a subject remains tumor free for at least about 1, 2, 3, 4, 5, 6, 7, 8, 9, 10, 11, 12, or more months following treatment. In some embodiments, a subject remains tumor free for at least about 1, 2, 3, 4, 5, 6, 7, 8, 9, 10, or more years after treatment.

The methods disclosed herein can be applied to treat, stimulate and/or or prolong immunity against a wide variety of cancers, including both solid tumor hematological cancers. For example, the subject methods can be applied to: Acute Lymphoblastic Leukemia (ALL), Acute Myeloid Leukemia (AML), Adrenocortical Carcinoma, Childhood Adrenocortical Carcinoma, AIDS-Related Cancers, Kaposi Sarcoma (Soft Tissue Sarcoma), AIDS-Related Lymphoma (Lymphoma), Primary CNS Lymphoma (Lymphoma), Anal Cancer, Appendix Cancer, Astrocytomas, Childhood (Brain Cancer), Atypical Teratoid/Rhabdoid Tumor, Basal Cell Carcinoma of the Skin, Bile Duct Cancer, Bladder Cancer, Bone Cancer (includes Ewing Sarcoma and Osteosarcoma and Malignant Fibrous Histiocytoma), Brain Tumors, Breast Cancer, Bronchial Tumors, Burkitt Lymphoma—see Non-Hodgkin Lymphoma, Carcinoid Tumor (Gastrointestinal), Childhood Carcinoid Tumors, Cardiac (Heart) Tumors, Atypical Teratoid/Rhabdoid Tumor, Embryonal Tumors, Germ Cell Tumor, Primary CNS Lymphoma, Cervical Cancer, Cholangiocarcinoma, Chordoma, Chronic Lymphocytic Leukemia (CLL), Chronic Myelogenous Leukemia (CML), Chronic Myeloproliferative Neoplasms, Colorectal Cancer, Craniopharyngioma, Cutaneous T-Cell Lymphoma (Mycosis Fungoides and Sézary Syndrome), Ductal Carcinoma In Situ (DCIS), Embryonal Tumors, Endometrial Cancer (Uterine Cancer), Ependymoma, Esophageal Cancer, Esthesioneuroblastoma (Head and Neck Cancer), Ewing Sarcoma (Bone Cancer), Extracranial Germ Cell Tumor, Extragonadal Germ Cell Tumor, Eye Cancer, Childhood Intraocular Melanoma, Intraocular Melanoma, Retinoblastoma, Fallopian Tube Cancer, Fibrous Histiocytoma of Bone, Malignant, and Osteosarcoma, Gallbladder Cancer, Gastric (Stomach) Cancer, Gastrointestinal Carcinoid Tumor, Gastrointestinal Stromal Tumors (GIST), Extragonadal Germ Cell Tumors, Ovarian Germ Cell Tumors, Testicular Cancer, Gestational Trophoblastic Disease, Hairy Cell Leukemia, Head and Neck Cancer, Heart Tumors, Hepatocellular (Liver) Cancer, Histiocytosis, Langerhans Cell Hodgkin Lymphoma, Hypopharyngeal Cancer (Head and Neck Cancer), Islet Cell Tumors, Pancreatic Neuroendocrine Tumors, Kaposi Sarcoma (Soft Tissue Sarcoma), Kidney (Renal Cell) Cancer, Laryngeal Cancer (Head and Neck Cancer), Leukemia, Lip and Oral Cavity Cancer (Head and Neck Cancer), Liver Cancer, Lung Cancer (e.g., Non-Small Cell and Small Cell), Lymphoma, Male Breast Cancer, Malignant Fibrous Histiocytoma of Bone and Osteosarcoma, Melanoma, Merkel Cell Carcinoma (Skin Cancer), Mesothelioma, Malignant, Metastatic Cancer, Metastatic Squamous Neck Cancer with Occult Primary (Head and Neck Cancer), Midline Tract Carcinoma, Mouth Cancer (Head and Neck Cancer), Multiple Endocrine Neoplasia, Multiple Myeloma/Plasma Cell Neoplasms, Mycosis Fungoides (Lymphoma), Myelodysplastic Syndromes, Myelodysplastic/Myeloproliferative Neoplasms, Myelogenous Leukemia, CML, Myeloid Leukemia, Acute (AML), Myeloproliferative Neoplasms, Chronic, Nasal Cavity and Paranasal Sinus Cancer (Head and Neck Cancer), Nasopharyngeal Cancer (Head and Neck Cancer), Neuroblastoma, Non-Hodgkin Lymphoma, Non-Small Cell Lung Cancer, Oral Cancer, Lip and Oral Cavity Cancer and Oropharyngeal Cancer (Head and Neck Cancer), Osteosarcoma and Malignant Fibrous Histiocytoma of Bone, Ovarian Cancer, Pancreatic Cancer, Pancreatic Neuroendocrine Tumors (Islet Cell Tumors), Papillomatosis (Childhood Laryngeal), Paraganglioma, Paranasal Sinus and Nasal Cavity Cancer (Head and Neck Cancer), Parathyroid Cancer, Penile Cancer, Pharyngeal Cancer (Head and Neck Cancer), Pheochromocytoma, Pituitary Tumor, Plasma Cell Neoplasm/Multiple Myeloma, Pleuropulmonary Blastoma, Pregnancy and Breast Cancer, Primary Central Nervous System (CNS) Lymphoma, Primary Peritoneal Cancer, Rectal Cancer, Retinoblastoma, Rhabdomyosarcoma, Salivary Gland Cancer (Head and Neck Cancer), Sarcoma, Childhood Rhabdomyosarcoma (Soft Tissue Sarcoma), Childhood Vascular Tumors (Soft Tissue Sarcoma), Ewing Sarcoma (Bone Cancer), Kaposi Sarcoma (Soft Tissue Sarcoma), Osteosarcoma (Bone Cancer), Soft Tissue Sarcoma, Uterine Sarcoma, Sezary Syndrome (Lymphoma), Skin Cancer, Childhood Skin Cancer, Small Cell Lung Cancer, Small Intestine Cancer, Soft Tissue Sarcoma, Squamous Cell Carcinoma of the Skin, Squamous Neck Cancer with Occult Primary, Metastatic (Head and Neck Cancer), Stomach (Gastric) Cancer, T-Cell Lymphoma, Cutaneous, Testicular Cancer, Throat Cancer (Head and Neck Cancer), Nasopharyngeal Cancer, Oropharyngeal Cancer, Hypopharyngeal Cancer, Thymoma and Thymic Carcinoma, Thyroid Cancer, Transitional Cell Cancer of the Renal Pelvis and Ureter (Kidney (Renal Cell) Cancer), Ureter and Renal Pelvis, Transitional Cell Cancer (Kidney (Renal Cell) Cancer, Urethral Cancer, Uterine Cancer, Endometrial, Uterine Sarcoma, Vaginal Cancer, Vascular Tumors (Soft Tissue Sarcoma), Vulvar Cancer, and Wilms Tumor and Other Childhood Kidney Tumors, and any of the aforementioned cancers exhibiting expression and/or activity of PTPN2 in the cancer cells.

Certain embodiments contemplate a human subject that has been diagnosed with a cancer, such as one in which PTPN2 expression or activity is detectable (e.g., aberrantly low, normal, or high) in the cancer cells or tumor tissue. Certain other embodiments contemplate a non-human subject, for example a non-human primate such as a macaque, chimpanzee, gorilla, vervet, orangutan, baboon or other non-human primate, including such non-human subjects that can be known to the art as preclinical models, the tumor tissue or cancer cells of which exhibit expression and/or activity of PTPN2. Certain other embodiments contemplate a non-human subject that is a mammal, for example, a mouse, rat, rabbit, pig, sheep, horse, bovine, goat, gerbil, hamster, guinea pig or other mammal. There are also contemplated other embodiments in which the subject or biological source can be a non-mammalian vertebrate, for example, another higher vertebrate, or an avian, amphibian or reptilian species, or another subject or biological source. In certain embodiments of the present disclosure, a transgenic animal is utilized. A transgenic animal is a non-human animal in which one or more of the cells of the animal include a nucleic acid that is non-endogenous (i.e., heterologous) and is present as an extrachromosomal element in a portion of its cell or stably integrated into its germ line DNA (i.e., in the genomic sequence of most or all of its cells).

Where desired, the subject can be screened for the presence of expression or activity of PTPN2 in the subject's tumor or cancer cells. The subject can also be screened for the retention of PTPN2 expression and/or activity in one or more types of subject's lymphoid cells. Screening for the presence or the absence of expression or activity of PTPN2 can be carried out by analyzing the PTPN2 polynucleotide or PTPN2 polypeptide with any of the nucleic acid or protein assays disclosed herein. One or more of the screening steps can be performed concurrent with, subsequent to, or more likely, prior to administering a PTPN2 inhibitor to the subject.

In some embodiments, one or more steps in the screening, assessment or reporting of the PTPN2 expression and/or activity level is performed with the aid of a processor, such as with a computer system executing instructions contained in computer-readable media. In one aspect, the disclosure provides a system for assessing the PTPN2 expression or activity level in a subject's tumor tissue, cancer cells, and/or the subject's lymphoid cells. In some embodiments, the system comprises (a) a memory unit configured to store information concerning PTPN2 expression and/or activity level present in a tumor tissue/cancer cell, and/or lymphoid cell from the subject being investigated; and (b) one or more processors alone or in combination programmed to (1) assess the PTPN2 expression or activity in the subject's tumor tissue/cancer cell, and/or the PTPN2 expression or activity level in at least one type of subject's lymphoid cells; and (2) assessing the likelihood of a therapeutic beneficial response to treatment with a PTPN2 inhibitor based on the presence of the PTPN2 expression or activity in the tumor tissue/cancer cells, and/or the PTPN2 expression or activity in the subject's lymphoid cells.

In some embodiments, a processor or computational algorithm may aid in the assessment of a likelihood of a subject exhibiting a therapeutic benefit to treatment with a PTPN2 inhibitor. For example, one or more steps of methods or systems described herein may be implemented in hardware, software, firmware where desirable. When implemented in hardware, some or all of the blocks, operations, techniques, etc. may be implemented in, for example, a custom integrated circuit (IC), an application specific integrated circuit (ASIC), a field programmable logic array (FPGA), a programmable logic array (PLA), etc. A computer system may be involved in one or more of sample collection, sample processing, data analysis, expression profile assessment, calculation of weighted probabilities, calculation of baseline probabilities, comparison of a weighted probability to a reference level and/or control sample, determination of a subject's absolute or increased probability, generating a report, and reporting results to a receiver.

In some embodiments, provided herein is a computer readable medium encoded with computer executable software that includes instructions for a computer to execute functions associated with the identified biomarkers such as PTPN2. Such computer system may include any combination of such codes or computer executable software, depending upon the types of evaluations desired to be completed. The system can have code for calculating a weighted probability of PTPN2 inhibitor responsiveness based on the expression and/or activity level present in a subject's tumor tissue or cancer cells, as well as that present in the subject's lymphoid cells.

In a further embodiment, the present disclosure provides a method of treating a cancer, comprising administering an effective amount of a PTPN2 inhibitor. The PTPN2 inhibitor may be effective in one or more of: stimulating and/or prolonging anti-tumor immunity (e.g., destabilizing Tregs, augmenting CD4+ and CD8+ T cell function), inhibiting proliferation of cancer cells, inhibiting invasion or metastasis of cancer cells, killing cancer cells, increasing the sensitivity of cancer cells to treatment with a second anti-tumor agent, and reducing severity or incidence of symptoms associated with the presence of cancer cells. In some embodiments, said method comprises administering to the cancer cells a therapeutically effective amount of a PTPN2 inhibitor in vivo. In some embodiments, the administration first takes place ex vivo to a population of effector cells, followed by infusing the PTPN2-inhibitor treated effector cells into the subject as further detailed below.

A PTPN2 inhibitor for use in the present disclosure can be any PTPN2 inhibitor that is known in the art, and can include any chemical entity that, upon administration to a subject, results in reduced expression or activity of PTPN2 (e.g., inhibition of expression or activity of PTPN2) in the subject. For example, a suitable PTPN2 inhibitor can be selected from a variety of types of molecules. In particular, the PTPN2 inhibitor can be a biological or chemical compound, such as a simple or complex organic or inorganic molecule, peptide, peptido mimetic, protein (e.g., antibody), liposome, or a polynucleotide (e.g., small interfering RNA, short hairpin RNA, microRNA, antisense, aptamer, ribozyme, triple helix). In some examples, the methods disclosed herein utilize a small molecule PTPN2 inhibitor. As used herein, the term "small molecule" refers to a low molecular weight organic compound, such as a compound having a molecular weight of at most about 1,500 g/mol, 1,400 g/mol, 1,300 g/mol, 1,200 g/mol, 1,100 g/mol, 1,000 g/mol, 900 g/mol, 800 g/mol, 700 g/mol, 600 g/mol, 500 g/mol, or less. In some embodiments, the small molecule is not a nucleic acid molecule (e.g., that is not an RNA or a DNA molecule). In some embodiments, the small molecule is devoid of a ribose moiety. A small molecule PTPN2 inhibitor compound may be cell-permeable. Alternatively, such compound may not or need not be cell-permeable. A small molecule PTPN2 inhibitor compound may be reversible, e.g., upon binding and inhibiting activity of PTPN2, it may be released from the PTPN2 to re-activate the PTPN2. Alternatively, such compound may not or need not be reversible. An exemplary PTPN2 small molecule inhibitor is Compound 8 (J. Am. Chem. Soc. 131(36): 13072-13079, 2009, incorporated herein by reference), which has the following chemical formula:

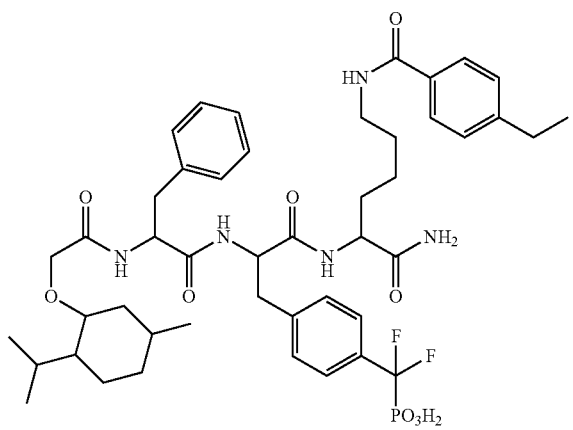

In some embodiments, the PTPN2 inhibitor has a structure, or a pharmaceutically acceptable salt thereof, represented by Formula A:

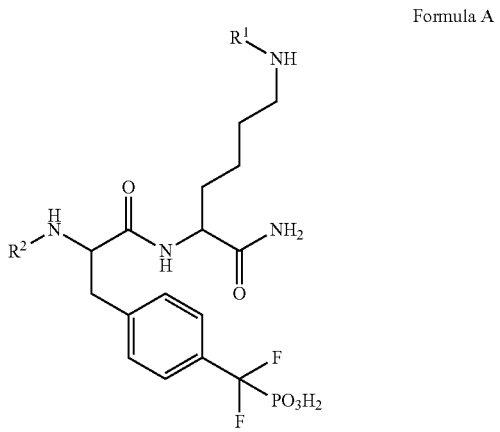

Formula A wherein:
R$^1$ and R$^2$ are the same or different and are each individually a residue of a carboxylic acid, and pharmaceutically acceptable salts thereof.

In some embodiments, the PTPN2 inhibitor has a structure, or a pharmaceutically acceptable salt thereof, represented by Formula A:

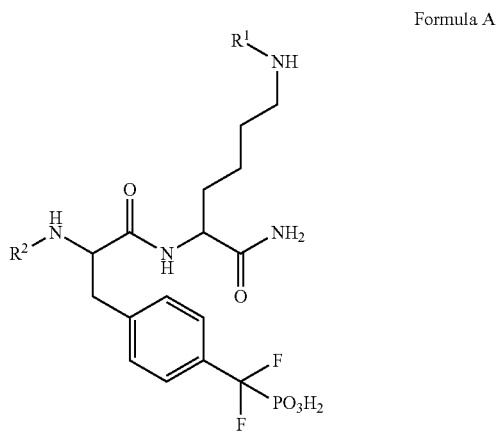

Formula A wherein:
R$^1$ and R$^2$ are the same or different and are each individually a residue of a carboxylic acid, and pharmaceutically acceptable salts thereof, wherein said carboxylic acid is selected from the group consisting of: 3-dimethylaminobenzoic acid, 2-(2-cyanophenylthio) benzoic acid, 2-(4-chlorobenzoyl)benzoic acid, (−)-2-oxo-4-thiazolidine-carboxylic acid, (−)-N-acetyl-neuraminic acid, (+)-6-methoxy-a-methyl-2-naphthaleneacetic acid, (+)-carbobenzyloxy-D-proline, (+)-menthoxyacetic acid, (+)-2-(2-chlorophenoxy)propionic acid, (+)-1-methyl-2-cyclohexene-1-carboxylic acid, (1-naphthoxy)acetic acid, (1R)-(1a,2b,3a)-(+)-3-methyl-2-nitromethyl-5-oxocyclopentaneacetic acid, (1R,4R)-7,7-dimethyl-2-oxobicyclo[2.2.1]heptane-1-carboxylic acid, (1S)-(+)-camphanic acid, (1S,3R,4S,5R)-1,3,4,5-tetrahydroxycyclohexanecarboxylic acid, (2,4-di-tert-pentylphenoxyl)acetic acid, (2-naphthoxy) acetic acid, (2-pyrimidylthio)acetic acid, (4-carboxybutyl)triphenyl-phosphonium bromide, (4-chlorophenylthio)acetic acid, (4-methylphenoxy)acetic acid, (a,a,a-trifluoro-m-tolyl)acetic acid, (E)-2-((4-hydroxyphenyl)diazenyl)benzoic acid, (E)-2-methyl-3-(2,4,5-trimethoxyphenyl)acrylic acid, (methylthio) acetic acid, (R)-(−)-2-hydroxy-4-phenylbutyric acid, (R)-(−)-3-chloromandelic acid, (R)-(−)-hexahydro-mandelic acid, (R)-(+)-2-pyrrolidone-5-carboxylic acid, (R)-(+)-citronellic acid, (R)-2-(1-phenylethylcarbamoyl)benzoic acid, (R)-2-hydroxy-2-phenylacetic acid, (R)-3,3,3-trifluoro-2-methoxy-2-phenylpropanoic acid, (R)-6-hydroxy-2,5,7,8-tetramethylchroman-2-carboxylic acid, (S)-(−)-indoline-2-carboxylic acid, (S)-(+)-2-oxo-4-phenyl-3-oxazolidineacetic acid, (S)-(+)-5-oxo-2-tetrahydro-furancarboxylic acid, (S)-(+)-hexahydromandelic acid, (S)-(+)-N-[1-(1-naphthyl)-ethyl]-phthalamic acid, (S)-(+)-O-acetylmandelic acid, (S)-2-(1-phenylethylcarbamoyl)benzoic acid, (S)-2-(4-isobutylphenyl)propanoic acid, (S)-2-(phenylcarbamoyloxy)propanoic acid, (S)-3-(benzyloxycarbonyl)-2-oxoimidazolidine-4-carboxylic acid, (S)-3,3,3-trifluoro-2-methoxy-2-phenylpropanoic acid, (S)-3,3,3-trifluoro-2-methoxy-2-phenylpropanoic acid, (S)-6-methoxy-2,5,7,8-tetramethylchroman-2-carboxylic acid, (trimethylsilyl)acetic acid, (z)-2-cyano-3-(3-hydroxyphenyl)acrylic acid, 1-(4-chlorophenyl)-1-cyclopentanecarboxylic acid, 1-(tert-butyl)hydrocinnamic acid, 1,2-phenylenedioxydiacetic acid, 1,4-dihydro-2-methylbenzoic acid, 1,4-dihydroxy-2-naphthoic acid, 10-hydroxydecanoic acid, 10-undecynoic acid, 1-admantanecarboxylic acid, 1-cyano-1-cyclopropane-carboxylic acid, 1-hydroxy-2-naphthoic acid, 1-isoquinolinecarboxylic acid, 1-methyl-(1S,2R)-(+)-cis-1,2,3,6-tetrahydrophthalate, 1-methyl-1-cyclohexane-carboxylic acid, 1-methyl-1H-indole-2-carboxylic acid, 1-methyl-2-pyrrolecarboxylic acid, 1-methylcyclopropane-carboxylic acid, 1-naphthoic acid, 1-phenyl-1-cyclopentane-carboxylic acid, 1-phenyl-1-cyclopropane-carboxylic acid, 1-pyreneacetic acid, 1-pyrenebutyric acid, 1-pyrenecarboxylic acid, 2-((1R, 2R,3R,4S)-3-hydroxy-4,7,7-trimethylbicyclo[2.2.1]heptan-2-yl)acetic acid, 2-((benzyloxycarbonyl)(methyl)amino)-2-methylpropanoic acid, 2-(2, (trifluoromethyl)phenyl)acetic acid, 2-(2,4,5-trichlorophenoxy)-propionic acid, 2-(2,4-dichlorophenoxy)-propionic acid, 2-(3,5-dinitrobenzamido)-2-phenylacetic acid, 2-(3,5-dinitrobenzamido)-4-methylpentanoic acid, 2-(3-chlorophenoxy)propionic acid, 2-(4-(trifluoromethyl)phenyl)acetic acid, 2-(4-chloro-3-nitrobenzoyl)-benzoic acid, 2-(4-chlorophenoxy)-2-methyl-propionic acid, 2-(4-chlorophenoxy)propionic acid, 2-(4-fluorobenzoyl)benzoic acid, 2-(4-hydroxy-3-methoxyphenyl)acetic acid, 2-(4-hydroxyphenoxy)-propionic acid, 2-(4-isobutylphenyl)propanoic acid, 2-(4-nitrophenyl)propionic acid, 2-(benzyloxycarbonylamino)-3-(1H-indol-3-yl)propanoic acid, 2-(trifluoromethyl)acrylic acid, 2-(trifluoromethyl)benzoic acid, 2-(trifluoromethyl)cinnamic acid, 2,2,3,3-tetramethyl-cyclopropanecarboxylic acid, 2,2-bis(hydroxymethyl)-propionic acid, 2,3,4,5,6-pentafluoro-cinnamic acid, 2,3,4,5,6-pentafluorophenoxy acetic acid, 2,3,4,5,6-pentafluorophenyl-acetic acid, 2,3,4,5-tetrafluorobenzoic acid, 2,3,4-trifluorocinnamic acid, 2,3,4-trihydroxybenzoic acid, 2,3,4-trimethoxybenzoic acid, 2,3,5,6-tetrafluoro-4-hydroxy-benzoic acid hydrate, 2,3,5,6-tetrafluorobenzoic acid, 2,3,5,6-tetrafluoro-p-toluic acid, 2,3,5-triiodobenzoic acid, 2,3, 6-trifluorobenzoic acid, 2,3-dichlorobenzoic acid, 2,3-difluorobenzoic acid, 2,3-dihydroxybenzoic acid, 2,3-dimethylbenzoic acid, 2,4,5-trichlorophenoxyacetic acid, 2,4,5-trimethoxybenzoic acid, 2,4,6-trichlorobenzoic acid, 2,4,6-trifluorobenzoic acid, 2,4,6-trihydroxybenzoic acid monohydrate, 2,4,6-trimethylbenzoic acid, 2,4-bis(trifluoromethyl)-benzoic acid, 2,4-dichloro-5-fluorobenzoic acid, 2,4-dichloro-5-sulfamoyl-benzoic acid, 2,4-dichlorobenzoic acid, 2,4-dichlorophenylacetic acid, 2,4-difluorobenzoic acid, 2,4-difluorophenylacetic acid, 2,4-dihydroxybenzoic acid, 2,4-dimethylbenzoic acid, 2,4-dinitrobenzoic acid, 2,4-dinitrophenylacetic acid, 2,4-hexadienoic acid, 2,5-bis(trifluoromethyl)-benzoic acid, 2,5-dichlorobenzoic acid, 2,5-difluorobenzoic acid, 2,5-difluorophenylacetic acid, 2,5-dihydroxybenzoic acid, 2,5-dihydroxyphenylacetic acid, 2,5-dimethoxybenzoic acid, 2,5-dimethoxycinnamic acid, 2,6-dichloro-3-nitrobenzoic acid, 2,6-difluorobenzoic acid, 2,6-difluorophenylacetic acid, 2,6-dihydroxybenzoic acid, 2,6-dimethoxynicotinic acid, 2,6-dimethylbenzoic acid, 2,6-heptadienoic acid, 2-[4-(dibutylamino)-2-hydroxybenzoyl]benzoic acid, 2-bibenzylcarboxylic acid, 2-biphenylcarboxylic acid, 2-bromo-3-nitrobenzoic acid, 2-bromo-4,5-dimethoxybenzoic acid, 2-bromo-5-methoxybenzoic acid, 2-bromo-5-nitrobenzoic acid, 2-bromoacrylic acid, 2-bromophenylacetic acid, 2-chloro-3-nitrobenzoic acid, 2-chloro-4,5-difluorobenzoic acid, 2-chloro-4-fluorobenzoic acid, 2-chloro-5-(methylthio)-benzoic acid, 2-chloro-5-(trifluoro-methyl)benzoic acid, 2-chloro-5-nitrobenzoic acid, 2-chloro-5-nitrocinnamic acid, 2-chloro-6-fluorobenzoic acid, 2-chloro-6-fluorophenylacetic acid, 2-chloro-6-methylnicotinic acid, 2-chlorobenzoic acid, 2-chloronicotinic acid, 2-chlorophenylacetic acid, 2-chloropropionic acid, 2-ethoxy-1-naphthoic acid, 2-ethoxybenzoic acid, 2-ethyl-2-hydroxybutyric acid, 2-ethylbutyric acid, 2-ethylhexanoic acid, 2-ethylthio-2,2-diphenyl-acetic acid, 2-fluoro-3-(trifluoromethyl)-benzoic acid, 2-fluoro-4-(trifluoromethyl)-benzoic acid, 2-fluoro-5-methylbenzoic acid, 2-fluoro-5-nitrobenzoic acid, 2-fluoro-6-(trifluoromethyl)-benzoic acid, 2-fluorobenzoic acid, 2-fluorocinnamic acid, 2-fluorophenylacetic acid, 2-hydroxy-3-isopropyl-6-methylbenzoic acid, 2-hydroxy-3-isopropylbenzoic acid, 2-hydroxy-3-methylbutyric acid, 2-hydroxy-6-isopropyl-3-methylbenzoic acid, 2-hydroxycaproic acid, 2-hydroxyhippuric acid, 2-hydroxyisobutyric acid, 2-hydroxyisobutyric acid, 2-hydroxynicotinic acid, 2-hydroxyphenylacetic acid, 2-iodobenzoic acid, 2-mercaptonicotinic acid, 2-methoxy-2-phenylacetic acid, 2-methoxy-4-(methylthio)-benzoic acid, 2-methoxy-4-nitrobenzoic acid, 2-methoxyphenylacetic acid, 2-methyl-1-cyclohexane-carboxylic acid (cis and trans), 2-methyl-3-nitrobenzoic acid, 2-methyl-3-phenylpropanoic acid, 2-methyl-4-oxo-4-phenylbutyric acid, 2-methyl-6-nitrobenzoic acid, 2-methylbutyric acid, 2-methylcinnamic acid, 2-methylcyclopropane-carboxylic acid (cis&trans), 2-methylhexanoic acid, 2-methylhippuric acid, 2-methylhydrocinnamic acid, 2-methylvaleric acid, 2-naphthoic acid, 2-naphthylacetic acid, 2-nitro-4-(trifluoromethyl)benzoic acid, 2-nitrobenzoic acid, 2-norbornaneacetic acid, 2-oxo-6-pentyl-2H-pyran-3-carboxylic acid, 2-phenoxybenzoic acid, 2-phenoxybutyric acid, 2-phenoxypropionic acid, 2-propylpentanoic acid, 2-quinoxalinecarboxylic acid, 2-thiopheneacetic acid, 2-thiopheneacetic acid, 2-thiopheneglyoxylic acid, 3-(2-hydroxyphenyl)propionic acid, 3-(2-thienyl)acrylic acid, 3-(3,4,5-trimethoxyphenyl)-propionic acid, 3-(3,4-dimethoxyphenyl)-propionic acid, 3-(3-hydroxy-2,4,6-triiodophenyl)pentanoic acid, 3-(3-hydroxyphenyl)-propionic acid, 3-(3-methoxyphenyl)propionic acid, 3-(4-chlorobenzoyl)propionic acid, 3-(4-chlorobenzoyl)propionic acid, 3-(4-chlorobenzoyl)propionic acid, 3-(4-fluorobenzoyl)propionic acid, 3-(4-hydroxyphenyl)propionic acid, 3-(phenylsulfonyl)propionic acid, 3-(trifluoromethyl)cinnamic acid, 3-(trimethylsilyl)propynoic acid, 3,3,3-triphenylpropionic acid, 3,4-(methylenedioxy)cinnamic acid, 3,4-(methylenedioxy)phenyl-acetic acid, 3,4-dichlorobenzoic acid, 3,4-dichlorophenoxyacetic acid, 3,4-diethoxybenzoic acid, 3,4-difluorobenzoic acid, 3,4-dihydroxybenzoic acid, 3,4-dihydroxyhydrocinnamic acid, 3,4-dihydroxyphenylacetic acid, 3,5,6-trichlorosalicylic acid, 3,5-bis(trifluoromethyl)-phenyl acetic acid, 3,5-dibromobenzoic acid, 3,5-dichlorosalicyclic acid, 3,5-difluorocinnamic acid, 3,5-dihydroxy-2-naphthoic acid, 3,5-dinitrobenzoic acid, 3,5-dinitro-o-tuluic acid, 3,5-dinitro-p-toluic acid, 3,5-dinitrosalicyclic acid, 3,5-di-tert-butyl-4-hydroxybenzoic acid, 3,5-di-tert-butylbenzoic acid, 3,7- dihydroxy-2-naphthoic acid, 3,thiopheneacetic acid, 3-benzoyl-2-pyridine-carboxylic acid, 3-benzoylbenzoic acid, 3-bromo-4-fluorobenzoic acid (95%), 3-bromo-4-methylbenzoic acid, 3-bromo-5-iodobenzoic acid, 3-bromobenzoic acid, 3-bromocinnamic acid, 3-carboxy-PROXYL, 3-chloro-2-nitrobenzoic acid, 3-chloro-4-fluorobenzoic acid, 3-chloro-4-hydroxyphenyl-acetic acid, 3-chlorosalicylic acid, 3-cyanobenzoic acid, 3-fluoro-2-methylbenzoic acid, 3-fluoro-4-hydroxy-phenylacetic acid, 3-fluoro-4-methoxybenzoic acid, 3-fluorophenylacetic acid, 3-furoic acid, 3-hydroxy-2-naphthoic acid, 3-hydroxy-2-quinoxaline-carboxylic acid, 3-hydroxy-4-methoxybenxoic acid, 3-hydroxy-4-methoxy-cinnamic acid, 3-hydroxy-4-nitrobenzoic acid, 3-hydroxybenzoic acid, 3-hydroxybutyric acid, 3-hydroxyphenylacetic acid, 3-indolebutyric acid, 3-indoleglyoxylic acid, 3-indolepropionic acid, 3-iodo-4-methylbenzoic acid, 3-iodobenzoic acid, 3-isoquinolinecarboxylic acid hydrate, 3-methoxy-4-nitrobenzoic acid, 3-methoxycyclohexane-carboxylic acid (cis&trans), 3-methyl-2-phenyvaleric acid, 3-methylhippuric acid, 3-methylindene-2-carboxylic acid, 3-methylsalicylic acid, 3-methyl valeric acid, 3-nitreobenzoic acid, 3-nitrophenylacetic acid, 3-nitropropionic acid, 3-noradamantanecarboxylic acid, 3-oxo-1-indancarboxylic acid, 3-phenoxybenzoic acid, 3-phenylbutyric acid, 3-p-tolylpropanoic acid, 3-thiophenecarboxylic acid, 4-(1, 3-dioxoisoindolin-2-yl)-2-hydroxybutanoic acid, 4-(2, 4,5-trichlorophenoxy)-butyric acid, 4-(2,4-dichlorophenoxy)-butyric acid, 4-(2,4-di-tert-pentylphenoxy)butyric acid, 4-(2-phenoxyethoxy) benzoic acid, 4-(3,4-dimethoxyphenyl)-butyric acid, 4-(4-methoxyphenyl)butyric acid, 4-(4-nitrophenyl)butyric acid, A-(diethylamino)benzoic acid, 4-(dimethylamino)cinnamic acid, 4-(dimethylamino)phenyl-acetic acid, 4-(ethylthio)benzoic acid, 4-(hydroxymethyl)benzoic acid, 4-(methylsulfonyl)benzoic acid, 4-(methylthio)benzoic acid, 4-(methylthio)phenylacetic acid, 4-(trifluoromethoxy)benzoic acid, 4'-(trifluoromethyl) biphenyl-2-carboxylic acid, 4-(trifluoromethyl)mandelic acid, 4,4,4-trifluoro-3-methyl-2-butenoic acid, 4,4-bis(4-hydroxyphenyl)-valeric acid, 4,5-dimethoxy-2-nitrobenzoic acid, 4,6-dioxoheptanoic acid, 4-[4-(2-carboxybenzoyl)-phenyl]butyric acid, 4-acetamidobenzoic acid, 4-acetylbenzoic acid, 4-acetylphenoxyacetic acid, 4-benzyloxy-3-methoxyphenylacetic acid, 4-biphenylacetic acid, 4-bromo-3,5-dihydroxy-benzoic acid, 4-bromobenzoic acid, 4-bromocinnamic acid, 4-bromophenylacetic acid, 4-butoxybenzoic acid, 4-butoxyphenylacetic acid, 4-butylbenzoic acid, 4-chloro-2,5-difluorobenzic acid, 4-chloro-3-sulfamoylbenzoic acid, 4-chlorobenzoic acid, 4-chloro-o-tolyloxyacetic acid, 4-chlorophenylacetic acid, 4-chlorosalicylic acid, 4-ethoxycarbonyloxy-3,5-dimethoxybenzoic acid, 4-ethoxyphenylacetic acid, 4-ethylbenzoic acid, 4'-ethylbiphenyl-4-carboxylic acid, 4-fluorenecarboxylic acid, 4-fluoro-1-naphthoic acid, 4-fluoro-2-(trifluoromethyl)-benzoic acid, 4-fluoro-3-nitrobenzoic acid, 4-fluorobenzoic acid, 4-fluorobenzoic acid, 4-fluorocinnamic acid, 4-fluorophenoxyacetic acid, 4-heptyloxybenzoic acid, 4-hexylbenzoic acid, 4-hexyloxybenzoic acid, 4-hydroxy-3-(morpholino-methyl)benzoic acid hydrate, 4-hydroxy-3,5-dinitrobenzoic acid, 4-hydroxy-3-methoxy-benzoic acid, 4-hydroxy-3-methoxy-mandelic acid, 4-hydroxy-3-nitrobenzoic acid, 4-hydroxy-3-nitrophenylacetic acid, 4-hydroxybenzoic acid, 4'-hydroxybiphenyl-4-carboxylic acid, 4-hydroxyphenylacetic acid, 4-hydroxyphenylacetic acid, 4-hydroxyphenylpyruvic acid, 4-iodobenzoic acid, 4-isopropoxybenzoic acid, 4-methoxy-3-nitrobenzoic acid, 4-methoxycyclohexane-carboxylic acid, 4-methoxysalilcylic acid, 4-methyl-1-cyclohexane-carboxylic acid (cis and trans), 4-methyl-3-nitrobenzoic acid, 4-methylhippuric acid, 4-methylsalicyclic acid, 4-methylvaleric acid, 4-nitro-3-pyrazolecarboxylic acid, 4-nitrohippuric acid, 4-nonyloxybenzoic acid, 4-Octylbenoic acid, 4-oxo-4H-1-benzopyran-2-carboxylic acid, 4-oxo-6-phenyl-5-hexenoic acid, 4-pentenoic acid, 4-pentylbenzoic acid, 4-pentylbicyclo[2.2.2]octane-1-carboxylic acid, 4-pentyloxybenzoic acid, 4-pentynoic acid, 4-phenylbutyric acid, 4-Propoxybenzoic acid, 4-propylbenzoic acid, 4-pyrazolecarboxylic acid, 4-tert-butylbenzoic acid, 4-tert-butylcyclohexanecarboxylic acid, 4-vinylbenzoic acid, 5-(4-chlorophenyl)-2-furoic acid, 5,6-dichloronicotinic acid, 5-bromo-2,4-dihydroxybenzoic acid, 5-fluoro-2-methylbenzoic acid, 5-fluoroindole-2-carboxylic acid, 5-fluorosalicylic acid, 5-hydantoinacetic acid, 5-hydroxy-2-indole-carboxylic acid, 5-methoxy-1-indanone-3-acetic acid, 5-methoxy-2-methyl-3-indoleacetic acid, 5-methoxy-2-nitrobenzoic acid, 5-methoxysalicylic acid, 5-methyl-2-nitrobenzoic acid, 5-methyl-2-pyrazine-carboxylic acid, 5-nitro-2-furoic acid, 5-nitro-3-pyrazolecarboxylic acid, 5-phenyl valeric acid, 6-(carbobenzyloxyamino)-caproic acid, 6-acetamidohexnoic acid, 6-bromohexanoic acid, 6-chloronicotinic acid, 6-hydroxy-2,5,7,8-tetramethylchroman-2-carboxylic acid, 6-methylchromone-2-carboxylic acid, 6-methylnicotinic acid, 6-nitrocaproic acid, 6-oxoheptaoic acid, 6-phenylhexanoic acid, 7-(carboxymethyoxy)-4-methylcoumarin, 7-hydroxycoumarin-4-acetic acid, 7-methoxy-2-benzofuran-carboxylic acid, 7-methoxycoumarin-4-acetic acid, 7-oxoctanoic acid, 9-anthracenecarboxylic acid, 9-fluoreneacetic acid, 9-fluorenone-1-carboxylic acid, A,a,a-trifluoro-m-toluic acid, a-acetamidocinnamic acid, abietic acid, acetic acid, acetic acid, acetic acid, acetyl-L-asparagine, acetylsalicyclic acid, acetylsalicylic acid, a-cyano-4-hydroxycinnamic acid, adipic acid monoethyl ester, a-hydroxyhippuric acid, anthranilic acid, anti-3-oxotricyclo[2.2.1.02,6]heptane-7-carboxylic acid, a-phenylcyclopentaneacetic acid, a-phenyl-o-toluic acid, atrolactic acid, benzilic acid, benzotriazole-5-carboxylic acid, benzoylformic acid, bis(4-chlorophenyl)acetic acid, carbobenzyloxy-DL-alanine, carbobenzyloxy-L-alanine, carbobenzyloxy-1-glutamine, carbobenzyloxy-L-valine, cis-2-methoxycinnamic acid, crotonic acid, cyclohexanebutyric acid, cyclohexanecarboxylic acid, cyclohexanepentanoic acid, cyclohexanepropionic acid, cyclopentylacetic acid, D,L-3,4-dihydroxymandelic acid, D-3-phenyllactic acid, decanoic acid, dicyclohexylacetic acid, diethylphosphonoacetic acid, dikegulac hydrate, diphenylacetic acid, fumaric acid monoethyl ester, fiisaric acid, gallic acid, geranic acid, glycolic acid, heptadecafluorononanoic acid, heptanoic acid, hexanoic acid, hippuric acid, hydrocinnamic acid, indole-3-carboxylic acid, indole-4-carboxylic acid, isovaleric acid, L-3-phenyllactic acid, Lauric acid, L-Lactic acid (85%), maleamic acid, methoxyacetic acid, mono-(1R)-(−)-menthyl phthalate, mono-(1S)-(+)-menthyl phthalate, mono-methyl cis-5-norbornene-endo-2,3-dicarboxylate, mono-methyl phthalate, mono-methylterephthalate, N-(2-furoyl)glycine, n-(3,5-dinitrobenzoyl)-DL-a-phenylglycine, N-(3-indolylacetyl)-L-alanine, N-(3-indolylacetyl)-L-isoleucine, N-(3-indolylacetyl)-L-leucine, N-(3-indolylacetyl)-L-phenylalanine, N-(3-indolylacetyl)-L-valine, N-(carbobenzyloxy)-1-phenyl-alanine, N,N-diethyl-3,6-difluoro-phthalamic acid, N—[(R)-1-(1-naphthyl)ethyl]-phthalamic acid, N-[5-(trifluoromethyl)-2-pyridyl]-L-valine, n-acetyl-4-fluoro-DL-phenylalanine, N-acetyl-DL-tryptophan, n-acetyl-1-leucine, N-acetyl-L-methionine, N-acetyl-L-phenylalanine, N-acetyl-L-phenylalanine, n-acetyl-1-tyrosine, N-benzoyl-(2R,3S)-3-phenyl-isoserine, N-benzoyl-L-threonine, N-carbobenzyloxy-2-methyl-alanine, N-carbobenzyloxy-L-glutamic acid 1-methyl ester, N-carbobenzyloxy-L-isoleucine, N-carbobenzyloxy-L-Leucine, n-carbobenzyloxy-1-threonine, n-ethoxycarbonyl-1-phenylalanine, nonanoic acid, N-p-tosylglycine, N-p-tosyl-L-phenylalanine, o-anisic acid, p-anisic acid, pentafluorobenzoic acid, phenoxyacetic acid, phenylacetic acid, podocarpic acid, pyruvic acid, rhodanine-3-acetic acid, S-(thiobenzoyl)thioglycolic acid, s-benzyl-n-carbobenzyloxy-1-cysteine, Sebacic acid monomethyl ester, succinamic acid, succinic 2,2-dimethyl-hydrazide, tetrahydro-2-furoic acid, trans-1-acetyl-4-hydroxy-L-proline, trans-2,3-dimethoxycinnamic acid, trans-2,4-dichlorocinnamic acid, trans-2,4-difluorocinnamic acid, trans-2,5-difluorocinnamic acid, trans-2,6-difluorocinnamic acid, trans-2-chloro-6-fluro-cinnamic acid, trans-2-hexenoic acid, trans-3-(2,3,5,6-tetramethyl-benzoyl)acrylic acid, trans-3-(2,5-dimethylbenzo-yl)-acrylic acid, trans-3-(4-ethoxy-benzoyl)acrylic acid, trans-3-(4-methoxybenzoyl)-acrylic acid, trans-3-(4-methylbenzoyl)-acrylic acid, trans-3,4-difluorocinnamic acid, trans-3-fluorocinnamic acid, trans-3-furanacrylic acid, trans-3-hexenoic acid, trans-4-chloro-3-nitrocinnamic acid, trans-4-hydroxy-3-methoxy-cinnamic acid, trans-4-hydroxy-3-methoxy-cinnamic acid, trans-4-methyl-1-cyclohexane carboxylic acid, trans-4-pentylcyclohexane carboxylic acid, trans-5-bromo-2-methoxy cinnamic acid, trans-styrylacetic acid, trans-styrylacetic acid, tridecafluoroheptanoic acid, trimethylacetic acid, triphenylacetic acid, valeric acid, and Yohimbinic acid, monohydrate.

In some embodiments, the PTPN2 inhibitor is selected from:

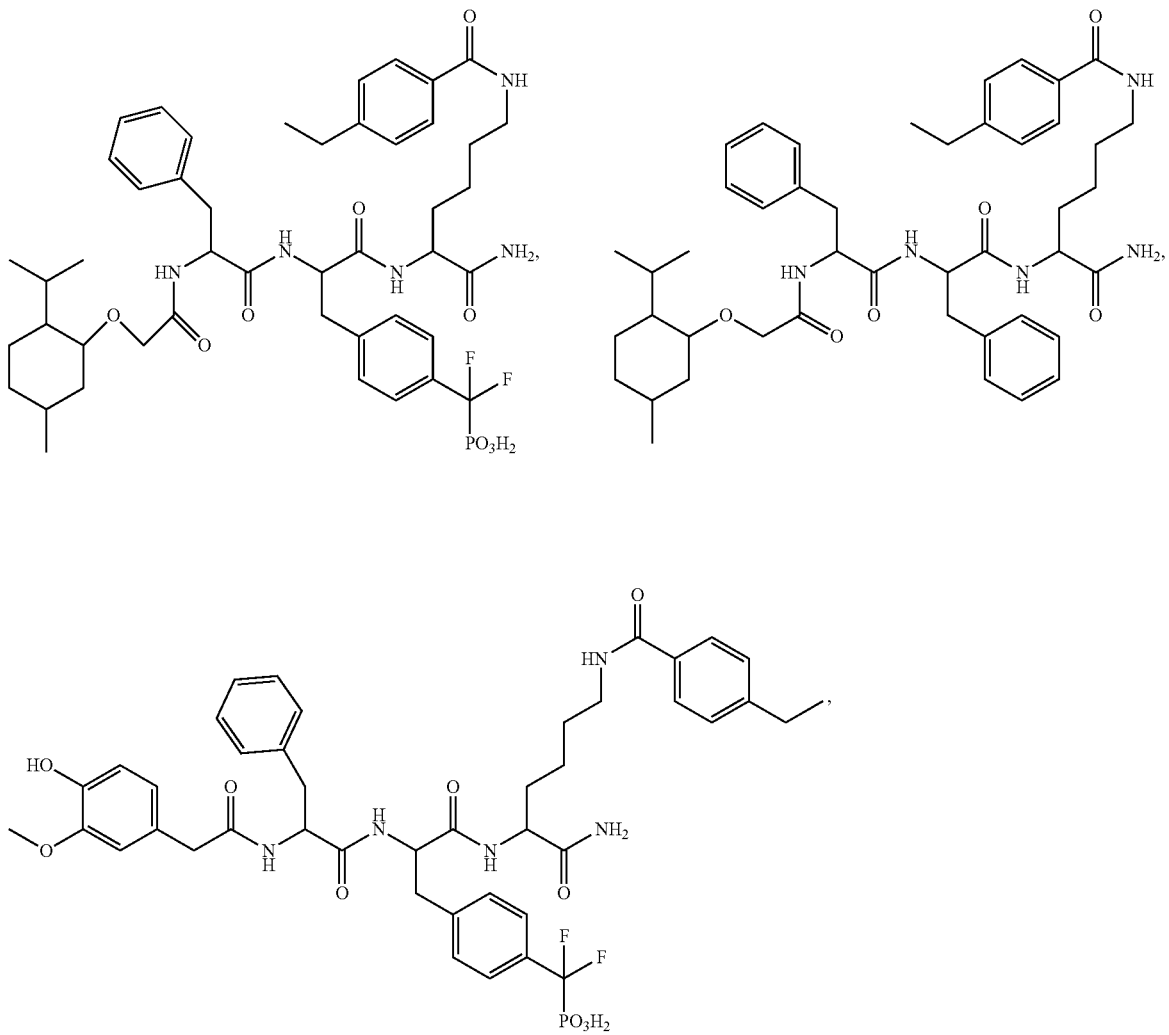

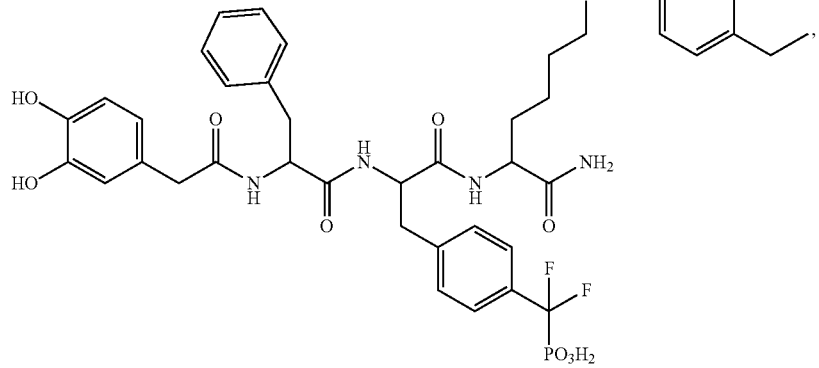

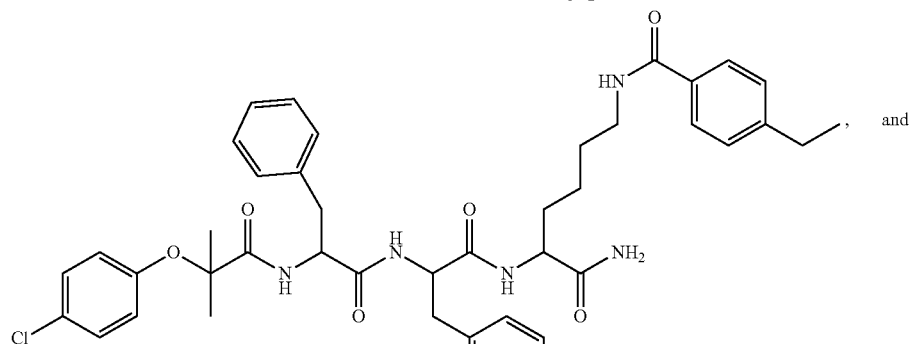

and

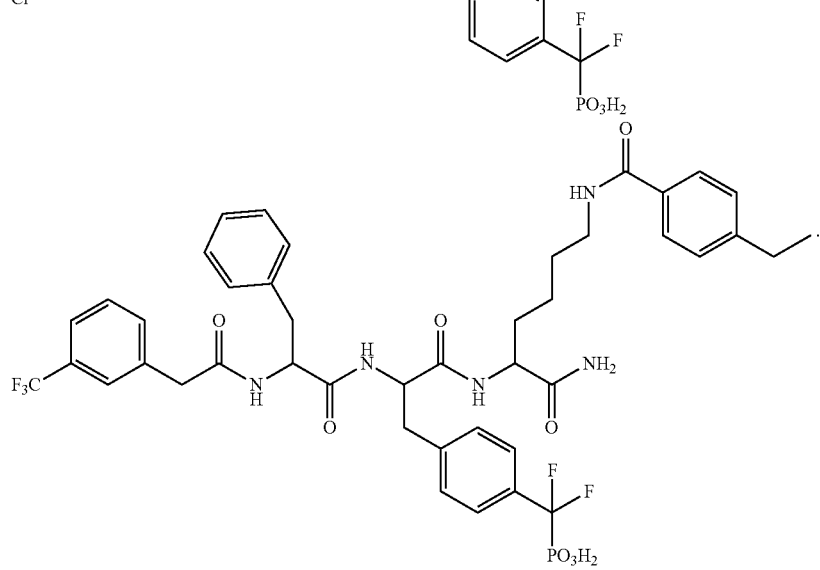

In some embodiments the PTPN2 inhibitor has a structure or a pharmaceutically acceptable salt thereof, represented by Formula B:

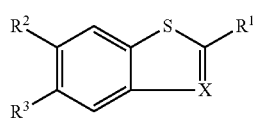

Formula B wherein:

X is selected from CH and N;

$R^1$ is selected from the group consisting of (a) $C_{1-3}$ alkyl optionally substituted with 1-5 halogens and optionally with one group selected from —OH, —$OC_{1-3}$ alkyl optionally substituted with 1-3 halogens, —$SO_xC_{1-3}$ alkyl, and —CN; (b) —(C=O)$R^4$; (c) —CN; (d) —(C=O)$OR^4$; (e) —(C=O)NH$R^4$; (f) —(C=O)NR$^5$R$^6$; and (g) aryl or heteroaryl wherein the aryl and heteroaryl group itself may be optionally substituted with 1-3 substituents independently selected from (i) halogen, (ii) —(C=O)$OC_{1-3}$ alkyl optionally substituted with 1-3 halogens, (iii) —COOH (iv) $C_{1-3}$ alkyl optionally substituted with 1-3 halogens, (v) —OC$_{1-3}$ alkyl optionally substituted with 1-3 halogens, (vi) —SO$_x$Me, (vii) —CN, and (viii) —SO$_2$NH$_2$;

R$^2$ and R$^3$ are independently selected from the group consisting of (a) halogen, and (b) difluoromethylphosphonic acid;

R$^4$ is is selected from the group consisting of (a) H; (b) C$_{1-3}$ alkyl optionally substituted with 1-5 halogens and optionally with one group selected from —OH, —OC$_{1-3}$ alkyl optionally substituted with 1-3 halogens, —SO$_x$C$_{1-3}$ alkyl, and —CN; (d) aryl or heteroaryl wherein the aryl and heteroaryl group itself may be optionally substituted with 1-3 halogens, C$_{1-3}$ alkyl, or C$_{1-3}$ haloalkyl;

R$^5$ and R$^6$ are independently selected from the group consisting of (a) C$_{1-3}$ alkyl optionally substituted with 1-5 halogens and optionally with one group selected from —OH, —OC$_{1-3}$ alkyl optionally substituted with 1-3 halogens, —SO$_x$C$_{1-3}$ alkyl, and —CN; (b) aryl or heteroaryl wherein the aryl or heteroaryl group itself may be optionally substituted by 1-3 halogens, C$_{1-3}$ alkyl, or C$_{1-3}$ haloalkyl; or R$^5$ and R$^6$, together with the nitrogen atom to which they are attached may be joined to form a 5- to 7-membered ring, which may be substituted with 1-3 groups independently selected from (i) halogen, (ii) —(C=O)OC$_{1-3}$ alkyl, (iii) —(C=O)OH, (iv) C$_{1-3}$ alkyl optionally substituted with 1-3 halogens, (v) —OC$_{1-3}$ alkyl optionally substituted with 1-3 halogens, (vi) —OH, (vii) hydroxyalkyl, (viii) aryl or heteroaryl wherein the aryl or heteroaryl group itself may be optionally substituted by 1-3 halogens, C$_{1-3}$ alkyl, or C$_{1-3}$ haloalkyl; and x is an integer from 0 to 2.

In some embodiments, the PTPN2 inhibitor is selected from:

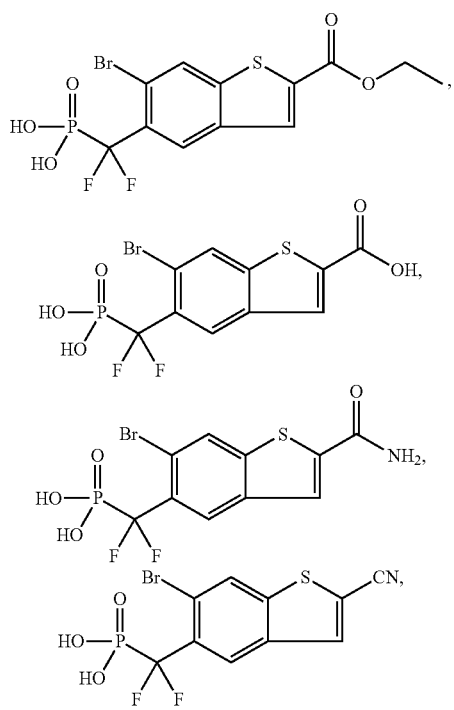

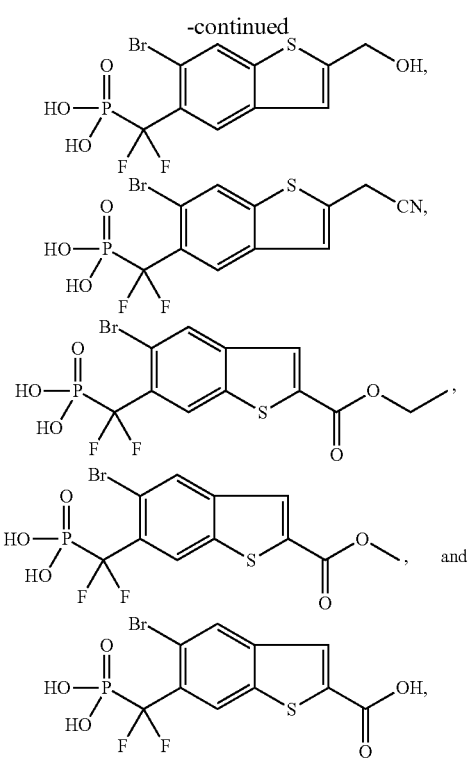

In some embodiments, the PTPN2 inhibitor has a structure, or a pharmaceutically acceptable salt thereof, represented by Formula C:

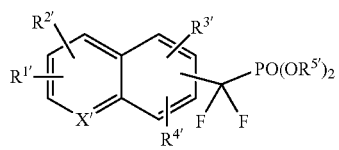

Formula C wherein:

X' is selected from CH and N;

R$^{1'}$ is selected from the group consisting of (a) C$_{1-3}$ alkyl optionally substituted with 1-3 halogens and optionally with one group selected from —OH, —OC$_{1-3}$ alkyl optionally substituted with 1-3 halogens, —SO$_x$C$_{1-3}$ alkyl, and —CN; (b) —C(=O)H, (c) —C(=O)C$_{1-3}$ alkyl optionally substituted with 1-3 halogens, (d) —CN, (e) —HC=NOH, (f) —(CH$_3$)C=NOH, (g) —HC=NOC$_{1-3}$ alkyl optionally substituted with 1-3 halogens, (h) —(CH$_3$)C=NOC$_{1-3}$ alkyl optionally substituted with 1-3 halogens (i) —C(=O)OC$_{1-3}$ alkyl optionally substituted with 1-3 halogens, (j) —C(=O)NHR$^{6'}$, (k) —CH=CH-Phenyl wherein —CH=CH— is optionally substituted with 1-2 substituents independently selected from halogen and C$_{1-2}$ alkyl optionally substituted with 1-3 F, (l) —CH2CH2-Phenyl wherein —CH2CH2- is optionally substituted with 1-4 substituents independently selected from halogen and C$_{1-2}$ alkyl optionally substituted with 1-3 F, (m) Phenyl, (n) -HET-Phenyl, wherein HET is a 5- or 6-membered heteroaromatic ring containing 1-3 heteroatoms selected from O, N and S, (o) —C≡C-Phenyl, and (p) —CH2-Phenyl, wherein the —CH$_2$— group of —CH$_2$-

Phenyl is optionally substituted with 1-2 substituents independently selected from halogen and $C_{1-2}$ alkyl optionally substituted with 1-3 F, wherein Phenyl and HET in all occurrences are optionally substituted with 1-3 substituents independently selected from (i) halogen, (ii) —C(=O)O$C_{1-3}$ alkyl optionally substituted with 1-3 halogens, (iii) —C(=O)OH (iv) $C_{1-3}$ alkyl optionally substituted with 1-3 halogens, (v) —O$C_{1-3}$ alkyl optionally substituted with 1-3 halogens, (vi) —SO$_x$Me, and (vii) —SO$_2$NH$_2$;

$R^{6'}$ is selected from the group consisting of H, $C_{1-3}$ alkyl optionally substituted with 1-3 halogens, Phenyl, and —CH$_2$-Phenyl, wherein Phenyl in both occurrences is optionally substituted with 1-3 substituents independently selected from (i) halogen, (ii) —C(=O)O$C_{1-3}$ alkyl optionally substituted with 1-3 halogens, (iii) —C(=O)OH (iv) $C_{1-3}$ alkyl optionally substituted with 1-3 halogens, and (v) —O$C_{1-3}$ alkyl optionally substituted with 1-3 halogens;

$R^{2'}$ and $R^{4'}$ are independently selected from H, halogen, —CH$_3$, —CF$_3$, —OCH$_3$, and —OCF$_3$;

$R^{3'}$ is halogen, wherein the halogen is bonded to the fused aromatic ring of Formula C at a position ortho to the —CF$_2$PO(O$R^{5'}$)$_2$ group;

each $R^{5'}$ group is independently selected from the group consisting of H and $C_{1-3}$ alkyl optionally substituted with 1-3 halogens, and x is 0, 1, or 2.

In some embodiments, the PTPN2 inhibitor is:

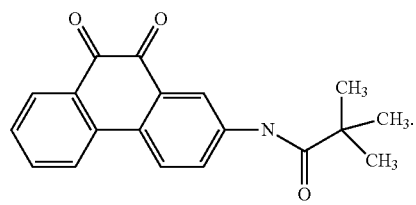 [SMILES: CC(C)(C)C(=O)Nc1ccc2c(c1)C(=O)C(=O)c1ccccc1-2]

In some embodiments, the PTPN2 inhibitor is:

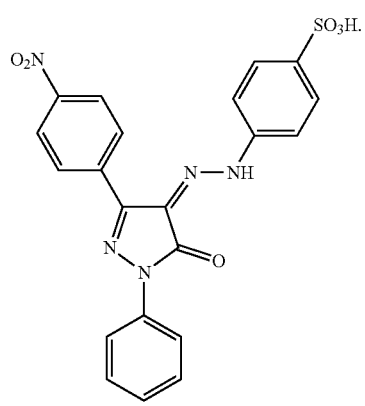 [SMILES: O=C1/C(=N\Nc2ccc(S(=O)(=O)O)cc2)C(c2ccc([N+](=O)[O-])cc2)=NN1c1ccccc1]

In some embodiments, the PTPN2 inhibitor is:

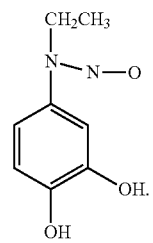 [SMILES: CCN(NO)c1ccc(O)c(O)c1]

In some embodiments, the PTPN2 inhibitor is:

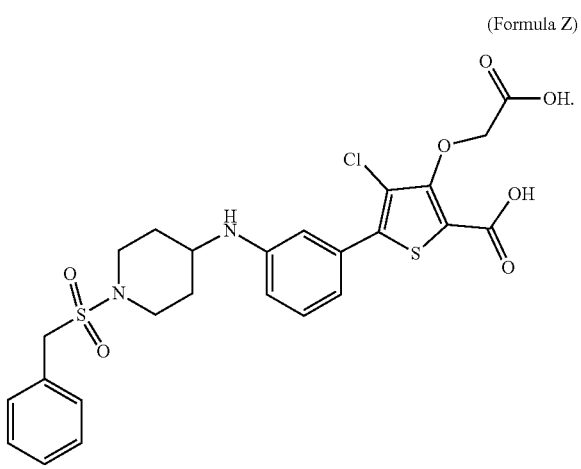 [SMILES: O=C(O)COc1c(C(=O)O)sc(-c2cccc(NC3CCN(S(=O)(=O)Cc4ccccc4)CC3)c2)c1Cl]

(Formula Z)

In some embodiments, the PTPN2 inhibitor is a compound of Formula (I):

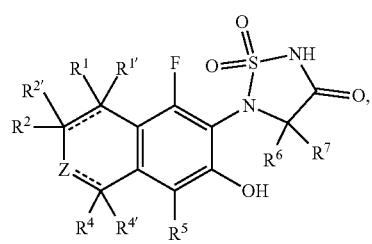

(I)

or a pharmaceutically acceptable salt or solvate thereof, wherein:

Z is C($R^3$), each ═══ indicates a double bond, and $R^{1'}$, $R^{2'}$, and $R^{4'}$ are each absent; or Z is selected from C($R^3$)($R^{3'}$), a bond, and N($R^8$), and each ═══ indicates a single bond;

$R^1$ is selected from hydrogen, deuterium, halogen, hydroxyl, $C_{1-6}$ alkyl, $C_{3-6}$ cycloalkyl, —O—$C_{1-6}$ alkyl, —N($R^a$)—$C_{1-6}$ alkyl, and —$C_{1-6}$ alkylene-5- to 6-membered heterocyclyl;

wherein $C_{1-6}$ alkyl, $C_{3-6}$ cycloalkyl, —O—$C_{1-6}$ alkyl, —N($R^a$)—$C_{1-6}$ alkyl, and —$C_{1-6}$ alkylene-5- to 6-membered heterocyclyl may optionally be substituted on one or more available carbons by one, two, three, or more substituents each independently selected from $R^g$;

wherein if —$C_{1-6}$ alkylene-5- to 6-membered heterocyclyl contains a substitutable ring nitrogen atom, that ring nitrogen atom may optionally be substituted by Rh;

$R^{1'}$ is selected from hydrogen and deuterium;

$R^2$ is selected from hydrogen, halogen, hydroxyl, —$C_{1-6}$ alkyl, —$C_{2-6}$ alkenyl, —O—$C_{1-6}$ alkyl, —$NH_2$, —N($R^a$)—$C_{1-8}$ alkyl, —N($R^a$)—$C_{3-6}$ cycloalkyl, —N($R^a$)—$C_{1-6}$ alkylene-$C_{3-6}$ cycloalkyl, —N($R^a$)—$C_{1-6}$ alkylene-Si($R^c$)$_3$, —$C_{1-6}$ alkylene-N($R^a$)—$C_{1-6}$ alkyl, —$C_{1-6}$ alkylene-N($R^a$)—$C_{1-6}$ alkylene-$C_{3-6}$ cycloalkyl, —$C_{1-6}$ alkylene-N($R^a$)($R^b$), —$C_{1-6}$ alkylene-N($R^a$)—C(O)—O—$C_{1-6}$ alkyl, —N($R^a$)—(C=N($R^b$))—$C_{1-6}$ alkyl, —S(O)$_w$—$C_{1-6}$ alkyl, —C(O)—N($R^a$)—$C_{1-6}$ alkyl, —N($R^a$)—C(O)—$C_{1-6}$ alkyl, —N($R^a$)—S(O)$_w$—$C_{1-6}$ alkyl, —O—C(O)—N($R^a$)—$C_{1-6}$ alkyl, —O—C(O)—N($R^a$)-phenyl, —N($R^a$)—C(O)—O—$C_{1-6}$ alkyl, $C_{3-6}$ cycloalkyl, —O—$C_{3-6}$ cycloalkyl, —$C_{1-6}$ alkylene-$C_{3-6}$ cycloalkyl, —$C_{1-6}$ alkenylene-$C_{3-6}$ cycloalkyl, —O—$C_{1-6}$ alkylene-$C_{3-6}$ cycloalkyl, 5- to 6-membered heteroaryl, 4- to 6-membered heterocyclyl, —O—$C_{1-6}$ alkylene-5- to 6-membered heteroaryl, —O-4- to 6-membered heterocyclyl, —N($R^a$)-4- to 6-membered heterocyclyl, $C_{1-6}$ alkylene-4- to 6-membered heterocyclyl, —O—$C_{1-6}$ alkylene-4- to 6-membered heterocyclyl, —N($R^a$)—$C_{1-6}$ alkylene-4- to 6-membered heterocyclyl, —N($R^a$)—$C_{1-6}$ alkylene-5- to 6-membered heteroaryl, and —N($R^a$)—$C_{1-6}$ alkylene-phenyl;

wherein —$C_{1-6}$ alkyl, —$C_{2-6}$ alkenyl, —O—$C_{1-6}$ alkyl, —N($R^a$)—$C_{1-8}$ alkyl, —N($R^a$)—$C_{3-6}$ cycloalkyl, —N($R^a$)—$C_{1-6}$ alkylene-$C_{3-6}$ cycloalkyl, —N($R^a$)—$C_{1-6}$ alkylene-Si($R^c$)$_3$, —$C_{1-6}$ alkylene-N($R^a$)—$C_{1-6}$ alkyl, —$C_{1-6}$ alkylene-N($R^a$)—$C_{1-6}$ alkylene-$C_{3-6}$ cycloalkyl, —$C_{1-6}$ alkylene-N($R^a$)($R^b$), —$C_{1-6}$ alkylene-N($R^a$)—C(O)—O—$C_{1-6}$ alkyl, —N($R^a$)—(C=N($R^b$))—$C_{1-6}$ alkyl, —S(O)$_w$—$C_{1-6}$ alkyl, —C(O)—N($R^a$)—$C_{1-6}$ alkyl, —N($R^a$)—C(O)—$C_{1-6}$ alkyl, —N($R^a$)—S(O)$_w$—$C_{1-6}$ alkyl, —O—C(O)—N($R^a$)—$C_{1-6}$ alkyl, —O—C(O)—N($R^a$)-phenyl, —N($R^a$)—C(O)—O—$C_{1-6}$ alkyl, $C_{3-6}$ cycloalkyl, —O—$C_{3-6}$ cycloalkyl, —$C_{1-6}$ alkylene-$C_{3-6}$ cycloalkyl, —$C_{1-6}$ alkenylene-$C_{3-6}$ cycloalkyl, —O—$C_{1-6}$ alkylene-$C_{3-6}$ cycloalkyl, 5- to 6-membered heteroaryl, 4- to 6-membered heterocyclyl, —O—$C_{1-6}$ alkylene-5- to 6-membered heteroaryl, —O-4- to 6-membered heterocyclyl, —N($R^a$)-4- to 6-membered heterocyclyl, $C_{1-6}$ alkylene-4- to 6-membered heterocyclyl, —O—$C_{1-6}$ alkylene-4- to 6-membered heterocyclyl, —N($R^a$)—$C_{1-6}$ alkylene-4- to 6-membered heterocyclyl, —N($R^a$)—$C_{1-6}$ alkylene-5- to 6-membered heteroaryl, and —N($R^a$)—$C_{1-6}$ alkylene-phenyl may optionally be substituted on one or more available carbons by one, two, three, or more substituents each independently selected from $R^g$; and wherein if 5- to 6-membered heteroaryl, 4- to 6-membered heterocyclyl, —O—$C_{1-6}$ alkylene-5- to 6-membered heteroaryl, —O-4- to 6-membered heterocyclyl, —N($R^a$)-4- to 6-membered heterocyclyl, $C_{1-6}$ alkylene-4- to 6-membered heterocyclyl, —O—$C_{1-6}$ alkylene-4- to 6-membered heterocyclyl, —N($R^a$)—$C_{1-6}$ alkylene-4- to 6-membered heterocyclyl, or —N($R^a$)—$C_{1-6}$ alkylene-5- to 6-membered heteroaryl contains a substitutable ring nitrogen atom, that ring nitrogen atom may optionally be substituted by $R^h$;

or $R^1$ and $R^2$ taken together with the atoms to which they are attached form a 5- to 6-membered aryl or heteroaryl;

wherein aryl or heteroaryl may optionally be substituted by one or more substituents each independently selected from halogen, hydroxyl, cyano, $C_{1-6}$ alkyl, and $C_{1-6}$ alkoxy, wherein $C_{1-6}$ alkyl and $C_{1-6}$ alkoxy may optionally be substituted by one, two, three, or more substituents each independently selected from $R^p$;

$R^{2'}$ is selected from hydrogen, deuterium, hydroxyl, —$NR^aR^b$, and —N($R^a$)—N($R^b$)—C(O)-phenyl;

$R^3$ is selected from hydrogen, deuterium, halogen, hydroxyl, —$NH_2$, —$C_{1-6}$ alkyl, —O—$C_{1-6}$ alkyl, —O—$C_{1-6}$ alkylene-$C_{3-6}$ cycloalkyl, —O—$C_{1-6}$ alkylene-N($R^a$)—C(O)—O—$C_{1-6}$ alkyl, —N($R^a$)—$C_{1-6}$ alkyl, —N($R^a$)—$C_{1-6}$ alkylene-$C_{3-6}$ cycloalkyl, —S(O)$_w$—$C_{1-6}$ alkyl, —C(O)—N($R^a$)—$C_{1-6}$ alkyl, —N($R^a$)—C(O)—$C_{1-6}$ alkyl, and —$C_{1-6}$ alkylene-4- to 6-membered heterocyclyl;

wherein —$C_{1-6}$ alkyl, —O—$C_{1-6}$ alkyl, —O—$C_{1-6}$ alkylene-$C_{3-6}$ cycloalkyl, —O—$C_{1-6}$ alkylene-N($R^a$)—C(O)—O—$C_{1-6}$ alkyl, —N($R^a$)—$C_{1-6}$ alkyl, —N($R^a$)—$C_{1-6}$ alkylene-$C_{3-6}$ cycloalkyl, —S(O)$_w$—$C_{1-6}$ alkyl, —C(O)—N($R^a$)—$C_{1-6}$ alkyl, —N($R^a$)—C(O)—$C_{1-6}$ alkyl, and —$C_{1-6}$ alkylene-4- to 6-membered heterocyclyl may optionally be substituted on one or more available carbons by one, two, three, or more substituents each independently selected from $R^g$; and wherein if —$C_{1-6}$ alkylene-4- to 6-membered heterocyclyl contains a substitutable ring nitrogen atom, that ring nitrogen atom may optionally be substituted by $R^h$;

$R^{3'}$ is selected from hydrogen and deuterium;

$R^4$ is selected from hydrogen, halogen, —$C_{1-6}$ alkyl, —$C_{3-6}$ cycloalkyl, and —$C_{1-6}$ alkylene-4- to 6-membered heterocyclyl;

wherein —$C_{1-6}$ alkyl, —$C_{3-6}$ cycloalkyl, and —$C_{1-6}$ alkylene-4- to 6-membered heterocyclyl may optionally be substituted on one or more available carbons by one, two, three, or more substituents each independently selected from $R^g$; and wherein if —$C_{1-6}$ alkylene-4- to 6-membered heterocyclyl contains a substitutable ring nitrogen atom, that ring nitrogen atom may optionally be substituted by $R^h$;

$R^{4'}$ is selected from hydrogen and deuterium;

$R^5$ is selected from hydrogen, deuterium, halogen, —$C_{1-6}$ alkyl, —$C_{3-6}$ cycloalkyl, and —$C_{1-6}$ alkylene-4- to 6-membered heterocyclyl;

wherein —$C_{1-6}$ alkyl, —$C_{3-6}$ cycloalkyl, and —$C_{1-6}$ alkylene-4- to 6-membered heterocyclyl may optionally be substituted on one or more available carbons by one, two, three, or more substituents each independently selected from $R^g$; and wherein if —$C_{1-6}$ alkylene-4- to 6-membered heterocyclyl contains a substitutable ring nitrogen atom, that ring nitrogen atom may optionally be substituted by $R^h$;

$R^6$ is selected from hydrogen, deuterium, and —$C_{1-6}$ alkyl;

$R^7$ is selected from hydrogen, deuterium, and —$C_{1-6}$ alkyl;

$R^g$ is selected from hydrogen and —$C_{1-6}$ alkyl;

$R^g$ is independently selected for each occurrence from hydrogen, deuterium, halogen, hydroxyl, cyano, nitro, oxo, —C(O)OH, $R^aR^bN$—, $R^aR^bN$—C(O)—, $R^aR^bN$—SO$_w$—, $R^aR^bN$—C(O)—N($R^a$)—, $C_{1-6}$ alkyl, $C_{2-6}$ alkenyl, $C_{2-6}$ alkynyl, $C_{3-6}$ cycloalkyl, phenyl, $C_{3-6}$ cycloalkyl-$C_{1-6}$ alkylene-, $C_{3-6}$ cycloalkyl-$C_{1-6}$ alkylene-O—, $C_{3-6}$ cycloalkyl-$C_{1-6}$ alkylene-(NR$^a$)—(CO)—, $C_{1-6}$ alkoxy, $C_{3-6}$ alkenyloxy, $C_{3-6}$ alkynyloxy, $C_{3-6}$ cycloalkoxy, $C_{1-6}$ alkyl-C(O)—, $C_{1-6}$ alkyl-O—C(O)—, $C_{1-6}$ alkyl-C(O)—O—, $C_{1-6}$ alkyl-S(O)$_w$—, $C_{1-6}$ alkyl-N($R^a$)—, $C_{1-6}$ alkyl-N($R^a$)—C(O)—, $C_{1-6}$ alkyl-C(O)—N($R^a$)—, $C_{1-6}$ alkyl-N($R^a$)—C(O)—N ($R^a$)—, $C_{1-6}$ alkyl-N($R^a$)—SO$_w$—, —$C_{3-6}$ cycloalkyl-N($R^a$)—SO$_w$—, $C_{1-6}$ alkyl-SO$_w$—N($R^a$)—, $C_{3-6}$ cycloalkyl-SO$_w$—N($R^a$)—, 4- to 6-membered heterocyclyl-SO$_w$—N($R^a$)—, $C_{1-6}$ alkoxy-C(O)—N($R^a$)—, $C_{1-6}$ alkyl-C(O)—N($R^a$)—$C_{1-6}$ alkyl-, $C_{1-6}$ alkyl-N ($R^a$)—C(O)—$C_{1-6}$ alkyl-, —P(O)($C_{1-3}$ alkyl)$_2$, and $C_{1-6}$ alkoxy-$C_{1-6}$ alkyl-;

wherein $C_{1-6}$ alkyl, $C_{2-6}$ alkenyl, $C_{2-6}$ alkynyl, $C_{3-6}$ cycloalkyl, phenyl, $C_{3-6}$ cycloalkyl-$C_{1-6}$ alkylene-, $C_{3-6}$ cycloalkyl-$C_{1-6}$ alkylene-O—, $C_{3-6}$ cycloalkyl-$C_{1-6}$ alkylene-(NR$^a$)—(CO)—, $C_{1-6}$ alkoxy, $C_{3-6}$ alkenyloxy, $C_{3-6}$ alkynyloxy, $C_{3-6}$ cycloalkoxy, $C_{1-6}$ alkyl-C(O)—, $C_{1-6}$ alkyl-O—C(O)—, $C_{1-6}$ alkyl-C(O)—O—, $C_{1-6}$ alkyl-S(O)$_w$—, $C_{1-6}$ alkyl-N($R^a$)—, $C_{1-6}$ alkyl-N($R^a$)—C(O)—, $C_{1-6}$ alkyl-C(O)—N ($R^a$)—, $C_{1-6}$ alkyl-N($R^a$)—C(O)—N($R^a$)—, $C_{1-6}$ alkyl-N($R^a$)—SO$_w$—, —$C_{3-6}$ cycloalkyl-N($R^a$)—SO$_w$—, $C_{1-6}$ alkyl-SO$_w$—N($R^a$)—, $C_{3-6}$ cycloalkyl-SO$_w$—N($R^a$)—, 4- to 6-membered heterocyclyl-SO$_w$—N($R^a$)—, $C_{1-6}$ alkoxy-C(O)—N($R^a$)—, $C_{1-6}$ alkyl-C(O)—N($R^a$)—$C_{1-6}$ alkyl-, $C_{1-6}$ alkyl-N ($R^a$)—C(O)—$C_{1-6}$ alkyl, —P(O)($C_{1-3}$ alkyl)$_2$, and $C_{1-6}$ alkoxy-$C_{1-6}$ alkyl- may optionally be substituted by one, two, three, or more substituents each independently selected from RP;

or 2 $R^g$ on adjacent atoms, together with the atoms to which they are attached, form a 5- to 6-membered aryl or heteroaryl;

$R^h$ is independently selected for each occurrence from $C_{1-6}$ alkyl, $C_{3-6}$ alkenyl, $C_{3-6}$ alkynyl, $C_{3-6}$ cycloalkyl, —$C_{1-6}$alkylene-$C_{3-6}$ cycloalkyl, $C_{1-6}$ alkyl-S(O)$_2$—, $C_{3-6}$ cycloalkyl-S(O)$_2$—, 4- to 6-membered heterocyclyl-S(O)$_2$—, 4- to 6-membered heterocyclyl-$C_{1-6}$ alkyl-S(O)$_2$—, 5- to 6-membered heteroaryl-S(O)$_2$—, phenyl-S(O)$_2$—, phenyl-$C_{1-6}$ alkyl-S(O)$_2$, $C_{1-6}$ alkyl-C (O)—, $C_{1-6}$ cycloalkyl-C(O)—, $C_{1-6}$ alkoxy-C(O)—, $R^aR^bN$—C(O)—, $R^aR^bN$—SO$_2$—, and —P(O)($C_{1-3}$ alkyl)$_2$;

wherein $C_{1-6}$ alkyl, $C_{3-6}$ alkenyl, $C_{3-6}$ alkynyl, $C_{3-6}$ cycloalkyl, —$C_{1-6}$ alkylene-$C_{3-6}$ cycloalkyl, $C_{1-6}$ alkyl-S(O)$_2$—, $C_{3-6}$ cycloalkyl-S(O)$_2$—, 4- to 6-membered heterocyclyl-S(O)$_2$—, 4- to 6-membered heterocyclyl-$C_{1-6}$ alkyl-S(O)$_2$—, 5- to 6-membered heteroaryl-S(O)$_2$—, phenyl-S(O)$_2$—, phenyl-$C_{1-6}$ alkyl-S(O)$_2$, $C_{1-6}$ alkyl-C(O)—, $C_{1-6}$ cycloalkyl-C(O)—, $C_{1-6}$ alkoxy-C(O)—, $R^aR^bN$—C (O)—, $R^aR^bN$—SO$_2$—, and —P(O)($C_{1-3}$ alkyl)$_2$ may optionally be substituted by one, two, three, or more substituents each independently selected from RP;

$R^p$ is independently selected for each occurrence from halogen, deuterium, hydroxyl, cyano, $C_{1-6}$ alkyl, $C_{1-6}$ alkoxy, $C_{3-6}$ cycloalkyl, 4- to 6-membered heterocyclyl, $R^aR^bN$—, $R^aR^bN$-carbonyl-, $R^aR^bN$—SO$_2$—, and $R^aR^bN$-carbonyl-N($R^a$)—;

$R^a$ and $R^b$ are independently selected for each occurrence from hydrogen, $C_{1-6}$ alkyl, and $C_{3-6}$ cycloalkyl;

wherein $C_{1-6}$ alkyl and $C_{3-6}$ cycloalkyl may optionally be substituted by one or more substituents each independently selected from halogen, cyano, oxo, hydroxyl, and $C_{1-6}$ alkoxy, wherein $C_{1-6}$ alkoxy is optionally substituted by one, two, or three fluorine atoms;

or $R^a$ and $R^b$ together with the nitrogen to which they are attached from a 4- to 6-membered heterocyclyl, wherein 4- to 6-membered heterocyclyl may optionally be substituted by one or more substituents each independently selected form the group consisting of halogen, cyano, oxo, and hydroxyl;

$R^c$ is independently selected for each occurrence from hydroxyl, $C_{1-4}$ alkyl, and phenyl; and w is 0, 1, or 2.

In some embodiments, the compound of Formula (I) is a compound of Formula (I-A):

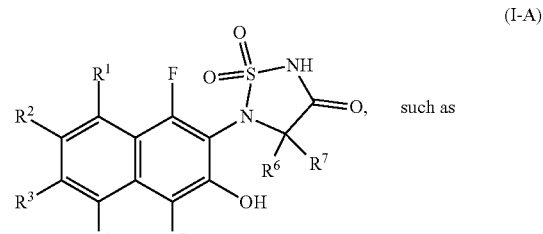

(I-A)

(I-A1)

or a pharmaceutically acceptable salt or solvate thereof.

In some embodiments, the compound of Formula (I) is a compound of Formula (I-B):

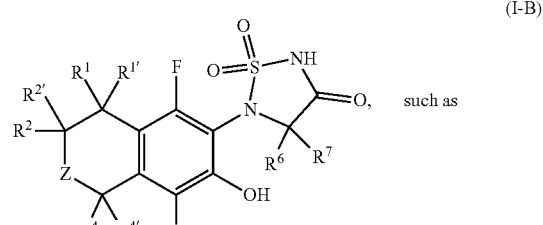

(I-B)

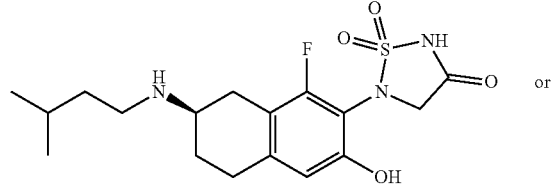

(I-B1)

or

-continued (I-B2)

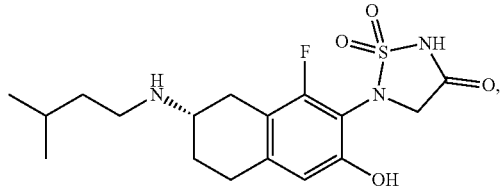

or a pharmaceutically acceptable salt or solvate thereof.

In some embodiments, the PTPN2 inhibitor is a compound described in WO2019/246513 or WO2021/127499, each of which is incorporated by reference in its entirety, including Compound 124. In some embodiments, the PTPN2 inhibitor is a compound described in WO2020/186199 or WO2022/056281, each of which is incorporated by reference in its entirety, including Compound 118.

In some embodiments, the small molecule PTPN2 inhibitor may not effect editing of (i) a gene encoding PTPN2 or (ii) an additional gene operatively linked to PTPN2 (e.g., transcription factor, intron sequence, start codon, etc.). As such, the gene and/or the additional gene may remain the same upon treatment of a cell with a small molecule PTPN2 inhibitor. In some embodiments, the small molecule PTPN2 inhibitor may be configured to bind at least a portion of PTPN2. The small molecule may exhibit binding specificity to PTPN2 in comparison to one or more other protein tyrosine phosphatases selected from the group consisting of: PTPRA, PTPRB, PTPRC, PTPRD, PTPRE, PTPRF, PTPRG, PTPRH, PTPRJ, PTPRK, PTPRM, PTPRN, PTPRN2, PTPRO, PTPRQ, PTPRR, PTPRS, PTPRT, PTPRU, PTPRV, PTPRZ, PTPN1, PTPN2, PTPN3, PTPN4, PTPN5, PTPN6, PTPN7, PTPN9, PTPN11, PTPN12, PTPN13, PTPN14, PTPN18, PTPN20, PTPN21, PTPN23, DUSP1, DUSP2, DUSP4, DUSP5, DUSP6, DUSP7, DUSP8, DUSP9, DUSP10, DUSP16, MK-STYX, DUSP3, DUSP11, DUSP12, DUSP13Aa, DUSP13Ba, DUSP14, DUSP15, DUSP18, DUSP19, DUSP21, DUSP22, DUSP23, DUSP24, DUSP25, DUSP26, DUSP27b, EPM2A, RNGTT, STYX, SSH1, SSH2, SSH3, PTP4A1, PTP4A2, PTP4A3, CDC14A, CDC14B, CDKN3, PTP9Q22, PTEN, TPIP, TPTE, TNS, TENC1, MTM1, MTMR1, MTMR2, MTMR3, MTMR4, MTMR5, MTMR6, MTMR7, MTMR8, MTMR9, MTMR10, MTMR11, MTMR12, MTMR13, MTMR14, MTMR15, ACP1, CDC25A, CDC25B, CDC25C, EYAl, EYAl, EYAl, and EYAL. In some cases, the small molecule PTPN2 inhibitor may exhibit a half maximal inhibitory concentration (i.e., $IC_{50}$) of less than or equal to about 10 micromolar (μM), 5 μM, 1 μM, 950 nanomolar (nM), 900 nM, 850 nM, 800 nM, 750 nM, 700 nM, 650 nM, 600 nM, 550 nM, 500 nM, 450 nM, 400 nM, 350 nM, 300 nM, 250 nM, 200 nM, 150 nM, 100 nM, 50 nM, 10 nM, 9 nM, 8 nM, 7 nM, 6 nM, 5 nM, 4 nM, 3 nM, 2 nM, 1 nM, 0.9 nM, 0.8 nM, 0.7 nM, 0.6 nM, 0.5 nM, 0.4 nM, 0.3 nM, 0.2 nM, 0.1 nM, or less for PTPN2, as evidenced by e.g., a phosphatase activity assay disclosed herein. The small molecule PTPN2 inhibitor may exhibit $IC_{50}$ for PTPN2 that is at least about 0.1-fold, 0.2-fold, 0.3-fold, 0.4-fold, 0.5-fold, 0.6-fold, 0.7-fold, 0.8-fold, 0.9-fold, 1-fold, 2-fold, 3-fold, 4-fold, 5-fold, 6-fold, 7-fold, 8-fold, 9-fold, 10-fold, 11-fold, 12-fold, 13-fold, 14-fold, 15-fold, 16-fold, 17-fold, 18-fold, 19-fold, 20-fold, 30-fold, 40-fold, 50-fold, 60-fold, 70-fold, 80-fold, 90-fold, 100-fold, or more than that of one or more other protein tyrosine phosphatases. In different embodiments, the small molecule PTPN2 inhibitor may be configured to bind at least a portion of one or more substrates of PTPN2 selected from the group consisting of: INSR, EGFR, CSF1R, PDGFR, JAK1, JAK2, JAK3, Src family kinases, STAT1, STAT3, STAT6, FYN, LCK, variations thereof, and combinations thereof. In some examples, a subject small molecule inhibitor inhibits PTPN2 activity and results in an increase in steady-state level of the phosphorylated STAT1 and/or phosphorylated STAT5, which are substrates of PTPN2 enzyme.

In some embodiments, a small molecule PTPN2 inhibitor (e.g., a small molecule that binds PTPN2) may be conjugated to a degradation tag. A degradation tag may be configured to bind a degradation moiety having a capacity to degrade at least a portion of a target moiety that is bound by the degradation tag. For example, the target moiety is PTPN2 or the substrate of PTPN2. A degradation tag may be a biological or chemical compound, such as a simple or complex organic or inorganic molecule, peptide, peptido mimetic, protein (e.g., antibody), liposome, or a polynucleotide (e.g., small interfering RNA, short hairpin RNA, microRNA, antisense, aptamer, ribozyme, triple helix). Alternatively, a degradation tag may be synthetic. In some cases, any one of the methods described herein may utilize a small molecule degradation tag, and non-limiting examples of such small molecule degradation tag may include, but are not limited to, pomalidomide, thalidomide, lenalidomide, VHL-1, adamantane, 1-((4,4,5,5,5-pentafluoropentyl)sulfinyl)nonane, nutlin-3a, RG7112, RG7338, AMG 232, AA-115, bestatin, MV-1, LCL161, and/or analogs thereof. In some cases, the degradation tag can (i) bind to a degradation moiety such as a ubiquitin ligase (e.g., an E3 ligase such as a cereblon E3 ligase, a VHL E3 ligase, a MDM2 ligase, a TRIM21 ligase, a TRIM24 ligase, and/or a IAP ligase) and/or (ii) serve as a hydrophobic group that leads to protein misfolding of the target moiety, e.g., PTPN2. Misfolding of the target moiety may disrupt activity of the target moiety and/or increase the likelihood of degradation of the target moiety by, e.g., a degradation moiety. In some cases, a small molecule PTPN2 inhibitor may be conjugated to the degradation tag via a linker. Examples of such linker may include, but are not limited to, acyclic or cyclic saturated or unsaturated carbon, ethylene glycol, amide, amino, ether, urea, carbamate, aromatic, heteroaromatic, heterocyclic, and/or carbonyl containing groups with different lengths. Exemplary molecules comprising such degradation tag and method of use thereof are provided in U.S. Patent Publication No. 2019/0336503, which is incorporated herein by reference in its entirety.

Other suitable PTPN2 inhibitors can be CRISPR-associated (Cas) proteins or Cas nucleases, which typically are capable of forming a complex with a nucleic acid guide (e.g., guide RNA) designed to target PTPN2 to effect inhibition or silencing. A wide variety of CRISPR-associated (Cas) proteins or Cas nucleases are known in the art. Examples of such nucleases include type I CRISPR-associated (Cas) polypeptides, type II CRISPR-associated (Cas) polypeptides, type III CRISPR-associated (Cas) polypeptides, type IV CRISPR-associated (Cas) polypeptides, type V CRISPR-associated (Cas) polypeptides, and type VI CRISPR-associated (Cas) polypeptides; zinc finger nucleases (ZFN); transcription activator-like effector nucleases (TALEN); meganucleases; RNA-binding proteins (RBP); CRISPR-associated RNA binding proteins; recombinases; flippases; transposases; Argonaute (Ago) proteins (e.g., prokaryotic Argonaute (pAgo), archaeal Argonaute (aAgo), and eukaryotic Argonaute (eAgo)); and any variant thereof including natural and synthetic mutants with enhanced or reduced nuclease activities. A mutant Cas protein may possess less than 90%, less than 80%, less than 70%, less than 60%, less than 50%, less than 40%, less than 30%, less than 20%, less than 10%, less than 5%, or less than 1% of the nucleic acid-cleaving activity of the wild-type Cas protein (e.g., Cas9 from *S. pyogenes*), or no cleavage activity at all (i.e., a dead cas or dCas). For example, a dCas9 polypeptide can associate with a single guide RNA (sgRNA) to activate or repress transcription of target DNA, e.g., PTPN2. In some examples, a dCas9 polypeptide linked to a transcription repressor (e.g., KRAB) and complexed with a sgRNA targeting PTPN2 is utilized as a PTPN2 inhibitor.

Methods of designing a nucleic acid guide targeting a given gene are known in the art. Typically a guide is selected to exhibit sequence complementarity to PTPN2 gene sequence to effect inhibition of PTPN2 expression by cleavage or repression.

Guide nucleic acids can be provided in any form known in the art. For example, the guide nucleic acid can be provided in the form of RNA, either as two molecules (e.g., separate crRNA and tracrRNA) or as one molecule (e.g., sgRNA). The guide nucleic acid can be provided in the form of a complex with a Cas protein. The guide nucleic acid can also be provided in the form of DNA encoding the RNA. The DNA encoding the guide nucleic acid can encode a single guide nucleic acid (e.g., sgRNA) or separate RNA molecules (e.g., separate crRNA and tracrRNA). In the latter case, the DNA encoding the guide nucleic acid can be provided as separate DNA molecules encoding the crRNA and tracrRNA, respectively.

A crRNA can comprise the nucleic acid-targeting segment (e.g., spacer region) of the guide nucleic acid and a stretch of nucleotides that can form one half of a double-stranded duplex of the Cas protein-binding segment of the guide nucleic acid.

A tracrRNA can comprise a stretch of nucleotides that forms the other half of the double-stranded duplex of the Cas protein-binding segment of the gRNA. A stretch of nucleotides of a crRNA can be complementary to and hybridize with a stretch of nucleotides of a tracrRNA to form the double-stranded duplex of the Cas protein-binding domain of the guide nucleic acid.

The crRNA and tracrRNA can hybridize to form a guide nucleic acid. For example, crRNA and tracrRNA are complementary to one another and are capable of hybridizing to form a double stranded RNA duplex or hairpin of the Cas protein-binding segment, thus resulting in a stem-loop structure. The crRNA and the tracrRNA can be covalently linked via the 3' end of the crRNA and the 5' end of the tracrRNA. Alternatively, tracrRNA and the crRNA can be covalently linked via the 5' end of the tracrRNA and the 3' end of the crRNA.

The crRNA can also provide a single-stranded nucleic acid targeting segment (e.g., a spacer region) that hybridizes to a target nucleic acid recognition sequence (e.g., protospacer). The sequence of a crRNA, including spacer region, or tracrRNA molecule can be designed to be specific to the species in which the guide nucleic acid is to be used.

In some embodiments, the nucleic acid-targeting region of a guide nucleic acid can be between 18 to 72 nucleotides in length. The nucleic acid-targeting region of a guide nucleic acid (e.g., spacer region) can have a length of from about 12 nucleotides to about 100 nucleotides.

A protospacer sequence can be identified by identifying a PAM within a region of interest and selecting a region of a desired size upstream or downstream of the PAM as the protospacer. A corresponding spacer sequence can be designed by determining the complementary sequence of the protospacer region.

A spacer sequence can be identified using a computer program (e.g., machine readable code). The computer program can use variables such as predicted melting temperature, secondary structure formation, and predicted annealing temperature, sequence identity, genomic context, chromatin accessibility, % GC, frequency of genomic occurrence, methylation status, presence of SNPs, and the like.

The percent complementarity between the nucleic acid-targeting sequence (e.g., spacer sequence) and the target nucleic acid (e.g., protospacer) can be at least 60%, at least 70%, at least 75%, at least 80%, at least 85%, at least 90%, at least 95%, at least 97%, at least 98%, at least 99%, or 100%. The percent complementarity between the nucleic acid-targeting sequence and the target nucleic acid can be at least 60%, at least 70%, at least 75%, at least 80%, at least 85%, at least 90%, at least 95%, at least 97%, at least 98%, at least 99%, or 100% over about 20 contiguous nucleotides.

Guide nucleic acids can include modifications or sequences that provide for additional desirable features (e.g., modified or regulated stability; subcellular targeting; tracking with a fluorescent label; a binding site for a protein or protein complex; and the like). Guide nucleic acids can be prepared by any suitable method. For example, guide nucleic acids can be prepared by in vitro transcription using, for example, T7 RNA polymerase. Guide nucleic acids can also be a synthetically produced molecule prepared by chemical synthesis.

In some embodiments, a method of the disclosure provides an effective amount of a PTPN2 inhibitor. An effective dose refers to an amount sufficient to effect the intended application, including treatment of cancer, stimulating or prolonging anti-tumor immunity. Also contemplated in the subject methods is the use of a sub-therapeutic amount of a PTPN2 inhibitor for treating an intended disease condition.

The amount of the PTPN2 inhibitor administered may vary depending upon the intended application (in vitro, ex vivo, or in vivo), or the subject and cancer condition being treated, e.g., the weight and age of the subject, the severity of the cancer, the manner of administration and the like.

In some cases, a PTPN2 inhibitor may be administered (e.g., systemically administered) to a subject at a dose of at least about 0.1 milligrams per kilogram (mg/kg), 0.2 mg/kg, 0.3 mg/kg, 0.4 mg/kg, 0.5 mg/kg, 0.6 mg/kg, 0.7 mg/kg, 0.8 mg/kg, 0.9 mg/kg, 1 mg/kg, 2 mg/kg, 3 mg/kg, 4 mg/kg, 5 mg/kg, 6 mg/kg, 7 mg/kg, 8 mg/kg, 9 mg/kg, 10 mg/kg, 11 mg/kg, 12 mg/kg, 13 mg/kg, 14 mg/kg, 15 mg/kg, 16 mg/kg, 17 mg/kg, 18 mg/kg, 19 mg/kg, 20 mg/kg, 25 mg/kg, 30 mg/kg, 35 mg/kg, 40 mg/kg, 45 mg/kg, 50 mg/kg, or more. In some cases, a PTPN2 inhibitor may be administered (e.g., systemically administered) to a subject at a dose of at most about 50 mg/kg, 45 mg/kg, 40 mg/kg, 35 mg/kg, 30 mg/kg, 25 mg/kg, 20 mg/kg, 19 mg/kg, 18 mg/kg, 17 mg/kg, 16 mg/kg, 15 mg/kg, 14 mg/kg, 13 mg/kg, 12 mg/kg, 11 mg/kg, 10 mg/kg, 9 mg/kg, 8 mg/kg, 7 mg/kg, 6 mg/kg, 5 mg/kg, 4 mg/kg, 3 mg/kg, 2 mg/kg, 1 mg/kg, 0.9 mg/kg, 0.8 mg/kg, 0.7 mg/kg, 0.6 mg/kg, 0.5 mg/kg, 0.4 mg/kg, 0.3 mg/kg, 0.2 mg/kg, 0.1 mg/kg, or less.

In some cases, upon administration (e.g., systemic administration), a mean plasma concentration of the PTPN2 inhibitor in the subject may be at least about 0.1 microgram per milliliter (µg/ml), 0.2 µg/ml, 0.3 µg/ml, 0.4 µg/ml, 0.5 µg/ml, 0.6 µg/ml, 0.7 µg/ml, 0.8 µg/ml, 0.9 µg/ml, 1 µg/ml, 2 µg/ml, 3 µg/ml, 4 µg/ml, 5 µg/ml, 6 µg/ml, 7 µg/ml, 8 µg/ml, 9 µg/ml, 10 µg/ml, 11 µg/ml, 12 µg/ml, 13 µg/ml, 14

μg/ml, 15 μg/ml, 16 μg/ml, 17 μg/ml, 18 μg/ml, 19 μg/ml, 20 μg/ml, 25 μg/ml, 30 μg/ml, 35 μg/ml, 40 μg/ml, 45 μg/ml, 50 μg/ml, or more. In some cases, upon administration (e.g., systemic administration), a mean plasma concentration of the PTPN2 inhibitor in the subject may be at most about 50 μg/ml, 45 μg/ml, 40 μg/ml, 35 μg/ml, 30 μg/ml, 25 μg/ml, 20 μg/ml, 19 μg/ml, 18 μg/ml, 17 μg/ml, 16 μg/ml, 15 μg/ml, 14 μg/ml, 13 μg/ml, 12 μg/ml, 11 μg/ml, 10 μg/ml, 9 μg/ml, 8 μg/ml, 7 μg/ml, 6 μg/ml, 5 μg/ml, 4 μg/ml, 3 μg/ml, 2 μg/ml, 1 μg/ml, 0.9 μg/ml, 0.8 μg/ml, 0.7 μg/ml, 0.6 μg/ml, 0.5 μg/ml, 0.4 μg/ml, 0.3 μg/ml, 0.2 μg/ml, 0.1 μg/ml, or less.

In some embodiments, a PTPN2 inhibitor may be used in combination with another known agent (a second agent) or therapy. Examples of such second agent ma be selected from the group consisting of a chemotherapeutic agent, a radioactive agent, a small molecule agent targeting a tumor marker, an antigen-binding agent specifically binding to a tumor marker, and an immune modulator. An immune modulator may be selected from the group consisting of immunostimulatory agents, checkpoint immune blockade agents, and combinations thereof. In some embodiments, the second agent may be a checkpoint inhibitor. In some examples, the second agent may be an inhibitor of PD1, PD-L1, LAG3, CTLA4, CD160, BTLA, LAIR1, TIM3, 2B4, CD93, OX40, Siglec-15, and TIGIT. A PTPN2 inhibitor can be administered as part of a therapeutic regimen that comprises administering one or more second agents (e.g. 1, 2, 3, 4, 5, or more second agents), either simultaneously or sequentially with the PTPN2 inhibitor. When administered sequentially, the PTPN2 inhibitor may be administered before, concurrent with, or after the one or more second agents. When administered simultaneously, the PTPN2 inhibitor and the one or more second agents may be administered by the same route (e.g. injections to the same location; tablets taken orally at the same time), by a different route (e.g. a tablet taken orally while receiving an intravenous infusion), or as part of the same combination (e.g. a solution comprising the PTPN2 inhibitor and one or more second agents). In some examples, a PTPN2 inhibitor can be used in combination with a cell therapy, including a TFP- or CAR-expressing cell (e.g., a TFP- or CAR-expressing stem cell or lymphoid cell) described herein. In other examples, a PTPN2 inhibitor can be used in combination with a non-cell based therapy, such as surgery, chemotherapy, targeted therapy (e.g., using large or small drug molecules targeting a tumor antigen other than PTPN2), radiation, and the like.

In some embodiments, a PTPN2 inhibitor described herein is administered to a subject in combination with an indoleamine 2,3-dioxygenase (IDO) inhibitor. IDO is an enzyme that catalyzes the degradation of the amino acid, L-tryptophan, to kynurenine. Many cancers overexpress IDO, e.g., prostatic, colorectal, pancreatic, cervical, gastric, ovarian, head, and lung cancer. pDCs, macrophages, and dendritic cells (DCs) can express IDO. Without being bound by any particular theory, it has been reported that a decrease in L-tryptophan (e.g., catalyzed by IDO) results in an immunosuppressive milieu by inducing T-cell anergy and apoptosis. It is thought that IDO inhibitor can enhance the efficacy of a CAR-expressing cell by decreasing the suppression or death of a CAR-expressing immune cell. While the clinical trial involving the combination of pembrolizumab (an anti-PD1 antibody) and epacadostat (an IDO inhibitor) did not reach the desired end point, a PTPN2 inhibitor is expected to potentiate the therapeutic effect of IDO inhibitor. Without being bound by a particular theory, PTPN2 inhibitors destabilize the function of the already activated regulatory T cells while the IDO inhibitors prevent the activation of new regulatory T cells. Exemplary inhibitors of IDO that can be used in combination include but are not limited to 1-methyl-tryptophan, indoximod (NewLink Genetics) (see, e.g., Clinical Trial Identifier Nos. NCT01191216; NCT01792050), and INCB024360 (Incyte Corp.) (see, e.g., Clinical Trial Identifier Nos. NCT01604889; NCT01685255).

Additional agents that can be used in combination with a PTPN2 inhibitor include the various categories and examples of agents listed in Table 1 below.

TABLE 1

| | |
|---|---|
| Alkylating agents | Examples include, but are not limted to, altretamine (Hexalen ® or hexamethylmelamine or HMM), bendamustine, busulfan (Busulfex ® or Myleran ®), carmustine (BiCNU ® or BCNU ®), chlorambucil, cyclophosphamide (Cytoxan ® or Neosar ®), dacarbazine (DTIC-Dome ®), fotemustine, ifosfamide (Ifex ®), improsulfan, lomustine (CCNU ® or CeeNU ®), mechlorethamine or mustine (Mustardgen ®), melphalan (Alkeran ®), nimustine, piposulfan, ranimustine, semustine, streptozocin (Zanosar ®), temozolomide (Temodar ®), thiotepa (Thioplex ®), trofosfamide (Ixoten ®), and uramustine or uracil mustard |
| Anthracyclines | Examples include, but are not limited to, aclarubicin, amrubicin, daunorubicin (Daunomycin ®), daunorubicin (liposomal), doxorubicin (Adriamycin ®), doxorubicin (liposomal), epirubicin, esorubicin, idarubicin, mitoxantrone, pirarubicin, and valrubicin |
| Anti-angiogenic | Examples include, but are not limited to, aflibercept, axitinib (Inlyta ®), bevacizumab (Avastin ®), cabozantinib (Cometriq ®), everolimus (Afinitor ® or Zortress ®), lenalidomide (Revlimid ®), pazopanib (Votrient ®), ponatinib, ramucirumab (Cyramza ®), ranibizumab, regorafenib (Stivarga ®), sorafenib (Nexavar ®), sunitinib (Sutent ®), thalidomide (Synovir ® or Thalomid ®) lapatinib, and vandetanib (Caprelsa ®) |
| Antifolates | Examples include, but are not limited to, aminopterin, edatrexate, folic acid, GW1843, lometrexol, LY309887, methotrexate, nolatrexed, OSI-7904(L), pemetrexed (Alimta ®), pralatrexate, raltitrexed, trimetrexate, and ZD9331 |
| BCL-2 inhibitors | Examples include, but are not limited to, ABT-199, ABT-263, ABT-737, BH3 mimetics, gossypol, obatoclax (GX15-070), oblimersen (Genasense ®; G3139; Augmerosen ®), and venetoclax |
| Bcr-Abl inhibitors | Examples include, but are not limited to, bafetinib (INNO-406), bosutinib (SKI-606), dasatinib (BMS-354825), imatinib (STI-571), nilotinib (AMN-107), and ponatinib (AP-24534 or Iclusig ®) |
| Biologics | Examples include, but are not limited to, BCG (TheraCys ®), cytokines (such as INF-alfa, Aldesleukin, erythropoietin, GM-CSF, G-CSF), gene therapy (such as CT109 or Kymriah ®), MAbs (such as rituximab, alemtuzumab, ipilimumab, bevacizumab, obinutuzumab, brentuximab), oncolytic viruses (such as T-VEC or Imlygic ®, H101), and treatment vaccines (such as sipuleucel-T or Provenge ®) |

TABLE 1-continued

| | |
|---|---|
| CDK inhibitors | Examples include, but are not limited to, A-674563, abemaciclib (LY2835219), AT-7519, AZD5438, BMS-265246, BS-181, CYC202 (roscovitine; seliciclib), dinaciclib (SCH-727965), flavopiridol (alvocidib), indirubin, JNJ-7706621, K03861, kenpaullone, LDC000067, LDC4297 (LDC044297), LY2857785, MK-8776 (SCH900776), ML167, MSC2530818, NU6027, olomoucine, ON123300, P276-00, palbociclib (PD-0332991), PHA-767491, PHA-793887, PHA-848125 (milciclib), purvalanol A, purvalanol B, R547, ribociclib (LEE011), RO-3306, senexin A, SNS-032 (BMS-387032), SU9516, TG003, THZ1, UCN-01 (7-hydroxystaurosporine; KRX-0601), wogonin, and XL413 |
| COX-2 inhibitors | Examples include, but are not limited to, celecoxib (Celebrex ®), etoricoxib, lumiracoxib (PrexigeR), parecoxib (Dynastat ®), rofecoxib, and valdecoxib (Bextra ®)) |
| CTLA-4 inhibitors | Examples include, but are not limited to, ipilimumab (MDX-010) and tremelimumab (10D1) |
| DNA methyltransferase inhibitors | Examples include, but are not limited to, 1-hydrazinophthalazine, 5,6-dihydro-5-azacytidine, 5-aza-2'-deoxycytidine, 5-aza-C (5-azacytidine; azacytidine), 5-fluoro-2'-deoxycytidine, arabinosyl-5-azacytidine, decitabine, disulfiram, doxorubicin, EGCG, EGX30P, hydralazine, MG98, nanaomycin A, nanaomycin C, procainamide, procaine, psammaplin A, RG108, SGI-1027, sinefungin, thioguanine, and zebularine |
| ERK inhibitors | Examples include, but are not limited to, AG1478, AG99, andrographolide, apigenin, BAY 43-9006, CAY10561, DEL-22379, ERK inhibitor III, ERK5-IN-1, FR 180204, GDC0994, GDC-0994, GW5074, hypericin, ISIS 5132, KO947, MK-8353 (SCH900353), ML-9, PD169316, PD173074, pluripotin, purvalanol, pyrazolylpyrrole ERK inhibitor, SB203580, SC-1, SCH772984, SL327, SP600125, SU4984, ulixertinib (BVD-523, VRT752271), VX-11e (ERK-11e; TCS ERK 11e), and XMD 8-92 |
| Farnesyltransferase inhibitors | Examples include, but are not limited to, BMS-214662, CP-609754, DK8G557, FTI-277, L744832, L778123, lonafarnib (Sarasar ®; SCH66336), manumycin A, and R115777 (Zarnestra ®; tipifarnib |
| FLT3 inhibitors | Examples include, but are not limited to, crenolanib besylate (CP-868596-26), gilteritinib (ASP2215), lestaurtinib (CEP-701), midostaurin (Rydapt ®, PKC412), pexidartinib (PLX3397), ponatinib (AP24534), quizartinib (AC220), SKLB1028, sorafenib (Nexavar ®), sunitinib (Sutent ®, SU11248), and XL999 |
| HDAC inhibitors | Examples include, but are not limited to, 4SC-202, Abexinostat (PCI-24781), apicidin, AR-42, ATRA, Belinostat (PXD101), BG-45, BRD73954, CAY10603, CG200745, Chidamide, CHR-2845, CHR-3996, Citarinostat (ACY-241), CUDC-101, CUDC-907, curcumin, dacinostat (LAQ824), droxinostat, Entinostat (MS-275), FR901228, Givinostat (ITF2357), HBI-8000, HPOB, ITSA-1, Kevetrin, LAQ824, largazole, LMK-235, M344, MC-1568, m-carboxycinnamic acid bishydroxamide, ME-344, Mocetinostat (MGCD0103), nexturastat A, oxamflatin, Panobinostat (LBH589), pracinostat (SB939), pyroxamide, Quisinostat (JNJ-26481585), Resminostat (4SC-201), RG2833 (RGFP109), RGFP966, ricolinostat (ACY-1215), Romidepsin (FK228; Depsipeptide), Romidepsin (Istodax), santacruzamate A (CAY10683), SB939, SBHA, scriptaid, sulforaphane, tacedinaline (CI994) PCI-34051, tasquinimod, TMP-195, TMP-269, trapoxin A, trichostatin A, tubacin, tubastatin A, Valproic acid (as Mg valproate), and Vorinostat (SAHA |
| Hedgehog signaling inhibitors | Examples include, but are not limited to, AY 9944, BMS-833923 (XL139), GANT58, GANT61, HPI-4, JK184, LEQ 506, PF-04449913, SANT-1, SANT-2, sonidegib (LDE-225; Odomzo ®), TAK-441, and vismodegib (IPI-926; Erivedge ®) |
| HIF inhibitors | Examples include, but are not limited to, 2-methoxyestradiol, bortezomib, camptothecin, echinomycin, ENMD-1198, miltefosine, perifosine, romidepsin, and temsirolimus |
| Hormone therapies | Examples include, but are not limited to, 4(5)-imidazoles, 4-hydroxytamoxifen, aminoglutethimide, anastrozole (Arimidex ®), bicalutamide megestrol acetate, diethylstilbestrol, estrace, exemestane (Aromasin ®), fluoxymesterone, flutamide, fulvestrant (Faslodex ®), goserelin (Zoladex ®), keoxifene, letrozole (Femara ®), leuprorelin, LY 117018, medroxyprogesterone acetate, nilutamide, octreotide, onapristone, polyestradiol phosphate, raloxifene, tamoxifen, toremifene, toremifene (Fareston ®), and trioxifene |
| MEK inhibitors | Examples include, but are not limited to, AR-119/RDEA119 (BAY 869766), arctigenin, ARRY-438162, AS-701173, AS-701255, AS703026, AZD6244 (ARRY-142886), AZD8330 (ARRY-704), binimetinib (MEK162), CI-1040 (PD184352), E6201, GDC-0623, GDC-0973 (XL518; cobimetinib), hypothemycin, PD0325901, PD0325901, PD181461, PD98059, pimasertib, refametinib, RO09-2210, RO4927350, RO4987655, RO5068760, RO5126766, selumetinib, TAK-733, trametinib (GSK1120212), U0126, and WX-554 |
| Mitotic inhibitors | Examples include, but are not limited to, colchicine, glaziovianin A, griseofulvin, podophyllotoxin, taxanes, vinblastine, vincristine, vindesine, and vinorelbine |
| mTOR inhibitors-immune enhancing amount which is typically below the therapeutic dose | Examples include, but are not limited to, ABT578, AZD2014, AZD8055, BEZ235, CC-223, everolimus (RAD001), GSK2126458, INK128 (MLN-0128), Ku-0063794, LY294002, NVP-BEZ235, OSI-027, PI-103, PP242, rapamycin (Sirolimus ®), ridaforolimus (Deforolimus ®; AP-23573), temsirolimus (CCI-779), and XL765 |
| Multi-kinase inhibitors | Examples include, but are not limited to, AT9283, dasatinib, lestaurtinib, midostaurin (Rydapt ®), motesanib, neratinib (HKI-272), nilotinib, pazopanib, regorafenib, sorafenib, sunitinib, vandetanib, and XL184 |
| Nitrogen mustards | Examples include, but are not limited to, bendamustine, chlorambucil, chlornaphazine, cyclophosphamide, estramustine, ifosfamide, mechlorethamine, mechlorethamine oxide hydrochloride, melphalan, mustine, novembichin, phenesterine, prednimustine, trofosfamide, uracil mustard, and uramustine |

TABLE 1-continued

| | |
|---|---|
| DNA synthesis inhibitors | Examples include, but are not limited to, 3,4-dihydroxybenzylamine, 5-fluorodeoxyuridine, cladribine, cytarabine, daunorubicin, etoposide, flutarabine, hydroxyurea, idarubicin, methotrexate, mitoxantrone, and pralatrexate |
| PD-1 inhibitors | Examples include, but are not limited to, AMP-224, AMP-514, atezolizumab (RG7446; MPDL3280A), BMS-936559, durvalumab, MAB005, MDX-1106, MEDI4736, MSB0010718C (A09-246-2), nivolumab (BMS936558), pembrolizumab (Lambrolizumab ®; MK-3475; KEYTRUDAR), and pidilizumab (CT-011) Anti PD-1 antibodies: Examples include, but are not limited to, ABCAM ® (AB137132), AFFYMETRIX EBIOSCIENCE (J105; J116; M1H4), Amplimmune (AMP 514), avelumab (Bavencio ®), and BIOLEGEND ® (EH12.2H7; RMPI-14) |
| RAF inhibitors | Examples include, but are not limited to, AZ 628, CCT196969, CEP-32496, dabrafenib (GSK2118436), encorafenib (LGX818), GDC-0879, GW5074, LY3009120, MLN2480, NVP-BHG712, PLX-4720, PLX-7904, RAF265, RO5126766 (CH5126766), SB590885, sorafenib tosylate, TAK-632, vemurafenib (PLX4032; RG7204), and ZM 336372 |
| RAS inhibitors | Examples include, but are not limited to, deltarasin, lonafarnib, reolysin, salirasib, siG12D LODER, SML-8-73-1, and tipifarnib |
| Others | Examples include, but are not limited to, 5-aminolevulinic acid, afatinib, alectinib, altretamine, anti-CD3 and/or anti-CD33 antibodies (e.g. visilizumab, gemtuzumab, AMG330), antiproliferative antibodies, aprepitant, arsenic trioxide, benzodopa, biological response modifiers, bisphosphonates (such as etridonic, clodronic, tiludronic, pamidronic, alendronic, ibandronic, risedronic, zoledronic acid), bleomycin, blinatumomab (AMG103; Blincyto ®), brigatinib (Alunbrig ®), buserelin, cabazitaxel, carboquone, ceritinib, crizotinib, dactinomycin, degarelix, denosumab, dexamethasone, difluoromethylornithine (DFMO), dronabinol, enasidenib (AG-221), epothilone A or B, eribulin, erlotinib, gefitinib, gonadorelin agonists, granisetron, heparanase inhibitors, histone deacetylase inhibitors, histrelin, ibrutinib, inotuzumab ozogamicin (Besponsa ®), ixabepilone, lenvatinib, leuprolide, levoleucovorin, matrix metalloproteinase inhibitors (such as marimastat (BB-2516), prinomastat (AG3340), BMS-279251, BAY 12-9566, TAA211, MMI270B, AAJ996), methionine aminopeptidase inhibitors, meturedopa, mitomycin, mitotane, nabilone, necitumumab, niraparib (Zejula ®), olaparib (AZD-2281; Lynparza ®), osimertinib (Tagrisso ®), palonosetron, panitumumab, pertuzumab, porfimer sodium, revlimid, thalidomide, tipiracil, trabectedin, trastuzumab, triethylenemelamine, triethylenephosphoramide, triethylenethiophosphoramide, trimethylolomelamine, and uredopa |

The present disclosure also provides a cell (including a population of cells, such as a population of lymphoid cells) modified to express an exogenous sequence, and wherein expression and/or activity of PTPN2 in said cell has been inhibited (including reduction and elimination). In one aspect, provided in the disclosure is a lymphoid cell in which the expression and/or function of PTPN2 in said cell is inhibited. Such inhibition can be transient or permanent, occurring in vitro, ex vivo, or in vitro. In some cases, as used herein, inhibiting expression and/or function of a target molecule may be referred to downregulation of expression and/or function of the target molecule. A modified lymphoid cell of the present disclosure can be further characterized in that it comprises: (a) a chimeric T-cell receptor sequence encoding a T-cell receptor fusion protein (TFP), and/or (b) a chimeric antigen receptor (CAR) sequence encoding a CAR, wherein each of TFP and CAR exhibits specific binding to an antigen, including but not limited to a tumor or tumor-associated antigen.

Not wishing to be bound by any particular theory, inhibiting PTPN2 expression and/or activity of such lymphoid cell can lead to an augmented immunoreceptor signaling, which in turn results in the activation of an adaptive immunity against tumor or cancer cells. When its PTPN2 expression or activity is inhibited, the modified lymphoid cells can exhibit enhanced cell proliferation (including proliferation of T cells such as CD4+ and/or CD8+ T cells, and clonal expansion other lymphoid cells), enhanced cell activity (including e.g., cytokine secretion, activation of effector function, trafficking to tumor site or cancer cell), or enhanced disability (e.g., reduction in T cell exhaustion, destabilization of regulatory T cells (Tregs) in terms of cell number and cellular function).

In practicing any one of the methods disclosed herein, a subject cell (e.g., a modified cell such as a modified lymphoid cell) may comprise an enhancer moiety capable of enhancing one or more activities of the cell. In some embodiments, an enhancer moiety suitable for incorporating into a subject cell (e.g., a modified lymphoid cell) can be cytokines and growth factors capable of stimulating the growth, clonal expansion, and/or enhancing persistence of the immune cell in vivo. An enhancer may be intracellular, membrane-bound (e.g., a receptor or an adaptor protein of a receptor), or secreted by the cell. Encompassed are enhancer moieties selected from the group consisting of IL-2, IL-3, IL-4, IL-6, IL-7, IL-10, IL-11, IL-12, IL-15, IL-17, IL-18, IL-21, IL-23, PD-1, PD-L1, CD122, CSF1R, CTAL-4, TIM-3, TGFR beta, receptors for the same, functional fragments thereof, functional variants thereof, and combinations thereof. An enhancer moiety may be expressed from an endogenous gene of the cell. Alternatively or in addition to, an enhancer moiety may be expressed from a heterologous gene introduced to the cell. Such heterologous gene may be chromosomal (e.g., in the nuclear chromosome or mitochondrial chromosome) or epichromosomal. In some examples, a cell (e.g., a modified immune cell configured to express a TFP and/or a CAR) may be engineered such that one or more enhancer moieties are constitutively expressed and/or activated. In other examples, the one or more enhancer moieties may be transiently expressed for a limited time. In different examples, the one or more enhancer moieties may be conditionally expressed under, e.g., activation of a cellular signaling.

In practicing any one of the methods disclosed herein, a subject cell (e.g., a modified cell such as a modified lymphoid cell) may comprise an inducible cell death moiety, which inducible cell death moiety effects cell death (e.g., suicide) of the cell upon contact with a cell death activator. Where desired, an inducible cell death moiety is selected from the group consisting of: caspase-1 ICE, caspase-3

YAMA, inducible Caspase 9 (iCasp9), AP1903, HSV-TK, CD19, RQR8, tBID, CD20, truncated EGFR, Fas, FKBP12, CID-binding domain (CBD), and any combination thereof. Examples of further suicide systems include those described by Jones et al. (Jones B S, Lamb L S, Goldman F and Di Stasi A (2014) Improving the safety of cell therapy products by suicide gene transfer. Front. Pharmacol. 5:254. doi: 10.3389/fphar.2014.00254), which is incorporated herein by reference in its entirety. Where desired, a suitable inducible cell death moiety can be HSV-TK, and the cell death activator is GCV. Where further desired, a suitable inducible cell death moiety can be iCasp9, and the cell death activator is AP1903.

A TFP comprised in the subject lymphoid cell typically comprises a TCR subunit comprising (1) a TCR extracellular domain capable of specific binding to an antigen domain, and (2) an intracellular signaling domain. Upon expression of the TFP, it forms a T cell receptor (TCR) complex.

In some embodiments, the TCR extracellular domain comprises (1) an antigen binding domain capable of specific binding to the antigen, and (2) an extracellular domain or portion thereof of a protein including, e.g., the alpha, beta or zeta chain of the T-cell receptor, or CD3 epsilon, CD3 gamma, or CD3 delta, or in alternative embodiments, CD28, CD45, CD4, CD5, CD8, CD9, CD16, CD22, CD33, CD37, CD64, CD80, CD86, CD134, CD137, CD154. In general, the antigen binding domain and the extracellular domain are operatively linked together, e.g., in the same reading frame.

In some embodiments, a subject CAR comprises an antigen-binding domain and an intracellular signaling domain. In some examples, the antigen-binding domain and the intracellular signaling domain of the CAR are linked via a transmembrane domain.

Antigen Binding Domain of TFP or CAR

The antigen binding domain of a TFP or CAR disclosed herein typically comprises an antigen-specific binding element, the choice of which depends upon the type and number of antigen of interest. For example, the antigen binding domain may be chosen to recognize a cell surface marker on a target cell associated with a particular disease state. Non-limiting examples of cell surface markers include those associated tumor or cancer, with viral, bacterial and parasitic infections, autoimmune disease, inflammation diseases and metabolic disease. Cell surface markers can include, without limitation, carbohydrates, glycolipids, glycoproteins; CD (cluster of differentiation) antigens present on cells of a hematopoietic lineage (e.g., CD2, CD4, CD8, CD21, etc.), γ-glutamyltranspeptidase, an adhesion protein (e.g., ICAM-1, ICAM-2, ELAM-1, VCAM-1), hormone, growth factor, cytokine, and other ligand receptors, ion channels, and the membrane-bound form of an immunoglobulin μ chain.

Of particular interest are biological markers associated with a tumor or cancer or a stage or state of a cancer. A vast variety of disease-related biological markers have been identified, and the corresponding targeting moieties have been generated, including but not limited to cancer antigen-50 (CA-50), cancer antigen-125 (CA-125) associated with ovarian cancer, cancer antigen 15-3 (CA15-3) associated with breast cancer, cancer antigen-19 (CA-19) and cancer antigen-242 associated with gastrointestinal cancers, carcinoembryonic antigen (CEA), carcinoma associated antigen (CAA), chromogranin A, epithelial mucin antigen (MC5), human epithelium specific antigen (HEA), Lewis(a)antigen, melanoma antigen, melanoma associated antigens 100, 25, and 150, mucin-like carcinoma-associated antigen, multidrug resistance related protein (RPm6), multidrug resistance related protein (RP41), Neu oncogene protein (C-erbB-2), neuron specific enolase (NSE), P-glycoprotein (mdr1 gene product), multidrug-resistance-related antigen, p170, multidrug-resistance-related antigen, prostate specific antigen (PSA), CD56, and NCAM.

In some examples, the antigen binding domain of the subject TCR specifically binds to CD19. A large number of exemplary anti-CD19 antigen binding domains and constructs thereof are described in U.S. Pat. Nos. 8,399,645; 7,446,190; WO2012/079000; WO2014/031687; U.S. Pat. No. 7,446,190; each of which is herein incorporated by reference in its entirety.

In some other examples, the antigen binding domain of the subject TCR specifically binds to BCMA. Exemplary anti-BCMA antigen binding domains and constructs thereof are described in e.g., WO2012163805, WO200112812, and WO2003062401, WO2016/014565, WO2014/122144, WO2016/014789, WO2014/089335, WO2014/140248, each of which is hereby incorporated by reference in its entirety.

In some other examples, the antigen binding domain of the subject TCR specifically binds to CD123. Exemplary anti-CD123 antigen binding domains and constructs thereof are described in e.g., WO2014/130635, WO2016/028896, WO2008/127735, WO2014/138805, WO2014/138819, WO2013/173820, WO2014/144622, WO2001/66139, WO2010/126066, WO2014/144622, and US2009/0252742, each of which is incorporated herein by reference in its entirety.

In yet some other examples, the antigen binding domain of the subject TCR specifically binds to CD38, exemplary anti-CD38 antigen binding domains are embodied in daratumumab (described in e.g., Groen et al., Blood 116(21): 1261-1262 (2010); MOR202 (see, e.g., U.S. Pat. No. 8,263, 746); or antibodies described in U.S. Pat. No. 8,362,211.

In some other examples, the antigen binding domain of the subject TCR specifically binds to Tn antigen. Exemplary anti-Tn antigen binding domains and constructs thereof are described in e.g., US 2014/0178365, U.S. Pat. No. 8,440, 798, Brooks et al., PNAS 107(22):10056-10061 (2010), and Stone et al., OncoImmunology 1(6):863-873 (2012). In yet some other examples, the antigen binding domain of the subject TCR specifically binds to CS-1. Exemplary anti-CS-1 antigen binding domains and constructs thereof are described in Elotuzumab (BMS), see e.g., Tai et al., 2008, Blood 112(4):1329-37; Tai et al., 2007, Blood. 110(5):1656-63. In yet some other examples, the antigen binding domain of the subject TCR specifically binds to mesothelin. Exemplary anti-mesothelin antigen binding domain are described in, e.g., WO2015/090230, WO1997/025068, WO1999/028471, WO2005/014652, WO2006/099141, WO2009/045957, WO2009/068204, WO2013/142034, WO2013/040557, WO2013/063419, each of which is incorporated by reference in its entirety. In yet some other examples, the antigen binding domain of the subject TCR specifically binds to CD22, exemplary anti-CD22 antigen binding domains are described in Haso et al., Blood, 121(7): 1165-1174 (2013); Wayne et al., Clin Cancer Res 16(6): 1894-1903 (2010), each of which is incorporated herein by reference. In yet some other examples, the antigen binding domain of the subject TCR specifically binds to CLL-1, exemplary anti-CLL-1 antigen binding domains are described in WO2016/014535, incorporated herein by reference.

In yet some other examples, the antigen binding domain of the subject TCR specifically binds to CD33, exemplary anti-CD33 antigen binding domains are described in WO2016/014576 and WO2016/014576, each of which is incorporated by reference in its entirety. In yet some other examples, the antigen binding domain of the subject TCR specifically binds to GD2, exemplary anti-GD2 antigen binding domains are described in WO2012033885, WO2013040371, WO2013192294, WO2013061273, WO2013123061, WO2013074916, WO201385552, WO 2011160119, and US 20100150910, each of which is incorporated by reference in its entirety. In yet some other examples, the antigen binding domain of the subject TCR specifically binds to PSMA, exemplary anti-PSMA antigen binding domains are described in US 20110268656 (J591 ScFv); WO 2006125481 (mAbs 3/A12, 3/E7 and 3/F11) and single chain antibody fragments (scFv A5 and D7), each of which is incorporated by reference in its entirety. In yet some other examples, the antigen binding domain of the subject TCR specifically binds to FLT3, exemplary anti-FLT3 antigen binding domains are described in e.g., WO2011076922, U.S. Pat. No. 5,777,084, EP0754230, US20090297529, and several commercial catalog antibodies (R&D, ebiosciences, Abcam), each of which is incorporated by reference in its entirety. In yet some other examples, the antigen binding domain of the subject TCR specifically binds to ROR1, exemplary anti-ROR1 antigen binding domains are described in WO 2011159847, US20130101607, each of which is incorporated by reference in its entirety. In yet some other examples, the antigen binding domain of the subject TCR specifically binds to TAG72, exemplary anti-TAG72 antigen binding domains are described in Hombach et al., Gastroenterology 113(4): 1163-1170 (1997); and Abcam ab691.

In yet some other examples, the antigen binding domain of the subject TCR specifically binds to FAP, exemplary anti-FAP antigen binding domains are described in US 2009/0304718, incorporated herein by reference. In yet some other examples, the antigen binding domain of the subject TCR specifically binds to CD44v6, exemplary anti-CD44v6 antigen binding domains are described in Casucci et al., Blood 122(20):3461-3472 (2013). In yet some other examples, an antigen binding domain against CEA is an antigen binding portion, e.g., CDRs, of an antibody described in, e.g., Chmielewski et al., Gastoenterology 143 (4):1095-1107 (2012). In yet some other examples, an antigen binding domain against EPCAM is an antigen binding portion, e.g., CDRS, of an antibody selected from MT110, EpCAM-CD3 bispecific Ab (see, e.g., clinicaltrials.gov/ct2/show/NCTO0635596); Edrecolomab; 3622W94; ING-1; and adecatumumab (MT201). In yet some other examples, an antigen binding domain against PRSS21 is an antigen binding portion, e.g., CDRs, of an antibody described in U.S. Pat. No. 8,080,650. In yet some other examples, an antigen binding domain against IL-13Ra2 is an antigen binding portion, e.g., CDRs, of an antibody described in, e.g., WO2008/146911, WO2004087758, several commercial catalog antibodies, and WO2004087758. In yet some other examples, an antigen binding domain against B7H3 is an antigen binding portion, e.g., CDRs, of an antibody MGA271 (Macrogenics). In yet some other examples, an antigen binding domain against KIT is an antigen binding portion, e.g., CDRs, of an antibody described in, e.g., U.S. Pat. No. 7,915,391, US20120288506, and several commercial catalog antibodies. In yet some other examples, an antigen binding domain against CD30 is an antigen binding portion, e.g., CDRs, of an antibody described in, e.g., U.S. Pat. No. 7,090,843 B1, and EP0805871. In yet some other examples, an antigen binding domain against GD3 is an antigen binding portion, e.g., CDRs, of an antibody described in, e.g., U.S. Pat. Nos. 7,253,263; 8,207,308; US 20120276046; EP1013761; WO2005035577; and U.S. Pat. No. 6,437,098. In yet some other examples, an antigen binding domain against CD171 is an antigen binding portion, e.g., CDRs, of an antibody described in, e.g., Hong et al., J Immunother 37(2):93-104 (2014). In yet some other examples, an antigen binding domain against IL-11Ra is an antigen binding portion, e.g., CDRs, of an antibody available from Abcam (cat #ab55262) or Novus Biologicals (cat #EPR5446). In another embodiment, an antigen binding domain again IL-11Ra is a peptide, see, e.g., Huang et al., Cancer Res 72(1):271-281 (2012). In yet some other examples, an antigen binding domain against PSCA is an antigen binding portion, e.g., CDRs, of an antibody described in, e.g., Morgenroth et al., Prostate 67(10):1121-1131 (2007) (scFv 7F5); Nejatollahi et al., J of Oncology 2013 (2013), article ID 839831 (scFv C5-II); and US Pat Publication No. 20090311181. In yet some other examples, an antigen binding domain against VEGFR2 is an antigen binding portion, e.g., CDRs, of an antibody described in, e.g., Chinnasamy et al., J Clin Invest 120(11): 3953-3968 (2010). In yet some other examples, an antigen binding domain against LewisY is an antigen binding portion, e.g., CDRs, of an antibody described in, e.g., Kelly et al., Cancer Biother Radiopharm 23(4):411-423 (2008) (hu3S193 Ab (scFvs)); Dolezal et al., Protein Engineering 16(1):47-56 (2003) (NC10 scFv). In yet some other examples, an antigen binding domain against CD24 is an antigen binding portion, e.g., CDRs, of an antibody described in, e.g., Maliar et al., Gastroenterology 143(5): 1375-1384 (2012). In yet some other examples, an antigen binding domain against CD20 is an antigen binding portion, e.g., CDRs, of the antibody Rituximab, Ofatumumab, Ocrelizumab, Veltuzumab, or GA101. In yet some other examples, an antigen binding domain against PDGFR-beta is an antigen binding portion, e.g., CDRs, of an antibody Abcam ab32570. In yet some other examples, an antigen binding domain against SSEA-4 is an antigen binding portion, e.g., CDRs, of antibody MC813 (Cell Signaling), or other commercially available antibodies. In yet some other examples, an antigen binding domain against Folate receptor alpha is an antigen binding portion, e.g., CDRs, of the antibody IMGN853, or an antibody described in US20120009181; U.S. Pat. No. 4,851,332, LK26: U.S. Pat. No. 5,952,484. In yet some other examples, an antigen binding domain against ERBB2 (Her2/neu) is an antigen binding portion, e.g., CDRs, of the antibody trastuzumab, or pertuzumab. In yet some other examples, an antigen binding domain against MUC1 is an antigen binding portion, e.g., CDRs, of the antibody SAR566658. In yet some other examples, the antigen binding domain against EGFR is antigen binding portion, e.g., CDRs, of the antibody cetuximab, panitumumab, zalutumumab, nimotuzumab, or matuzumab. In one embodiment, the antigen binding domain against EGFRvIII is or may be derived from an antigen binding domain, e.g., CDRs, scFv, or VH and VL, of an antibody, antigen-binding fragment or CAR described in, e.g., PCT publication WO2014/130657 (In one embodiment the CAR is a CAR described in WO2014/130657, the contents of which are incorporated herein in their entirety). In yet some other examples, an antigen binding domain against NCAM is an antigen binding portion, e.g., CDRs, of the antibody clone 2-2B: MAB5324 (EMD Millipore). In yet some other examples, an antigen binding domain against Ephrin B2 is an antigen binding portion, e.g., CDRs, of an antibody described in, e.g., Abengozar et al., Blood 119(19): 4565-4576 (2012). In yet some other examples, an antigen binding domain against IGF-I receptor is an antigen binding portion, e.g., CDRs, of an antibody described in, e.g., U.S. Pat. No. 8,344,112 B2; EP2322550 A1; WO 2006/138315, or PCT/US2006/022995. In yet some other examples, an antigen binding domain against CAIX is an antigen binding portion, e.g., CDRs, of the antibody clone 303123 (R&D Systems). In yet some other examples, an antigen binding domain against LMP2 is an antigen binding portion, e.g., CDRs, of an antibody described in, e.g., U.S. Pat. No. 7,410,640, or US20050129701. In yet some other examples, an antigen binding domain against gp100 is an antigen binding portion, e.g., CDRs, of the antibody HMB45, NKI-betaB, or an antibody described in WO2013165940, or US20130295007. In yet some other examples, an antigen binding domain against tyrosinase is an antigen binding portion, e.g., CDRs, of an antibody described in, e.g., U.S. Pat. No. 5,843,674; or U.S. Ser. No. 19/950,504048. In yet some other examples, an antigen binding domain against EphA2 is an antigen binding portion, e.g., CDRs, of an antibody described in, e.g., Yu et al., Mol Ther 22(1):102-111 (2014). In yet some other examples, an antigen binding domain against GD3 is an antigen binding portion, e.g., CDRs, of an antibody described in, e.g., U.S. Pat. Nos. 7,253,263; 8,207,308; US 20120276046; EP1013761 A3; 20120276046; WO2005035577; or U.S. Pat. No. 6,437,098. In yet some other examples, an antigen binding domain against fucosyl GM1 is an antigen binding portion, e.g., CDRs, of an antibody described in, e.g., US20100297138; or WO2007/067992. In yet some other examples, an antigen binding domain against sLe is an antigen binding portion, e.g., CDRs, of the antibody G193 (for lewis Y), see Scott A M et al, Cancer Res 60: 3254-61 (2000), also as described in Neeson et al, J Immunol May 2013 190 (Meeting Abstract Supplement) 177.10. In yet some other examples, an antigen binding domain against GM3 is an antigen binding portion, e.g., CDRs, of the antibody CA 2523449 (mAb 14F7). In yet some other examples, an antigen binding domain against HMWMAA is an antigen binding portion, e.g., CDRs, of an antibody described in, e.g., Kmiecik et al., Oncoimmunology 3(1):e27185 (2014) (PMID: 24575382) (mAb9.2.27); U.S. Pat. No. 6,528,481; WO2010033866; or US 20140004124. In yet some other examples, an antigen binding domain against o-acetyl-GD2 is an antigen binding portion, e.g., CDRs, of the antibody 8B6. In yet some other examples, an antigen binding domain against TEM1/CD248 is an antigen binding portion, e.g., CDRs, of an antibody described in, e.g., Marty et al., Cancer Lett 235(2):298-308 (2006); Zhao et al., J Immunol Methods 363(2):221-232 (2011). In yet some other examples, an antigen binding domain against CLDN6 is an antigen binding portion, e.g., CDRs, of the antibody IMAB027 (Ganymed Pharmaceuticals), see e.g., clinicaltrial.gov/show/NCT02054351. In yet some other examples, an antigen binding domain against TSHR is an antigen binding portion, e.g., CDRs, of an antibody described in, e.g., U.S. Pat. Nos. 8,603,466; 8,501, 415; or U.S. Pat. No. 8,309,693. In yet some other examples, an antigen binding domain against GPRC5D is an antigen binding portion, e.g., CDRs, of the antibody FAB6300A (R&D Systems); or LS-A4180 (Lifespan Biosciences). In yet some other examples, an antigen binding domain against CD97 is an antigen binding portion, e.g., CDRs, of an antibody described in, e.g., U.S. Pat. No. 6,846,911; de Groot et al., J Immunol 183(6):4127-4134 (2009); or an antibody from R&D:MAB3734. In yet some other examples, an antigen binding domain against ALK is an antigen binding portion, e.g., CDRs, of an antibody described in, e.g., Mino-Kenudson et al., Clin Cancer Res 16(5):1561-1571 (2010). In yet some other examples, an antigen binding domain against polysialic acid is an antigen binding portion, e.g., CDRs, of an antibody described in, e.g., Nagae et al., J Biol Chem 288(47):33784-33796 (2013). In yet some other examples, an antigen binding domain against PLAC1 is an antigen binding portion, e.g., CDRs, of an antibody described in, e.g., Ghods et al., Biotechnol Appl Biochem 2013 doi:10.1002/bab.1177. In yet some other examples, an antigen binding domain against GloboH is an antigen binding portion of the antibody VK9; or an antibody described in, e.g., Kudryashov V et al, Glycoconj J.15(3): 243-9 (1998), Lou et al., Proc Natl Acad Sci USA 111(7): 2482-2487 (2014); MBr1: Bremer E-G et al. J Biol Chem 259:14773-14777 (1984). In yet some other examples, an antigen binding domain against NY-BR-1 is an antigen binding portion, e.g., CDRs of an antibody described in, e.g., Jager et al., Appl Immunohistochem Mol Morphol 15(1): 77-83 (2007). In yet some other examples, an antigen binding domain against WT-1 is an antigen binding portion, e.g., CDRs, of an antibody described in, e.g., Dao et al., Sci Transl Med 5(176):176ra33 (2013); or WO2012/135854. In yet some other examples, an antigen binding domain against MAGE-A1 is an antigen binding portion, e.g., CDRs, of an antibody described in, e.g., Willemsen et al., J Immunol 174(12):7853-7858 (2005) (TCR-like scFv). In yet some other examples, an antigen binding domain against sperm protein 17 is an antigen binding portion, e.g., CDRs, of an antibody described in, e.g., Song et al., Target Oncol 2013 Aug. 14 (PMID: 23943313); Song et al., Med Oncol 29(4): 2923-2931 (2012). In yet some other examples, an antigen binding domain against Tie 2 is an antigen binding portion, e.g., CDRs, of the antibody AB33 (Cell Signaling Technology). In one embodiment, an antigen binding domain against MAD-CT-2 is an antigen binding portion, e.g., CDRs, of an antibody described in, e.g., PMID: 2450952; U.S. Pat. No. 7,635,753. In yet some other examples, an antigen binding domain against Fos-related antigen 1 is an antigen binding portion, e.g., CDRs, of the antibody 12F9 (Novus Biologicals). In yet some other examples, an antigen binding domain against MelanA/MART1 is an antigen binding portion, e.g., CDRs, of an antibody described in, EP2514766 A2; or U.S. Pat. No. 7,749,719. In yet some other examples, an antigen binding domain against sarcoma translocation breakpoints is an antigen binding portion, e.g., CDRs, of an antibody described in, e.g., Luo et al, EMBO Mol. Med. 4(6):453-461 (2012). In yet some other examples, an antigen binding domain against TRP-2 is an antigen binding portion, e.g., CDRs, of an antibody described in, e.g., Wang et al, J Exp Med. 184(6):2207-16 (1996). In yet some other examples, an antigen binding domain against CYP1B1 is an antigen binding portion, e.g., CDRs, of an antibody described in, e.g., Maecker et al, Blood 102 (9): 3287-3294 (2003). In one embodiment, an antigen binding domain against RAGE-1 is an antigen binding portion, e.g., CDRs, of the antibody MAB5328 (EMD Millipore). In yet some other examples, an antigen binding domain against human telomerase reverse transcriptase is an antigen binding portion, e.g., CDRs, of the antibody cat no: LS-B95-100 (Lifespan Biosciences). In yet some other examples, an antigen binding domain against intestinal carboxyl esterase is an antigen binding portion, e.g., CDRs, of the antibody 4F12: cat no: LS-B6190-50 (Lifespan Biosciences). In yet some other examples, an antigen binding domain against mut hsp70-2 is an antigen binding portion, e.g., CDRs, of the antibody Lifespan Biosciences: monoclonal: cat no: LS-C133261-100 (Lifespan Biosciences). In yet some other examples, an antigen binding domain against CD79a is an antigen binding portion, e.g., CDRs, of the antibody Anti- CD79a antibody [HM47/A9](ab3121), available from Abcam; antibody CD79A Antibody #3351 available from Cell Signalling Technology; or antibody HPA017748-Anti-CD79A antibody produced in rabbit, available from Sigma Aldrich. In yet some other examples, an antigen binding domain against CD79b is an antigen binding portion, e.g., CDRs, of the antibody polatuzumab vedotin, anti-CD79b described in Dornan et al., "Therapeutic potential of an anti-CD79b antibody-drug conjugate, anti-CD79b-vc-MMAE, for the treatment of non-Hodgkin lymphoma" Blood. 2009 Sep. 24; 114(13):2721-9. doi: 10.1182/blood-2009-02-205500. Epub 2009 Jul. 24, or the bispecific antibody Anti-CD79b/CD3 described in "4507 Pre-Clinical Characterization of T Cell-Dependent Bispecific Antibody Anti-CD79b/CD3 As a Potential Therapy for B Cell Malignancies" Abstracts of 56th ASH Annual Meeting and Exposition, San Francisco, Calif. Dec. 6-9, 2014. In yet some other examples, an antigen binding domain against CD72 is an antigen binding portion, e.g., CDRs, of the antibody J3-109 described in Leuk Lymphoma. 1995 June; 18(1-2): 119-22; Cancer Res Mar. 15, 2009 69; 2358. In yet some other examples, an antigen binding domain against LAIR1 is an antigen binding portion, e.g., CDRs, of the antibody ANT-301 LAIR1 antibody, available from ProSpec; or anti-human CD305 (LAIR1) Antibody, available from BioLegend.

In yet some other examples, an antigen binding domain against FCAR is an antigen binding portion, e.g., CDRs, of the antibody CD89/FCAR Antibody (Catalog #10414-H08H), available from Sino Biological Inc. In yet some other examples, an antigen binding domain against LILRA2 is an antigen binding portion, e.g., CDRs, of the antibody LILRA2 monoclonal antibody (M17), clone 3C7, available from Abnova, or Mouse Anti-LILRA2 antibody, Monoclonal (2D7), available from Lifespan Biosciences. In yet some other examples, an antigen binding domain against CD300LF is an antigen binding portion, e.g., CDRs, of the antibody Mouse Anti-CMRF35-like molecule 1 antibody, Monoclonal[UP-D2], available from BioLegend, or Rat Anti-CMRF35-like molecule 1 antibody, Monoclonal [234903], available from R&D Systems. In yet some other examples, an antigen binding domain against CLEC12A is an antigen binding portion, e.g., CDRs, of the antibody Bispecific T cell Engager (BiTE) scFv-antibody and ADC described in Noordhuis et al., "Targeting of CLEC12A In Acute Myeloid Leukemia by Antibody-Drug-Conjugates and Bispecific CLL-1.times.CD3 BiTE Antibody" 53$^{rd}$ ASH Annual Meeting and Exposition, Dec. 10-13, 2011, and MCLA-117 (Merus). In yet some other examples, an antigen binding domain against BST2 (also called CD317) is an antigen binding portion, e.g., CDRs, of the antibody Mouse Anti-CD317 antibody, Monoclonal[3H4], available from Antibodies-Online or Mouse Anti-CD317 antibody, Monoclonal[696739], available from R&D Systems. In yet some other examples, an antigen binding domain against EMR2 (also called CD312) is an antigen binding portion, e.g., CDRs, of the antibody Mouse Anti-CD312 antibody, Monoclonal[LS-B8033] available from Lifespan Biosciences, or Mouse Anti-CD312 antibody, Monoclonal[494025] available from R&D Systems. In yet some other examples, an antigen binding domain against LY75 is an antigen binding portion, e.g., CDRs, of the antibody Mouse Anti-Lymphocyte antigen 75 antibody, Monoclonal[HD30] available from EMD Millipore or Mouse Anti-Lymphocyte antigen 75 antibody, Monoclonal[A15797] available from Life Technologies. In still yet some other examples, an antigen binding domain against GPC3 is an antigen binding portion, e.g., CDRs, of the antibody hGC33 described in Anticancer Drugs. 2010 November; 21(10):907-916, or MDX-1414, HN3, or YP7, all three of which are described in FEBS Lett. 2014 Jan. 21; 588(2):377-82. Instill yet some other examples, an antigen binding domain against FCRL5 is an antigen binding portion, e.g., CDRs, of the anti-FcRL5 antibody described in Mol Cancer Ther. 2012 October; 11(10):2222-32. In still yet some other examples, an antigen binding domain against IGLL1 is an antigen binding portion, e.g., CDRs, of the antibody Mouse Anti-Immunoglobulin lambda-like polypeptide 1 antibody, Monoclonal [AT1G4] available from Lifespan Biosciences, Mouse Anti-Immunoglobulin lambda-like polypeptide 1 antibody, Monoclonal[HSL11] available from BioLegendSad.

In still yet some other examples, the antigen binding domain comprises one, two three (e.g., all three) heavy chain CDRs, HC CDR1, HC CDR2 and HC CDR3, from an antibody listed above, and/or one, two, three (e.g., all three) light chain CDRs, LC CDR1, LC CDR2 and LC CDR3, from an antibody listed above. In one embodiment, the antigen binding domain comprises a heavy chain variable region and/or a variable light chain region of an antibody listed above.

The antigen binding domain can be any domain that binds to the antigen including but not limited to a monoclonal antibody, a polyclonal antibody, a recombinant antibody, a human antibody, a humanized antibody, and a functional fragment thereof, including a Fab, a Fab', a F(ab')$_2$, an Fv, a single chain antibody (e.g., scFv), a minibody, a diabody, a single-domain antibody ("sdAb" or "nanobodies" or "camelids"), or an Fc binding domain.

In some instances, it may beneficial for the antigen binding domain to be derived from the same species in which the CAR will ultimately be used in. For example, for use in humans, it may be beneficial for the antigen binding domain of the CAR to comprise human or humanized residues for the antigen binding domain of an antibody or antibody fragment. In some instances, the antigen binding domain are "cross-species" in that it binds to the counterpart antigen in a non-human primate, such as *Callithrix jacchus*, *Saguinus oedipus* or *Saimiri sciureus*, in order to facilitate a testing of immunogenicity of the antigen binding domain in these animals.

Cytoplastic Domain of TFP or CAR

The cytoplasmic domain of the TFP or CAR can include an intracellular signaling domain. An intracellular signaling domain is generally responsible for activation of at least one of the normal effector functions of the immune cell in which the CAR has been introduced. The term "effector function" refers to a specialized function of a cell. Effector function of a T cell, for example, may be cytolytic activity or helper activity including the secretion of cytokines. Thus the term "intracellular signaling domain" refers to the portion of a protein which transduces the effector function signal and directs the cell to perform a specialized function. While usually the entire intracellular signaling domain can be employed, in some cases it is not necessary to use the entire chain. To the extent that a truncated portion of the intracellular signaling domain is used, such truncated portion may be used in place of the intact chain as long as it transduces the effector function signal. The term intracellular signaling domain is thus meant to include any truncated portion of the intracellular signaling domain sufficient to transduce the effector function signal.

Examples of intracellular signaling domains for use in the TFP or CAR of the invention include the cytoplasmic sequences of the T cell receptor (TCR) and co-receptors that act in concert to initiate signal transduction following antigen receptor engagement, as well as any derivative or variant of these sequences and any recombinant sequence that has the same functional capability.

It is known that signals generated through the TCR alone are insufficient for full activation of the T cell and that a secondary and/or costimulatory signal is also required. Thus, T cell activation can be said to be mediated by two distinct classes of cytoplasmic signaling sequences: those that initiate antigen-dependent primary activation through the TCR (primary intracellular signaling domains) and those that act in an antigen-independent manner to provide a secondary or costimulatory signal (secondary cytoplasmic domain, e.g., a costimulatory domain).

A primary signaling domain regulates primary activation of the TCR complex either in a stimulatory way, or in an inhibitory way. Primary intracellular signaling domains that act in a stimulatory manner may contain signaling motifs which are known as immunoreceptor tyrosine-based activation motifs or ITAMs.

Examples of ITAM containing primary intracellular signaling domains that are of particular use in the invention include those of CD3 zeta, common FcR gamma (FCERIG), Fc gamma RIIa, FcR beta (Fc Epsilon Rib), CD3 gamma, CD3 delta, CD3 epsilon, CD79a, CD79b, DAP10, and DAP12. In one embodiment, a CAR of the invention comprises an intracellular signaling domain, e.g., a primary signaling domain of CD3-zeta.

In one embodiment, a primary signaling domain comprises a modified ITAM domain, e.g., a mutated ITAM domain which has altered (e.g., increased or decreased) activity as compared to the native ITAM domain. In one embodiment, a primary signaling domain comprises a modified ITAM-containing primary intracellular signaling domain, e.g., an optimized and/or truncated ITAM-containing primary intracellular signaling domain. In an embodiment, a primary signaling domain comprises one, two, three, four or more ITAM motifs.

The intracellular signaling domain of the TFP or CAR can comprise the CD3-zeta signaling domain by itself or it can be combined with any other desired intracellular signaling domain(s) useful in the context of a CAR of the invention. For example, the intracellular signaling domain of the CAR can comprise a CD3 zeta chain portion and a costimulatory signaling domain. The costimulatory signaling domain refers to a portion of the CAR comprising the intracellular domain of a costimulatory molecule. A costimulatory molecule is a cell surface molecule other than an antigen receptor or its ligands that is required for an efficient response of lymphocytes to an antigen. Examples of such molecules include CD27, CD28, 4-1BB (CD137), OX40, CD30, CD40, PD-1, ICOS, lymphocyte function-associated antigen-1 (LFA-1), CD2, CD7, LIGHT, NKG2C, B7-H3, and a ligand that specifically binds with CD83, and the like. For example, CD27 costimulation has been demonstrated to enhance expansion, effector function, and survival of human CART cells in vitro and augments human T cell persistence and antitumor activity in vivo (Song et al. Blood. 2012; 119(3):696-706). Further examples of such costimulatory molecules include CDS, ICAM-1, GITR, BAFFR, HVEM (LIGHTR), SLAMF7, NKp80 (KLRF1), NKp44, NKp30, NKp46, CD160, CD19, CD4, CD8alpha, CD8beta, IL2Rbeta, IL2R gamma, IL7R alpha, ITGA4, VLA1, CD49a, ITGA4, IA4, CD49D, ITGA6, VLA-6, CD49f, ITGAD, CD11d, ITGAE, CD103, ITGAL, CD11a, LFA-1, ITGAM, CD11b, ITGAX, CD11c, ITGB1, CD29, ITGB2, CD18, LFA-1, ITGB7, TNFR2, TRANCE/RANKL, DNAM1 (CD226), SLAAMF4 (CD244, 2B4), CD84, CD96 (Tactile), NKG2D, CEACAM1, CRTAM, Ly9 (CD229), CD160 (BY55), PSGL1, CD100 (SEMA4D), CD69, SLAMF6 (NTB-A, Ly108), SLAM (SLAMF1, CD150, IPO-3), BLAME (SLAMF8), SELPLG (CD162), LTBR, LAT, GADS, SLP-76, PAG/Cbp, and CD19a.

The intracellular signaling sequences within the cytoplasmic portion of the TFP or CAR of the invention may be linked to each other in a random or specified order. Optionally, a short oligo- or polypeptide linker, for example, between 2 and 10 amino acids (e.g., 2, 3, 4, 5, 6, 7, 8, 9, or 10 amino acids) in length may form the linkage between intracellular signaling sequence. In one embodiment, a glycine-serine doublet can be used as a suitable linker. In one embodiment, a single amino acid, e.g., an alanine, a glycine, can be used as a suitable linker.

In one aspect, the intracellular signaling domain is designed to comprise two or more, e.g., 2, 3, 4, 5, or more, costimulatory signaling domains. In an embodiment, the two or more, e.g., 2, 3, 4, 5, or more, costimulatory signaling domains, are separated by a linker molecule, e.g., a linker molecule described herein. In one embodiment, the intracellular signaling domain comprises two costimulatory signaling domains. In some embodiments, the linker molecule is a glycine residue. In some embodiments, the linker is an alanine residue.

In one aspect, the intracellular signaling domain is designed to comprise the signaling domain of CD3-zeta and the signaling domain of CD28. In one aspect, the intracellular signaling domain is designed to comprise the signaling domain of CD3-zeta and the signaling domain of 4-1BB.

Transmembrane Domain of TFP or CAR

The extracellular region of TFP or CAR comprising an antigen binding domain can be linked to the intracellular region, for example by a transmembrane domain. A transmembrane domain can include one or more additional amino acids adjacent to the transmembrane region, e.g., one or more amino acid associated with the extracellular region of the protein from which the transmembrane was derived (e.g., 1, 2, 3, 4, 5, 6, 7, 8, 9, 10 or up to 15 amino acids of the extracellular region) and/or one or more additional amino acids associated with the intracellular region of the protein from which the transmembrane protein is derived (e.g., 1, 2, 3, 4, 5, 6, 7, 8, 9, 10 or up to 15 amino acids of the intracellular region). In one aspect, the transmembrane domain is one that is associated with one of the other domains of the TFP or CAR is used. In some instances, the transmembrane domain can be selected or modified by amino acid substitution to avoid binding of such domains to the transmembrane domains of the same or different surface membrane proteins, e.g., to minimize interactions with other members of the receptor complex. In one aspect, the transmembrane domain is capable of homodimerization with another TFP on the TFP-T-cell surface (or another CAR on the CAR-T cell surface). In a different aspect the amino acid sequence of the transmembrane domain may be modified or substituted so as to minimize interactions with the binding domains of the native binding partner present in the same TFP or CAR.

The transmembrane domain may be derived either from a natural or from a recombinant source. Where the source is natural, the domain may be derived from any membrane-bound or transmembrane protein. In one aspect the transmembrane domain is capable of signaling to the intracellular domain(s) whenever the TFP or CAR has bound to a target. A transmembrane domain of particular use in this invention may include at least the transmembrane region(s) of e.g., the alpha, beta or zeta chain of the T-cell receptor, CD28, CD3 epsilon, CD45, CD4, CD5, CD8, CD9, CD16, CD22, CD33, CD37, CD64, CD80, CD86, CD134, CD137, CD154. Where desired, a hinge sequence or linker can be utilized to connect the extracellular domain to the transmembrane domain. Nonlimiting examples of hinge sequences are hinge sequences derived from a human immunoglobulin (Ig) hinge, e.g., an IgG4 hinge, or a CD8a hinge. A variety of linkers, oligo- or polypeptide linker, are available in the art for linking various domains together. They may vary in length from about 2 to 50 amino acids, and vary in amino acid composition. A commonly utilized linker is one enriched in glycine, e.g., amino acid sequence of GGGGSGGGGS, or variations thereof.

In some embodiments, the TFP- or the CAR-expressing cell described herein can further comprise multiple types of TFPs or CARs capable of binding to different antigens, or different epitopes on the same antigen. For instance, a TFP- or CAR-expressing cell of the present disclosure can comprise a second TFP or CAR that includes a different antigen binding domain, e.g., to the same target (CD19 or BCMA) or a different target (e.g., CD123). In one embodiment, when the TFP-expressing cell comprises two or more different TFPs or CARs, the antigen binding domains of the different TFPs or CARs can be such that the antigen binding domains do not interact with one another. For example, a cell expressing a first and second TFP can have an antigen binding domain of the first TFP, e.g., as a fragment, e.g., a scFv, that does not form an association with the antigen binding domain of the second TFP, e.g., the antigen binding domain of the second TFP is a $V_{HH}$. Similarly, a cell expressing a first and second CAR can have an antigen binding domain of the first CAR, e.g., as a fragment, e.g., a scFv, that does not form an association with the antigen binding domain of the second CAR, e.g., the antigen binding domain of the second CAR is a $V_{HH}$.

In some other embodiments, the TFP- or CAR-expressing cell described herein can further express another agent, e.g., an agent which enhances the activity of a TFP- or CAR-expressing cell. For example, in one embodiment, the agent can be an agent which inhibits an inhibitory molecule. Inhibitory molecules, e.g., PD1, can, in some embodiments, decrease the ability of a TFP- or CAR-expressing cell to mount an immune effector response. Examples of inhibitory molecules include PD1, PD-L1, CTLA4, TIM3, LAG3, VISTA, BTLA, TIGIT, LAIR1, CD160, 2B4 and TGFR beta. In one embodiment, the agent which inhibits an inhibitory molecule comprises a first polypeptide, e.g., an inhibitory molecule, associated with a second polypeptide that provides a positive signal to the cell, e.g., an intracellular signaling domain described herein. In one embodiment, the agent comprises a first polypeptide, e.g., of an inhibitory molecule such as PD1, LAG3, CTLA4, CD160, BTLA, LAIR1, TIM3, 2B4, CD93, OX40, Siglec-15, and TIGIT, or a fragment of any of these (e.g., at least a portion of an extracellular domain of any of these), and a second polypeptide which is an intracellular signaling domain described herein (e.g., comprising a costimulatory domain (e.g., 4-1BB, CD27 or CD28, e.g., as described herein) and/or a primary signaling domain (e.g., a CD3 zeta signaling domain described herein). In one embodiment, the agent comprises a first polypeptide of PD1 or a fragment thereof (e.g., at least a portion of an extracellular domain of PD1), and a second polypeptide of an intracellular signaling domain described herein (e.g., a CD28 signaling domain described herein and/or a CD3 zeta signaling domain described herein). PD1 is an inhibitory member of the CD28 family of receptors that also includes CD28, CTLA-4, ICOS, and BTLA. PD-1 is expressed on activated B cells, T-cells and myeloid cells (Agata et al. 1996 Int. Immunol 8:765-75). Two ligands for PD1, PD-L1 and PD-L2 have been shown to downregulate T-cell activation upon binding to PD1 (Freeman et al. 2000 J Exp Med 192:1027-34; Latchman et al. 2001 Nat Immunol 2:261-8; Carter et al. 2002 Eur J Immunol 32:634-43). Immune suppression can be reversed by inhibiting the local interaction of PD1 with PD-L1.

In one embodiment, the agent comprises the extracellular domain (ECD) of an inhibitory molecule, e.g., Programmed Death 1 (PD1) can be fused to a transmembrane domain and optionally an intracellular signaling domain such as 41BB and CD3 zeta (also referred to herein as a PD1 TFP). In one embodiment, the PD1 TFP, when used in combinations with an anti-CD19 TFP described herein, improves the persistence of the T-cell. In one embodiment, the TFP or CAR is comprising the extracellular domain of PD 1. Alternatively, provided are TFPs or CARs containing an antibody or antibody fragment such as a scFv that specifically binds to the Programmed Death-Ligand 1 (PD-L1) or Programmed Death-Ligand 2 (PD-L2).

In some embodiments, the present invention provides a population or a mixture of population of TFP- or CAR-expressing cells, in which PTPN2 expression or activity is downregulated (e.g., inhibited). In some examples, the population of TFP-expressing T-cells comprises a mixture of cells expressing different TFPs. The population of TFP-T-cells can include a first cell expressing a TFP having an anti-CD19 or anti-BCMA binding domain described herein, and a second cell expressing a TFP having a different anti-CD19 or anti-BCMA binding domain, e.g., an anti-CD19 or anti-BCMA binding domain described herein that differs from the anti-CD19 binding domain in the TFP expressed by the first cell. As another example, the population of TFP-expressing cells can include a first cell expressing a TFP that includes an anti-CD19 or anti-BCMA binding domain, e.g., as described herein, and a second cell expressing a TFP that includes an antigen binding domain to a target other than CD19 or BCMA (e.g., another tumor-associated antigen). The same approach may apply to a mixture of CAR-expressing cells, individual cells may target the same or different antigens.

Encompassed herein are also additional TFP or CAR configurations known in the art, including Split CARs, RCARs, as well as other TFP and CAR combinations described in WO2016187349, U.S. Pat. No. 9,856,497, WO2017123556, all of which are incorporated herein by reference in their entirety.

Further contemplated are allogeneic CAR-expressing cells in which its expression or activity of PTPN2 is inhibited. For example, the cell can be an allogeneic T cell, e.g., an allogeneic T cell lacking expression of a functional T cell receptor (TCR) and/or human leukocyte antigen (HLA), e.g., HLA class I and/or HLA class II. In particular, a T cell lacking a functional TCR can be, e.g., engineered such that it does not express any functional TCR on its surface, or engineered such that it does not express one or more subunits that comprise a functional TCR, or engineered such that it produces very little functional TCR on its surface. Alternatively, the T cell can express a substantially impaired TCR, e.g., by expression of mutated or truncated forms of one or more of the subunits of the TCR. The term "substantially impaired TCR" means that this TCR will not substantially elicit an adverse immune reaction in a host.

Allogeneic T cells that lack expression of a functional TCR and/or HLA can be obtained by any suitable means, including a knock out or knock down of one or more subunit of TCR or HLA. For example, the T cell can include a knock down of TCR and/or HLA using siRNA, shRNA, a CRISPR system, transcription activator like effector nuclease (TALEN), or zinc finger endonuclease (ZFN).

In some embodiments, an allogeneic cell can be a cell which does not express or expresses at low levels an inhibitory molecule, e.g. by any method described herein. For example, the cell can be a cell that does not express or expresses at low levels an inhibitory molecule, e.g., that can decrease the ability of a TFP- or CAR-expressing cell to mount an immune effector response. Examples of inhibitory molecules include PD1, PD-L1, CTLA4, TIM3, CEACAM (e.g., CEACAM-1, CEACAM-3 and/or CEACAM-5), LAG3, VISTA, BTLA, TIGIT, LAIR1, CD160, 2B4 and TGF beta.

The nucleic acid sequences coding for a desired TFP or CAR can be obtained using recombinant methods known in the art, such as, for example by screening libraries from cells expressing the gene, by deriving the gene from a vector known to include the same, or by isolating directly from cells and tissues containing the same, using standard techniques. Alternatively, the gene of interest can be produced synthetically, rather than cloned. Where desired, the TFP- and CAR-expressing cells of the present inventions are generated using lentiviral viral vectors.

Conventional viral and non-viral based gene transfer methods can be used to introduce TFP- or CAR-encoding sequences to a cell of interest, e.g., a lymphoid cell as disclosed herein. Such methods can be used to introduce the TFP- or CAR-encoding sequences to cells in culture, which in turn is administered into a subject. Non-viral vector delivery systems can include DNA plasmids, RNA (e.g. a transcript of a vector described herein), naked nucleic acid, and nucleic acid complexed with a delivery vehicle, such as a liposome. Viral vector delivery systems can include DNA and RNA viruses, which can have either episomal or integrated genomes after delivery to the cell.

Viral based systems can include retroviral, lentivirus, adenoviral, adeno-associated and herpes simplex virus vectors for gene transfer. Integration in the host genome can occur with the retrovirus, lentivirus, and adeno-associated virus gene transfer methods, which can result in long term expression of the inserted sequence. High transduction efficiencies can be observed in many different cell types and target tissues.

A subject lymphoid cell in which its PTPN2 expression and/or activity is downregulated (e.g., inhibited) finds an array of utility in treating a range of diseases associated with the antigen to which the TFP or CAR binds. For instance, PTPN2 downregulation (e.g., inhibition) enhances lymphoid cell expansion, effector function, and survival of human TFP- or CAR-expressing T cells in vitro, and human T cell persistence and antitumor activity in vivo.

In one aspect, the present disclosure provides a method of augmenting activity of an effector cell (e.g., T cells, NK cells, KHYG cells). The method typically comprising: contacting said effector cell with an effective amount of a PTPN2 inhibitor such that PTPN2 expression and activity is downregulated (e.g., inhibited) in said effector cell. Augmentation of effector activity can be evidenced by the cytolytic activity against a target cell such as a tumor or cancer cell, or helper activity including the release of cytokines. Assessing augmented effector function can be carried out using any methods known in the art or disclosed here. In some instances, cytotoxicity of an effector cell expressing TFP or CAR as disclosed herein can be greater in response to a PTPN2-inhibitor treatment as compared to a control lymphoid cell lacking such treatment. A TFP- or CAR-expressing effector cell treated with a PTPN2 inhibitor can be about 5%, 10%, 15%, 20%, 25%, 30%, 35%, 40%, 45%, 50%, 55%, 60%, 65%, 70%, 75%, 80%, 85%, 90%, 95%, 100%, 500% or more cytotoxic against tumor or cancer cells as compared to an effector cell lacking the treatment. In some embodiments, a change in cytotoxicity can comprise comparing such activity before and after treating the effector cell with a PTPN2 inhibitor. In some other instances, release of cytotoxic cytokines of an effector cell expressing TFP or CAR as disclosed herein can be greater in response to treating with a PTPN2 inhibitor as compared to a control lymphoid cell lacking such treatment. Exemplary cytokines include IFNγ, TNFα, CSF, TGFβ, IL-1, IL-2, IL-4, IL-5, IL-6, IL-13, IL-17, IL-21, IL-22, granzyme, and the like. A TFP- or CAR-expressing effector cell can generate about 1 fold, 2 fold, 3 fold, 4 fold, 5 fold, 6 fold, 7 fold, 8 fold, 9 fold, 10 fold, 50 fold, 100 fold or greater release of cytotoxic cytokines in response to a PTPN2 inhibitor treatment as compared to a control lymphoid cell that is not being exposed to the PTPN2 inhibitor.

In another aspect, the present disclosure provides a method of treating cancer in a subject in need thereof, comprising: administering to the subject an effective amount of lymphoid cells, wherein an individual lymphoid cell comprises (a) a chimeric T-cell receptor sequence encoding a T-cell receptor fusion protein (TFP), and/or (b) a chimeric antigen receptor (CAR) sequence encoding a CAR, wherein each of TFP and CAR, when present, exhibits specific binding to an antigen, and wherein expression and/or function of PTPN2 in said cell is downregulated (e.g., inhibited). In some embodiments of the disclosure, downregulation of PTPN2 expression and/or activity can be effected by one or more types of PTPN2 inhibitor disclosed herein. Where desired, downregulation of expression or activity of PTPN2 takes place transiently by contacting the cells with a small molecule PTPN2 inhibitor or a nucleic acid based PTPN2 inhibitor (e.g., siRNA or shRNA) that asserts such downregulation transiently without being integrated into the cell's genome. Alternatively, PTPN2 downregulation can occur permanently by contacting the cell with a PTPN2 inhibitor that disrupts the expression of the PTPN2 gene permanently by cleaving such gene with a CRISPR-based PTPN2 inhibitor.

In some examples, the practice of the subject method involves downregulating PTPN2 expression and/or activity in the lymphoid cells, ex vivo, prior to administering an effective amount of PTPN2-treated lymphoid cells (e.g., effector cells) to the subject. The ex vivo inhibition can be carried out prior to, concurrent with, or after the introduction of the nucleic acid encoding the TFP or CAR into the lymphoid cell. Such ex vivo treatment may facilitate the expansion and proliferation of the effector cells to yield to a cell count reaching a desired effective amount to be administered to a subject. Such ex vivo treatment may also prolong the survival effector cell persistence and antitumor activity in vivo. For instances, an effector cell of the present invention when infused into a subject is capable of killing tumor or cancer cells in the subject. Unlike antibody therapies, TFP-modified or CAR-modified immune effector cells (e.g., T cells, NK cells, KHYG cells) are able to replicate in vivo resulting in long-term persistence that can lead to sustained tumor control. In various aspects, the immune effector cells (e.g., T cells, NK cells, KHYG cells) administered to the subject, or their progeny, persist in the subject for at least four months, five months, six months, seven months, eight months, nine months, ten months, eleven months, twelve months, thirteen months, fourteen month, fifteen months, sixteen months, seventeen months, eighteen months, nineteen months, twenty months, twenty-one months, twenty-two months, twenty-three months, two years, three years, four years, or five years after administration of the T cell or NK cell or KHYG cells to the subject.

Accordingly, the present disclosure also provides a method of increasing the therapeutic efficacy of a TFP- or CAR-expressing cell directed to a tumor or tumor associated antigen. In some embodiments, administering a PTPN2 inhibitor occurs ex vivo. In other embodiments, administering a PTPN2 inhibitor occurs in vivo prior to, concurrent with, or after the cells have been administered to a subject, where the cell may have or may not have previously been exposed to the PTPN2 inhibitor ex vivo.

In one aspect, a fully-human TFP- or CAR-modified immune effector cells (e.g., T cells, NK cells, KHGY cells) of the invention may be a type of vaccine for ex vivo immunization and/or in vivo therapy in a mammal including a human.

The subject methods utilizing a TFP- or CAR-expressing lymphoid cells (including e.g., effector cells) that target one or more tumor antigens can be applied to treat solid tumor and hematological cancers. For example, the subject methods can be used to treat: Acute Lymphoblastic Leukemia (ALL), Acute Myeloid Leukemia (AML), Adrenocortical Carcinoma, Childhood Adrenocortical Carcinoma, AIDS-Related Cancers, Kaposi Sarcoma (Soft Tissue Sarcoma), AIDS-Related Lymphoma (Lymphoma), Primary CNS Lymphoma (Lymphoma), Anal Cancer, Appendix Cancer, Astrocytomas, Childhood (Brain Cancer), Atypical Teratoid/Rhabdoid Tumor, Basal Cell Carcinoma of the Skin, Bile Duct Cancer, Bladder Cancer, Bone Cancer (includes Ewing Sarcoma and Osteosarcoma and Malignant Fibrous Histiocytoma), Brain Tumors, Breast Cancer, Bronchial Tumors, Burkitt Lymphoma—see Non-Hodgkin Lymphoma, Carcinoid Tumor (Gastrointestinal), Childhood Carcinoid Tumors, Cardiac (Heart) Tumors, Atypical Teratoid/Rhabdoid Tumor, Embryonal Tumors, Germ Cell Tumor, Primary CNS Lymphoma, Cervical Cancer, Cholangiocarcinoma, Chordoma, Chronic Lymphocytic Leukemia (CLL), Chronic Myelogenous Leukemia (CML), Chronic Myeloproliferative Neoplasms, Colorectal Cancer, Craniopharyngioma, Cutaneous T-Cell Lymphoma (Mycosis Fungoides and Sézary Syndrome), Ductal Carcinoma In Situ (DCIS), Embryonal Tumors, Endometrial Cancer (Uterine Cancer), Ependymoma, Esophageal Cancer, Esthesioneuroblastoma (Head and Neck Cancer), Ewing Sarcoma (Bone Cancer), Extracranial Germ Cell Tumor, Extragonadal Germ Cell Tumor, Eye Cancer, Childhood Intraocular Melanoma, Intraocular Melanoma, Retinoblastoma, Fallopian Tube Cancer, Fibrous Histiocytoma of Bone, Malignant, and Osteosarcoma, Gallbladder Cancer, Gastric (Stomach) Cancer, Gastrointestinal Carcinoid Tumor, Gastrointestinal Stromal Tumors (GIST), Extragonadal Germ Cell Tumors, Ovarian Germ Cell Tumors, Testicular Cancer, Gestational Trophoblastic Disease, Hairy Cell Leukemia, Head and Neck Cancer, Heart Tumors, Hepatocellular (Liver) Cancer, Histiocytosis, Langerhans Cell Hodgkin Lymphoma, Hypopharyngeal Cancer (Head and Neck Cancer), Islet Cell Tumors, Pancreatic Neuroendocrine Tumors, Kaposi Sarcoma (Soft Tissue Sarcoma), Kidney (Renal Cell) Cancer, Laryngeal Cancer (Head and Neck Cancer), Leukemia, Lip and Oral Cavity Cancer (Head and Neck Cancer), Liver Cancer, Lung Cancer (e.g., Non-Small Cell and Small Cell), Lymphoma, Male Breast Cancer, Malignant Fibrous Histiocytoma of Bone and Osteosarcoma, Melanoma, Merkel Cell Carcinoma (Skin Cancer), Mesothelioma, Malignant, Metastatic Cancer, Metastatic Squamous Neck Cancer with Occult Primary (Head and Neck Cancer), Midline Tract Carcinoma, Mouth Cancer (Head and Neck Cancer), Multiple Endocrine Neoplasia, Multiple Myeloma/Plasma Cell Neoplasms, Mycosis Fungoides (Lymphoma), Myelodysplastic Syndromes, Myelodysplastic/Myeloproliferative Neoplasms, Myelogenous Leukemia, CML, Myeloid Leukemia, Acute (AML), Myeloproliferative Neoplasms, Chronic, Nasal Cavity and Paranasal Sinus Cancer (Head and Neck Cancer), Nasopharyngeal Cancer (Head and Neck Cancer), Neuroblastoma, Non-Hodgkin Lymphoma, Non-Small Cell Lung Cancer, Oral Cancer, Lip and Oral Cavity Cancer and Oropharyngeal Cancer (Head and Neck Cancer), Osteosarcoma and Malignant Fibrous Histiocytoma of Bone, Ovarian Cancer, Pancreatic Cancer, Pancreatic Neuroendocrine Tumors (Islet Cell Tumors), Papillomatosis (Childhood Laryngeal), Paraganglioma, Paranasal Sinus and Nasal Cavity Cancer (Head and Neck Cancer), Parathyroid Cancer, Penile Cancer, Pharyngeal Cancer (Head and Neck Cancer), Pheochromocytoma, Pituitary Tumor, Plasma Cell Neoplasm/Multiple Myeloma, Pleuropulmonary Blastoma, Pregnancy and Breast Cancer, Primary Central Nervous System (CNS) Lymphoma, Primary Peritoneal Cancer, Rectal Cancer, Retinoblastoma, Rhabdomyosarcoma, Salivary Gland Cancer (Head and Neck Cancer), Sarcoma, Childhood Rhabdomyosarcoma (Soft Tissue Sarcoma), Childhood Vascular Tumors (Soft Tissue Sarcoma), Ewing Sarcoma (Bone Cancer), Kaposi Sarcoma (Soft Tissue Sarcoma), Osteosarcoma (Bone Cancer), Soft Tissue Sarcoma, Uterine Sarcoma, Sezary Syndrome (Lymphoma), Skin Cancer, Childhood Skin Cancer, Small Cell Lung Cancer, Small Intestine Cancer, Soft Tissue Sarcoma, Squamous Cell Carcinoma of the Skin, Squamous Neck Cancer with Occult Primary, Metastatic (Head and Neck Cancer), Stomach (Gastric) Cancer, T-Cell Lymphoma, Cutaneous, Testicular Cancer, Throat Cancer (Head and Neck Cancer), Nasopharyngeal Cancer, Oropharyngeal Cancer, Hypopharyngeal Cancer, Thymoma and Thymic Carcinoma, Thyroid Cancer, Transitional Cell Cancer of the Renal Pelvis and Ureter (Kidney (Renal Cell) Cancer), Ureter and Renal Pelvis, Transitional Cell Cancer (Kidney (Renal Cell) Cancer, Urethral Cancer, Uterine Cancer, Endometrial, Uterine Sarcoma, Vaginal Cancer, Vascular Tumors (Soft Tissue Sarcoma), Vulvar Cancer, and Wilms Tumor and Other Childhood Kidney Tumors, and any of the aforementioned cancers exhibiting expression and/or activity of PTPN2 in the cancer cells.

The present disclosure also provides a pharmaceutical compositions comprising a TFP- or CAR-expressing cell, e.g., a plurality of TFP-expressing cells, as described herein, in combination with one or more pharmaceutically or physiologically acceptable carriers, diluents or excipients. Such compositions may comprise buffers such as neutral buffered saline, phosphate buffered saline and the like; carbohydrates such as glucose, mannose, sucrose or dextrans, mannitol; proteins; polypeptides or amino acids such as glycine; antioxidants; chelating agents such as EDTA or glutathione; adjuvants (e.g., aluminum hydroxide); and preservatives. Compositions of the present invention are in one aspect formulated for intravenous administration.

Pharmaceutical compositions of the present invention may be administered in a manner appropriate to the disease to be treated (or prevented). The quantity of administration will be determined by such factors as the condition of the subject, and the type and severity of the subject's disease, although appropriate dosages may be determined by clinical trials.

In one embodiment, the pharmaceutical composition is substantially free of, e.g., there are no detectable levels of a contaminant, e.g., selected from the group consisting of endotoxin, *mycoplasma*, replication competent lentivirus (RCL), p24, VSV-G nucleic acid, HIV gag, residual anti-CD3/anti-CD28 coated beads, mouse antibodies, pooled human serum, bovine serum albumin, bovine serum, culture media components, vector packaging cell or plasmid components, a bacterium and a fungus. In one embodiment, the bacterium is at least one selected from the group consisting of *Alcaligenes faecalis, Candida albicans, Escherichia coli, Haemophilus influenza, Neisseria meningitides, Pseudomonas aeruginosa, Staphylococcus aureus, Streptococcus pneumonia*, and *Streptococcus pyogenes* group A.

The precise effective amount of the compositions of the present invention to be administered can be determined by a physician with consideration of individual differences in age, weight, tumor size, extent of infection or metastasis, and condition of the subject. It can generally be stated that a pharmaceutical composition comprising the T-cells described herein may be administered at a dosage of $10^4$ to $10^9$ cells/kg body weight, in some instances $10^5$ to $10^6$ cells/kg body weight, including all integer values within those ranges. T-cell compositions may also be administered multiple times at these dosages. The cells can be administered by using infusion techniques that are commonly known in immunotherapy (see, e.g., Rosenberg et al., New Eng. J. of Med. 319:1676, 1988).

In some examples, it may be desired to administer activated T-cells to a subject and then subsequently redraw blood (or have an apheresis performed), activate T-cells therefrom according to the present invention, and reinfuse the patient with these activated and expanded T-cells. This process can be carried out multiple times every few weeks. In certain aspects, T-cells can be activated from blood draws of from 10 cc to 400 cc. In certain aspects, T-cells are activated from blood draws of 20 cc, 30 cc, 40 cc, 50 cc, 60 cc, 70 cc, 80 cc, 90 cc, or 100 cc. In some embodiments, the T-cell compositions of the present invention are administered by i.v. injection. The compositions of T-cells may be injected directly into a tumor, lymph node, or site of infection.

In some examples, a subject may undergo leukapheresis, wherein leukocytes are collected, enriched, or depleted ex vivo to select and/or isolate the cells of interest, e.g., T-cells. These T-cell isolates may be expanded by methods known in the art and treated such that one or more TFP constructs of the invention may be introduced, thereby creating a TFP-expressing or CAR-expressing T-cell of the invention.

The following examples are given for the purpose of illustrating various embodiments of the disclosure and are not meant to limit the present disclosure in any fashion. The present examples, along with the methods and compositions described herein, are presently representative of preferred embodiments, are exemplary, and are not intended as limitations on the scope of the disclosure. Changes therein and other uses which are encompassed within the spirit of the disclosure as defined by the scope of the claims will occur to those skilled in the art.

EXAMPLES

Example 1: Lenti-Viral Preparation and Infection to T Lymphocytes

Lenti-viruses are prepared from 293T cells. Briefly, approximately 10 million 293T cells are seeded onto collagen coated 15 cm dishes at day −1. At day 0, approximately 10-20 ug shRNA vector (i.e., vector comprising sequence encoding the PTPN2-targeting or control shRNA), 15 ug Gag/pol vector, and 5 ug VSV-G vector are transfected using Lipofectamin 2000 (Invitrogen). 24 hours later (day 1), media is changed. After changing media, viral supernants are harvested at day 2 and day 3. Viruses are concentrated with Lenti-X concentrator. Approximately 100 ul of viruses are added into approx. 0.5 million Jurkat cells in the presence of 6 µg/ml of polybrene. The cells are spin-infected at 2000 rpm, 90 min at 32° C. After 1 hour incubation at 37 degree incubator, fresh RPMI 1640 media is added and transferred into 24-well plate. At day 6, cells is transferred into 6-well plate in the presence of final concentration about 2 µg/ml of puromycin for about 5 days Example 2: Inhibition by shRNA PTPN2 Inhibitor Western Blotting: Demonstrating Inhibition of PTPN2 Polypeptide Expression Inhibition of PTPN2 polypeptide expression is carried out with the use of ant-PTPN2 shRNA transfected into Jurkat cells or primary human T cells. Total cell lysates are prepared in protease inhibitor cocktails (Sigma) containing RIPA buffer. Protein concentration is measured by e.g., BCA protein assay kits (Pierce, Item #: 3603904). Total cell lysate protein is subjected to SDS-PAGE followed by transferring protein onto nitrocellulose membrane using iBot transfer system (Invitrogen, 20V, 11 min 30 sec). The membrane is blocked in standard 5% BSA containing TBST for approximately 30 min at room temperature. Anti-PTPN2 antibodies (e.g., TheromFisher Cat #MA5-12278 or Cat #32-5800) is incubated with membranes. PTPN2 polypeptide level is detected according to the manufacturer's instruction.

qRT-PCR: Demonstrating Inhibition of PTPN2 Polynucleotide Expression qRT-PCR is utilized to assess inhibition of PTPN2 polynucleotide expression by anti-PTPN2 shRNA transfected into Jurkat cells or primary human T cells. An RNeasy Micro Kit (Qiagen) is used to extract RNA. mRNA is reverse transcribed to single-strand complementary DNA (cDNA) with SuperScript III First-Strand Synthesis System for RT-PCR (Invitrogen). Real-time PCR is performed with C1000 Touch Thermal Cycler (Biorad). A SYBR-based protocol is used to detect gene expression (SsoAdvanced Universal SYBR Green Supermix, Biorad). The PCR reactions are done in 96-well plates and run using the manufacture's recommended cycling parameters using primers hybridizing to the coding region of PTPN2 polynucleotide.

Scrambled control shRNA is utilized as a negative control in parallel to the anti-PTPN2 shRNA. The shRNA constructs expressing Red Fluorescence Protein (RPF) and puromycin resistant gene are introduced into Jurkat cells to demonstrate knockdown efficiency of PTPN2 shRNAs by qRT-PCR or Western Blotting. shRNA infected Jurkat cells expressing RFP can also be detected and quantitated by FACS on FACS Fortessa (BD), with the aid of FlowJo (Treestar Inc.) program.

Example 3: CRISPR-Based PTPN2 Inhibitor

Guide RNA Molecules gRNA molecules comprising the targeting sequences exhibiting homology to PTPN2 polynucleotide is designed according to methods known in the art. gRNA can be directed to the coding or regulatory sequences of PTPN2 to effect specific targeting.

Introduction of CRISPR-Based PTPN2 Inhibitor into TFP-Expressing or CAR-Expressing T Cells Isolated and frozen Pan T cells are thawed and activated with CD3/CD28 beads (CD3/CD28 CTS Dynabeads) on day 0. On day 1, activated T cells are transduced with lentivirus encoding a desired CAR or TFP directed to a given tumor antigen. On approximately day 3, transduced T cells are electroporated to introduce CRISPR/Cas systems in the form of pre-complexed gRNA/Cas9 ribonuclear protein ("RNP"). The cells are allowed to grow in culture for approximately one more week. Cells are then divided, some being used for flow cytometry to stain CAR, CD3, CD4 and CD8. A portion of the remaining T cells is used for next generation sequencing (NGS) on Illumina platform to confirm cleavage of endogenous PTPN2 sequences in T cells. The rest of the cells are kept for other functional assays disclosed below.

Example 4: Cytokine Release Assay

Effector cells (TFP- or CAR-expressing T cells) transduced with or without RNP are utilized. These cells are activated to release cytokine by co-culturing with target cells at a desired Effector:Target cell ratio, e.g., 10:1, 5:1, or 1:1. Co-culture supernatant is harvested after approximately 20 hrs. These supernatants are then used to measure the released cytokines such as IL-2 and IFN-g, using Meso Scale Discovery, Proinflammatory Panel 1 catalog #N05049A-1 system according to the manufacturer's protocol. The target cells can be irradiated (e.g. at 10,000) prior to co-culturing with the TFP- or CAR-expressing cells. This assay is to demonstrate that inhibiting PTPN2 by a CRISPR-based PTPN2 inhibitor causes an increase in cytokine release (e.g., IL-2 or IFN-g) by T cells in response to the antigen to which the TFP or CAR binds.

Example 5: Cell Proliferation Assay

Effector cells (TFP- or CAR-expressing T cells) transduced with or without RNP are utilized. These cells are activated to proliferate by co-culturing with target cells that comprise the target tumor antigen to which the TFP or CAR binds. Typically the target cells are irradiated, washed and counted. Co-culturing is performed at a desired Effector:Target cell ratio, e.g., 10:1, 5:1, or 1:1. Proliferation of the TFP- or CAR-expressing T cells are evaluated, typically after bead expansion for about 10 days. The number of cells per mL and the viability of cells are measured by Cellometer. This example is to demonstrate that PTPN2 inhibition by (e.g., gene cleavage with CRISPR-based PTPN2 inhibitor) yields an increase in cell number and viability relative to cells not treated with CRISPR-based PTPN2 inhibitor.

Example 6: A Phosphatase Activity Assay

Assessing selectivity and potency of a small molecule PTPN2 inhibitor The selectivity and potency of a small molecule PTPN2 inhibitor as provided herein (e.g., a compound of Formula A, Formula B, Formula C, Formula Z, Formula (I), Formula (I-A), Formula (I-A1), Formula (I-B), Formula (I-B1), or Formula (I-B2)) against one or more protein tyrosine phosphatase (PTP) enzymes, and specifically against PTPN2, is assessed in various ways. The one or more PTP enzymes comprise *Mycobacterium* protein tyrosine phosphatase A (mPTPA), *Mycobacterium* protein tyrosine phosphatase B (mPTPB), PTPN1 (i.e., PTP1B), PTPN2 (i.e., TC-PTP), PTPN22 (i.e., LYP), SHP-1, SHP-2, FAP-1, Meg2, HePTP, Laforin, VHX, VHR, LMWPTP, Cdc14A, LAR, CD45, PTPRG, a fragment thereof, a variant thereof, and a combination thereof. Selectivity and potency of a small molecule PTPN2 inhibitor is evaluated using a PTP activity inhibition assay. The assay is performed using a buffer comprising 50 millimolar (mM) Bis-Tris (pH=6.3), 2 mM EDTA, and 5 mM N,N'-dimethyl-N,N'-bis(mercaptoacetyl)hydrazine (DMH).

The assay is performed using a phosphated substrate, e.g., 10 mM fluorescein diphosphate (FDP) that is stored at −20° C. Alternatively or in addition to, the assay is performed using 10 mM DiFMUP as a phosphated substrate. Each PTP enzyme is diluted in an enzyme dilution buffer comprising 50 mM Bis-Tris (pH=6.3), 2 mM EDTA, 5 mM DMH, 20% (vol./vol.) glycerol, and 0.01% (vol./vol.) Triton X-100.

The assay is carried out at room temperature in 96 well plates. A reaction mixture of 170 microliter (µL) of the assay buffer comprising 10 µM FDP or DiFMUP is added to each well. A 10 µL volume of (i) a small molecule PTPN2 inhibitor dissolved in DMSO at one of 10 concentrations from a serial dilution or (ii) DMSO alone for control is added to each well. The plate is mixed for 2 minutes. The reaction is initiated by adding 20 µL of a PTP enzyme (e.g., PTPN2) that is diluted in the enzyme dilution buffer. The phosphatase activity of the PTP enzyme is assessed by monitoring appearance of a fluorescent product (e.g., fluorescein monophosphate (FIMP) from FDP, or 6,8-difluoro-7-hydroxyl-4-coumarin (DiFMU) from DiFMUP) continuously for about 15 to 30 minutes, using the SpectraMax® Gemini™ XPS Microplate Spectrofluorometer (Molecular Devices®) with excitation of 440 nm and emission at 530 nm (cutoff filter at 525 nm) for FIMP and excitation at 360 nm and emission at 450 nm (cutoff filter at 435 nm) for DiFMU. Each assay is performed at least in duplicate. The rate (e.g., the initial rate) of FIMP or DiFMU formation is plotted against the concentration of the small molecule PTPN2 inhibitor, and the data is fitted (e.g., using a 4-parameter equation) to determine the inflection point of the fit as the $IC_{50}$ of the small molecule PTPN2 inhibitor for a specific enzyme.

pSTAT1 Assay

STAT1 is a substrate of PTPN2. Inhibition of PTPN2 results in an increase in phosphorylated STAT1 (pSTAT1). A pSTAT1 assay described herein can be used to assess the selectivity and potency of a PTPN2 small molecule inhibitor such as a compound of Formula A, Formula B, Formula C, Formula Z, Formula (I), Formula (I-A), Formula (I—A1), Formula (I-B), Formula (I-B1), or Formula (I-B2)). T cells are purified from C57BL/6 splenocytes using pan T cell isolation kit, (Biolegend Mojosort, #480031) and then incubated with compounds titrated in 3-fold dilution from 30 nM to 10 µM in a round bottom 96 well plate (Thermo Scientific, #12-565-12). Cells are then stimulated with 10 ng/ml IFNa (R&D Systems #11100-1) for 5 hours and then stained with surface markers for CD4-PeCy (Biolegend #100527) and CD8-FITC (Biolegend #100723). Afterwards, cells are fixed (with 2% paraformaldehyde) and permeabilized in methanol and acetone, followed by staining with antibodies to pSTAT1 Y701 (Cell signaling, #8062). The stained cells are analyzed by flow cytometry using the ZE5 flow cytometer (BD Biosciences). Data can be analyzed as a percentage of DMSO (negative control) treated T cells, e.g., EC50/% efficacy is graphed using Prism (Graphpad) as a percentage of DMSO treated T cells.

Cytokine Release Assay

Effector cells (e.g., non-modified T cells, or TFP- or CAR-expressing T cells) are activated with CD3/CD28 beads (CD3/CD28 CTS Dynabeads) in the presence of a small molecule PTPN2 inhibitor for 12-24 hours (optionally longer). The activated effector cells are induced to release cytokine by co-culturing with target cells at a desired Effector:Target cell ratio, e.g., 10:1, 5:1, or 1:1. Co-culture supernatant is harvested after approximately 20 hrs. These supernatants are then used to measure the released cytokines such as IL-2 and IFN-g, using Meso Scale Discovery, Proinflammatory Panel 1 catalog #N05049A-1 system according to the manufacturer's protocol. The target cells can be irradiated (e.g. at 10,000) prior to co-culturing with the effector cells. This assay is to demonstrate that inhibiting PTPN2 by a small molecule PTPN2 inhibitor causes an increase in cytokine release (e.g., IL-2 or IFN-g) by T cells in response to the antigen to which the TFP or CAR binds.

Cell Proliferation Assay

Effector cells (e.g., non-modified T cells, or TFP- or CAR-expressing T cells) are activated with CD3/CD28 beads (CD3/CD28 CTS Dynabeads) in the presence of a small molecule PTPN2 inhibitor for 12-24 hours (optionally longer). The activated effector cells are induced to proliferate by co-culturing with target cells that comprise the target tumor antigen to which the TFP or CAR binds. Typically the target cells are irradiated, washed and counted. Co-culturing is performed at a desired Effector:Target cell ratio, e.g., 10:1, 5:1, or 1:1. Proliferation of the effector cells are evaluated, typically after bead expansion for about 10 days. The number of cells per mL and the viability of cells are measured by Cellometer. This example is to demonstrate that PTPN2 inhibition by a small molecule PTPN2 inhibitor yields an increase in effector cell number and viability relative to effector cells not treated with a small molecule PTPN2 inhibitor.

CD25 Assay

CD25 is a marker for T cell activation. Inhibition of PTPN2 results in an increase in CD25 expression in CD4 T cells. T cells are purified from C57BL/6 splenocytes using pan T cell isolation kit, (Biolegend Mojosort, #480031) and then incubated with compounds titrated in duplicate with a 3-fold dilution from 30 nM to 10 µM in a round bottom 96 well plate (Thermo Scientific, #12-565-12). Cells are then stimulated with retronectin treated plates (12.5 µg/mL, Fisher #50-444-032) as well as 5 µg/mL of both anti-CD3 and anti-CD28 (#152302, #102115, Biolegend) for 48 hours, and then stained with surface markers for CD4-PeCy (Biolegend #100527), CD8-FITC (Biolegend #100723), and CD25-APC (Biolegend #102012). Afterwards, cells are fixed (with 2% paraformaldehyde, Fisher #50-980-486) and analyzed by flow cytometry using the ZE5 flow cytometer (BD Biosciences). Data can be analyzed as a percentage of DMSO (negative control) treated T cells, e.g. to reflect EC50/% efficacy is graphed using Prism (Graphpad).

Cytotoxicity Assay

Effector cells (e.g., non-modified T cells, or TFP- or CAR-expressing T cells) are activated with CD3/CD28 beads (CD3/CD28 CTS Dynabeads) in the presence of a small molecule PTPN2 inhibitor for 12-24 hours (optionally longer). Target cells (e.g., cancer or tumor cells) that comprise the target tumor antigen to which the TFP or CAR binds are incubated with Calcein-AM in the dark, washed, and counted. The activated effector cells are co-cultured with the target cells. Co-culturing is performed at a desired Effector:Target cell ratio, e.g., 10:1, 5:1, or 1:1. At the end of the co-culture period (e.g., 5 hours), the number of target cells and the viability of the target cells are assessed by measuring Calcein fluorescence from the collected cells. This example is to demonstrate that PTPN2 inhibition by a small molecule PTPN2 inhibitor yields an increase in cytotoxicity of effector cells against target cells relative to effector cells not treated with a small molecule PTPN2 inhibitor.

Example 7: CAR-T Killing Assay

The ability of PTPN2 inhibitors to potentiate tumor cell killing using CAR-Ts that express a chimeric antigen receptor against a tumor antigen (e.g., HER2) has been demonstrated as follows. Anti-HER-2 specific CAR-T cells (CAR-Ts) were generated by transducing primary human CD3+ T cells (Discovery Life Sciences) with a lentivirus expressing a chimeric antigen receptor specific to human HER2, as well as GFP (Creative Bio). Prior to transduction, T cells were stimulated overnight with anti-CD3 and anti-CD28 antibodies coated onto magnetic beads (Invitrogen) at a 1:1 bead-to-cell ratio. Four days after transduction, the beads were removed and the following day CAR-Ts were sorted based on GFP expression and expanded in hIL7 (10 ng/mL) (Peprotech) and hIL15 (5 ng/mL) (Peprotech) for an additional 8 days. Thereupon, CAR-Ts were co-cultured with a Nuclight Red (Essen Biosciences)-labeled HER-2 positive tumor line (OVCAR-3) or a HER-2 negative line (HEK293T) for 18 h at a 1:1 effector:target cell ratio.

Figure 2:
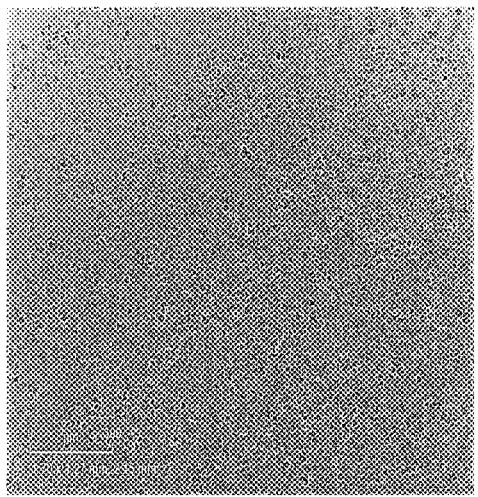
FIG. 2 depicts images of tumor cell culture treated without CAR-T (negative control), treated with DMSO (negative control), or treated with a PTPN2 inhibitor. The results demonstrate enhanced killing of tumor cells when CAR-T cells were pretreated transiently with a PTPN2 inhibitor as described in Example 7.
Figure 2:
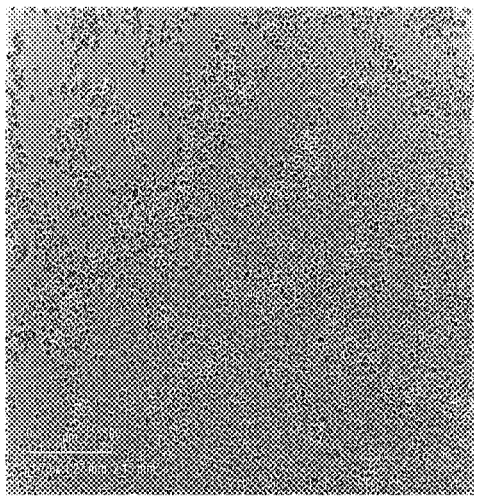
Figure 2:
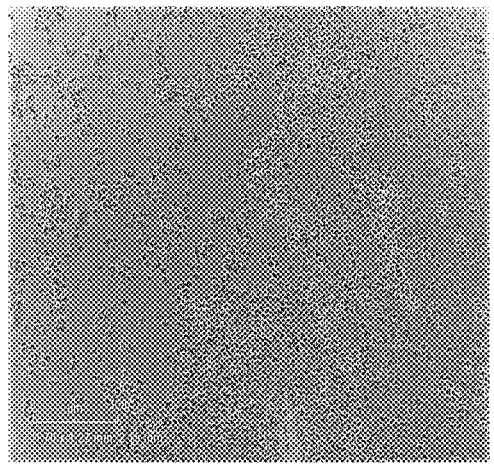
Figure 3:
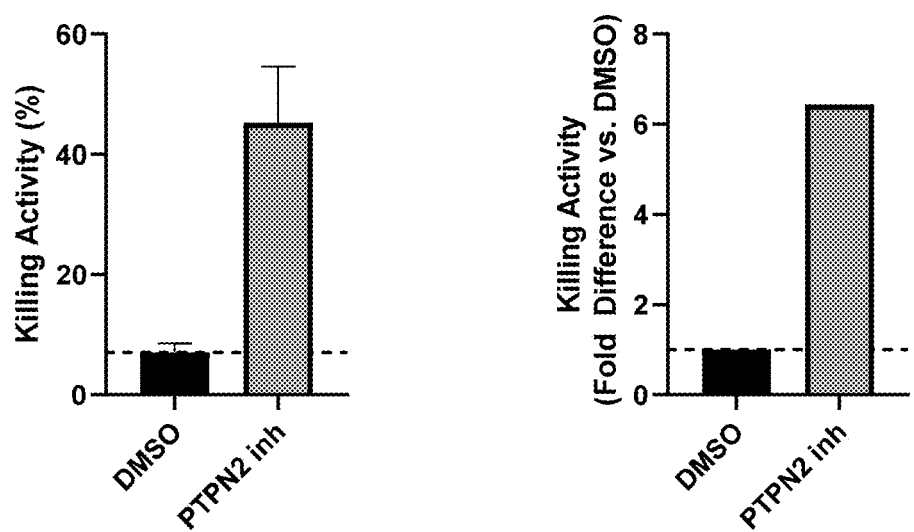
FIG. 3 depicts the quantitative analysis of the cell killing activity comparing CAR-T cells treated transiently with a PTPN2 inhibitor and DMSO, respectively, as described in Example 7.

CAR-Ts were pretreated with 0.1% DMSO (vehicle control) or a PTPN2 inhibitor for 1-2.5 hours prior to co-culture with cell lines at indicated concentrations. PTPN2 inhibitor was washed from CAR-Ts prior to inclusion in the tumor killing assay. Tumor killing was assessed by comparing DMSO-treated CAR-Ts to PTPN2 inhibitor-treated CAR-Ts using either flow cytometry or Incucyte imaged-based assessment of tumor cell viability, at various effector:target ratios. Percent killing was assessed by calculating the amount of viable cells at a given time point as compared to untreated tumor cells (spontaneous release, marked "No CAR-T" in FIG. 2), tumor cells treated with PTPN2 inhibitor, and tumor cells cultured with DMSO treated CAR-T cells as a control. The results demonstrate that: (a) PTPN2 inhibitor (Compound A) treated CAR-T cells exhibit a higher tumor cell killing activity as compared to control cells treated with DMSO; and (b) even a transient treatment of PTPN2 inhibitor (e.g., for an hour followed by washing) is sufficient to potentiate the ability of CAR-T cells to kill tumor cells under the conditions being tested. FIG. 3 shows at least a 6-fold increase in cell killing when the CAR-T cells were transiently administered with PTPN2 inhibitors as compared to the control.

Example 8: CAR-T Adoptive Cell Transfer Xenograft Tumor Assay

For in vivo studies with CAR-Ts, nude mice are implanted with OVCAR xenografts. After reaching a suitable size of 50-100 mm$^3$, approximately 10$^6$ CAR-Ts transiently treated (e.g., for 1 hr and then washing away) with or without PTPN2 inhibitor are transferred i.v. into tumor bearing mice. Tumor volume and CAR-T cell count are measured at multiple time points and compared to control groups treated with DMSO (e.g., for 1 hr and then washing away). It is expected that mice administered with CAR-Ts that are treated with PTPN2 inhibitor exhibit lower tumor volume, higher frequency of CAR-Ts in the blood, and/or greater infiltration and/or activation of CAR-Ts into tumors, smaller tumor volume and/or higher CAR-T cell counts.

Example 9: Mouse Adoptive Cell Transfer Syngeneic Tumor Assay

Thy1.1 congenic C57BL/6 mice are implanted with approximately 5×10$^5$ of OVA expressing syngeneic tumor cells (B16-OVA, EL4 OVA, or YUMM1.1) formulated with 50% Matrigel (50% PBS). Prior to the implantation, the B16-OVA, EL4 OVA, or YUMM1.1 tumor cell lines are transduced with a lentivirus encoding an OVA-GFP fusion protein. After sorting for GFP expression, the B16-OVA, EL4 OVA, or YUMM1.1 cells are shown to grow in untreated C57BL/6 mice. After growing to a volume of ~50-100 mm$^3$, tumor bearing mice would receive i.v. transfer of approximately 1×10$^6$ OT-1 transgenic T cells that will undergo the following treatments. First, primary OT-1 splenocytes are treated with 10 nm of SIINFEKL peptide or anti-CD3/anti-CD28 coated beads. After 2 days, the cells are washed and transferred into culture medium with IL-2, IL-7 and IL-15 (all at 5 ng/ml) for another 3 days. In other experiments, naïve OT-1 CD8 T cells are isolated for transfer. Prior to the transfer, the OT-1 cells are treated with DMSO (vehicle control) or a PTPN2 inhibitor for 1 hour and washed in PBS two times prior to injection.

The test groups are separated as follows: Tumor alone, Tumor+DMSO treated OT-1s, Tumor+PTPN2 inhibitor treated OT-1s. Each group may include 8 mice for the 2 time points tested. To assess in vivo efficacy, tumor volume is measured 3×/week using calipers at various time points post OT-1 injection. Furthermore, at day 7, the first group of mice are sacrificed to compare immune activation and infiltration in both secondary lymphoid tissue and in tumors. The abundance and activation state of immune cells are quantified using flow cytometry. The results are expected to demonstrate that a transient treatment with PTPN2 is sufficient to potentiate anti-tumor killing as evidenced by (a) a decrease in tumor volume, and/or (b) an increase in the abundance of activated T cells in spleen, lymph nodes and/or in tumor.

Example 10: Cytotoxic CD8 T Cell Killing Assay

The ability of PTPN2 inhibitors to potentiate tumor cell killing using cytotoxic CD8 T cells (CTLs) that express a specific TCR against an antigen (e.g., OVA) has been demonstrated as follows. Whole splenocytes from C57BL/6-Tg(TcraTcrb)1100Mjb/J (Jackson Labs #003831) were prepared and red blood cells were lysed using 1× RBS lysis buffer (Miltenyi: 130-094-183). Cells were quenched with 10% fetal bovine serum containing T cell media (RPMI) and cell concentration adjusted to 1 million cells/mL. Cytotoxic CD8 T cells were generated by culturing cells in 1 mL volume (1 million total splenocytes) in 24-well cell culture dishes with 1 µM OVA (SIINFEKL) peptide (AnaSpec: AS-60193-1) and 10 ng/mL of recombinant human IL-2 (BioLegend: 589102) for 48 h. After 48 h, cells were split 1:4 into fresh T cell media containing only 10 ng/mL of human IL-2. B16F10 cells expressing OVA sequence was generated in-house (B16-OVA cells). B16-OVA cells were seeded in flat-bottom 96-well plates at 50,000 cells/well in 100 µL of media the day before co-culture. To induce MIHC-I expression, 2 ng/mL of mouse IFNg (BioLegend: 575302) was added and verified by flow cytometry. On the day of co-culture, CTLs generated were treated with the indicated PTPN2 inhibitors (Compound B, C, D, or E) for 2 h at three different inhibitor concentrations (1 µM, 3 µM, or 10 µM). After 2 h, cells were spun down and washed once in pre-warmed media. Cells were then resuspended in media containing fresh compounds or in media without compounds, followed by co-culturing with IFNg treated B16-OVA cells at a 1.25:1 CD8 T cell:Tumor ratio for 24 h. After co-culture, cells were harvested and remaining adherent B16-OVA cells were additionally harvested by trypsinization and pooled.

Figure 4:
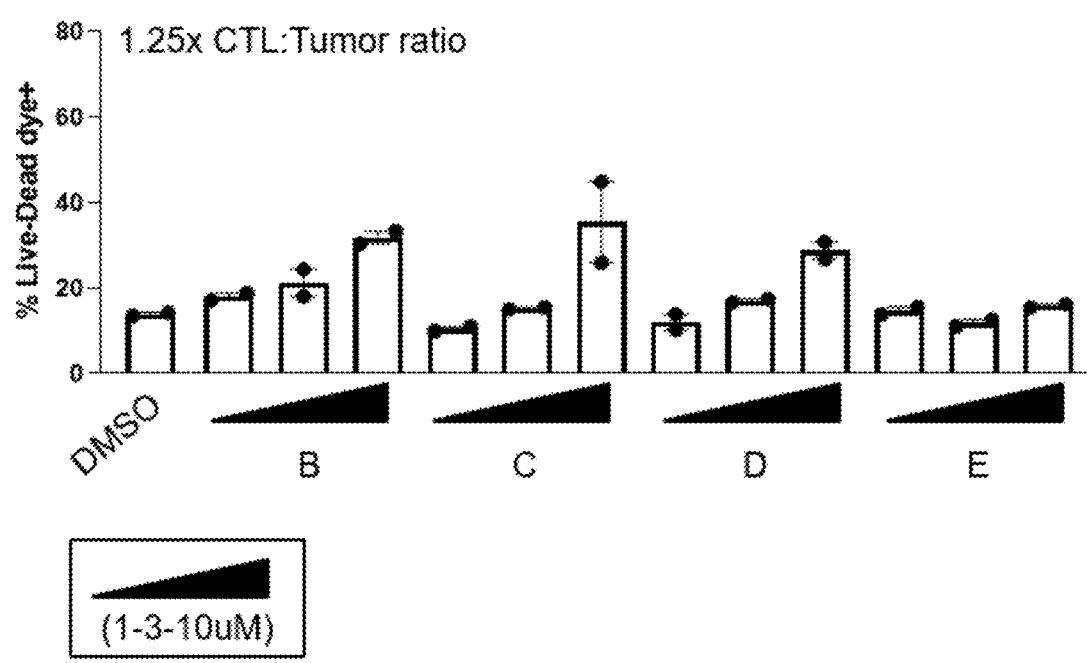
FIG. 4 depicts the quantitative analysis of the cell killing activity of CTL cells treated with either DMSO or small molecule PTPN2 inhibitor B, C, D, or E at a concentration of 1, 3, or 10 µM at a CTL:tumor ratio of 1.25:1.

Tumor cell death was assessed by comparing DMSO-treated CTLs to PTPN2 inhibitor-treated CTLs by staining cells with the indicated flow cytometry antibodies to distinguish CD8 T cells from the tumor cells as well as a live-dead indicator dye (Zombie-NIR: BioLegend). The results shown in FIG. 4 demonstrate that PTPN2 inhibition during antigen-specific CTL killing enhances cytotoxicity activity of the CTLs in a dose-dependent manner.

Example 11: CAR-T Killing Assay

HER2 scFv-CD28-CD3z-CAR-T (Creative Bio) lentiviral particles were generated via transfection of 293T cells using Lipofectamine 2000 transfection reagent (ThermoFisher) according to manufacturer's instructions. Human CD3$^+$ T cells were negatively selected from peripheral blood mononuclear cells (PBMCs) (Discovery Life Sciences) from two individual healthy donors (Donor 1, Donor 2) using EasySep Human T cell Isolation Kit (StemCell Technologies #17951) and subsequently activated at a concentration of 0.5×10$^6$ cells/mL with Human T Expander Dynabeads (Gibco) (Thermo Fisher Scientific #11141D) at a ratio of 1 bead per cell in CTS Optimizer T cell expansion serum free medium (SFM) (Thermo Fisher Scientific #A1048501) supplemented with recombinant human IL-7 (10 ng/mL) and recombinant human IL-15 (5 ng/mL) (Peprotech #200-02). The following day, lentiviral supernatant was harvested (48 h post transfection), spun, filtered through a 0.45 µm filter, and bound to a 24-well Retronectin (Takara Bio) (20 µg/mL)-coated plate via centrifugation at 3000 rpm, 2 h, 32° C. Following one PBS wash, activated CD3$^+$ cells (0.5 mL/well) were added, transduced via spinfection at 800 g, 1.5 h, 32° C. and cultured at 37° C. At 3d post-transduction, beads were removed and cells expanded as needed to maintain a cell density of 0.5×10$^6$ cells/mL until they were harvested at day 14 for experimental use.

For the killing assay, HER2-positive OVCAR-3 (ATCC #HTB-161) ovarian cancer cells stably transduced with IncuCyte Nuclight Red Lentivirus (Essen Biosciences #4706) in OVCAR media (RPMI 1640+20% FBS, 1% Pen-Strep+0.01 mg/mL human insulin) were plated (1.5× 10$^4$ cells/well) in 96-well flat-bottom plates and incubated at 37° C. to allow for overnight adherence to serve as target cells. The next day, OVCAR media was replaced with 100 µL/well 10% cRPMI (10% FBS, 1% Pen Strep in RPMI 1640) and incubated at 37° C. prior to the addition of compound-treated (1 h) HER2 scFv-CD28-CD3z-CAR-T cells in the presence of the indicated PTPN2 inhibitors (Compound B or C). Cells were co-cultured for 2 h at 37° C., at which time they were stained with a viability dye (Live/Dead Fixable Aqua Dead Cell Stain Kit; ThermoFisher #L34966). Tumor cell death was quantified on a ZE5 flow cytometer (Bio-Rad).

Figure 5:
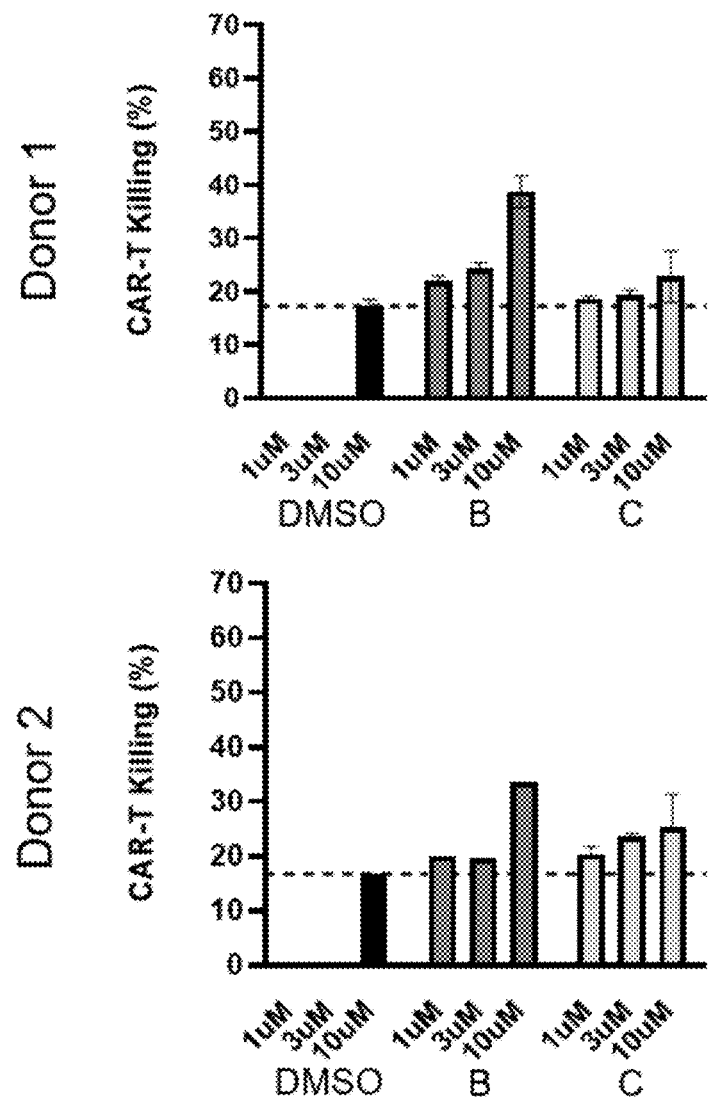
FIG. 5 depicts the quantitative analysis of the cell killing activity of CAR-T cells generated from Donor 1 or Donor 2 and treated with DMSO or small molecule PTPN2 inhibitor B or C at a concentration of 1, 3, or 10 µM.

The results shown in FIG. 5 demonstrate that: CAR-T cells treated with PTPN2 small molecule inhibitors B, and C exhibit a higher tumor cell killing activity as compared to control cells treated with DMSO. The increase in cell killing activity potentiated by the PTPN2 small molecule inhibitors is regulatable and attenuated upon washing off the inhibitors.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the invention. It is intended that the following claims define the scope of the invention and that methods and structures within the scope of these claims and their equivalents be covered thereby.

What is claimed is:

1. A method of treating cancer in a subject in need thereof, comprising: (a) administering systemically a small molecule PTPN2 inhibitor to the subject; and (b) administering a second agent or a second therapy concurrently, before, or after step (a), wherein the second agent or the second therapy comprises an amount of lymphoid cell that is sub-therapeutic as ascertained in the absence of the PTPN2 inhibitor, and wherein the lymphoid cell (1) retains expression or activity of PTPN2 prior to being exposed to the small molecule PTPN2 inhibitor, and (2) expresses (i) a chimeric T-cell receptor (TCR) sequence encoding a T-cell receptor fusion protein (TFP) and/or (ii) a chimeric antigen receptor (CAR) sequence encoding a CAR, wherein each of TFP and CAR exhibits specific binding to a tumor antigen, wherein the small molecule exhibits an $IC_{50}$ of less than or equal to 500 nM for PTPN2 as ascertained in a phosphatase assay utilizing DiFMUP as a substrate.

2. The method of claim 1, wherein the small molecule PTPN2 inhibitor is administered systemically and transiently to the subject in need thereof, and wherein the second agent or the second therapy comprises a lymphoid cell that (1) retains expression or activity of PTPN2 prior to being exposed to the small molecule PTPN2 inhibitor, and (2) expresses a chimeric antigen receptor (CAR) sequence encoding a CAR that exhibits specific binding to a tumor antigen.

3. The method of claim 1, wherein prior to being exposed to the small molecule PTPN2 inhibitor, the lymphoid cell retains at least about 90% of the expression or activity of PTPN2 as compared to a control.

4. The method of claim 1, wherein the small molecule PTPN2 inhibitor (i) does not regulate site-specific recombination of a gene encoding PTPN2, and (ii) does not affect editing of the gene encoding PTPN2.

5. The method of claim 1, wherein the lymphoid cell is an immune effector cell.

6. The method of claim 1, wherein the lymphoid cell is selected from the group consisting of T cell, B cell, NK cell, KHYG cell, T helper cell, regulatory T cell, memory T cell, tumor infiltration T cell (TIL), antigen presenting cell, and dendritic cell.

7. The method of claim 1, wherein the lymphoid cell is selected from the group consisting of a CD4+ T cell, a CD8+ T cell, and a CD4+ and CD8+ T cell.

8. The method of claim 1, wherein the subject suffers from a cancer selected from the group consisting of cancer of bladder, bone, brain, breast, cervix, colon, lung, esophagus, head and neck, ovary, prostate, uterus, stomach, skin, and renal tissue.

9. The method of claim 1, wherein the small molecule is orally administered to effect the systemic administration.

10. The method of claim 1, wherein the small molecule exhibits (i) $IC_{50}$ less than 5 nM as ascertained in a phosphatase assay utilizing DiFMUP as the substrate, and (ii) $EC_{50}$ less than 10 µM in a pSTAT1 assay.

11. The method of claim 1, wherein the small molecule exhibits (i) $IC_{50}$ less than 5 nM as ascertained in a phosphatase assay utilizing DiFMUP as the substrate, (ii) $EC_{50}$ less than 5 µM in a pSTAT1 assay, and (iii) $EC_{50}$ less than 1 µM when tested in a CD25 assay.

12. The method of claim 1, wherein the small molecule is configured to bind a substrate of PTPN2.

13. The method of claim 1, wherein expression or activity of PTPN2 is transiently downregulated by intermittent administration of the small molecule to the lymphoid cell.

14. The method of claim 1, further comprising monitoring, concurrent with or subsequent to the administration of the PTPN2 inhibitor and/or the lymphoid cell, one or more inflammatory biomarkers present in the subject selected from the group consisting of antibodies, cytokines, radicals, and coagulation factors.

15. The method of claim 14, wherein the cytokines comprise IL-1, IL-6, TNF-α, IL-10, or IL-1RA.

16. The method of claim 1, further comprising administering to the subject another agent selected from the group consisting of a chemotherapeutic agent, a radioactive agent, and a checkpoint inhibitor.

17. A composition formulated for administration into a subject comprising a small molecule PTPN2 inhibitor and an amount of modified lymphoid cell that is sub-therapeutic as ascertained in the absence of the PTPN2 inhibitor, wherein the modified lymphoid cell comprises (i) a chimeric T-cell receptor (TCR) sequence encoding a T-cell receptor fusion protein (TFP) and/or (ii) a chimeric antigen receptor (CAR) sequence encoding a CAR, each of TFP and CAR exhibiting specific binding to an antigen; and wherein the small molecule PTPN2 inhibitor (a) does not affect editing of the gene encoding PTPN2 or an additional gene operatively linked to PTPN2, and (b) exhibits an $IC_{50}$ of less than or equal to 500 nM for PTPN2 as ascertained in a phosphatase assay utilizing DiFMUP as a substrate.

18. The composition of claim 17, wherein the small molecule is configured to bind PTPN2.

19. The composition of claim 17, wherein the small molecule exhibits $IC_{50}$ (i) less than 5 nM as ascertained in a phosphatase assay utilizing DiFMUP as the substrate, (ii) $EC_{50}$ less than 10 µM in a pSTAT1 assay, and/or (iii) $EC_{50}$ less than 1 µM when tested in a CD25 assay.

* * * * *